(12) United States Patent
Davidson

(10) Patent No.: US 9,805,521 B1
(45) Date of Patent: Oct. 31, 2017

(54) SYSTEMS AND METHODS FOR ASSESSING TURNS MADE BY A VEHICLE

(71) Applicant: United Parcel Service of America, Inc., Atlanta, GA (US)

(72) Inventor: Mark J. Davidson, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 14/095,560

(22) Filed: Dec. 3, 2013

(51) Int. Cl.
*B62D 6/00* (2006.01)
*B62D 11/00* (2006.01)
*B62D 12/00* (2006.01)
*B63G 8/20* (2006.01)
*B63H 25/04* (2006.01)
*G05D 1/00* (2006.01)
*G06F 7/00* (2006.01)
*G06F 17/00* (2006.01)
*G06F 19/00* (2011.01)
*G07C 5/02* (2006.01)
*G05D 3/00* (2006.01)
*G01C 21/30* (2006.01)
*G06F 7/70* (2006.01)
*G01C 21/00* (2006.01)

(52) U.S. Cl.
CPC ............ *G07C 5/02* (2013.01); *G01C 21/00* (2013.01)

(58) Field of Classification Search
CPC ................................ G01C 21/00; G07C 5/02
USPC ...................... 701/41, 44, 70, 208, 1; 705/8
See application file for complete search history.

(56) References Cited

U.S. PATENT DOCUMENTS

| | | | |
|---|---|---|---|
| 3,526,127 | A | 9/1970 | Sarkis |
| 3,789,198 | A | 1/1974 | Henson et al. |
| 3,822,049 | A | 7/1974 | Saunders |
| 4,113,217 | A | 9/1978 | O'Connell |
| 4,124,815 | A | 11/1978 | Stoschek |
| 4,152,693 | A | 5/1979 | Ashworth, Jr. |
| 4,312,310 | A | 1/1982 | Chivilo et al. |
| 4,398,515 | A | 8/1983 | Canup et al. |

(Continued)

FOREIGN PATENT DOCUMENTS

| | | |
|---|---|---|
| CN | 201732473 U | 2/2011 |
| DE | 196 18 535 A1 | 7/1997 |

(Continued)

OTHER PUBLICATIONS

United States Patent and Trademark Office, Office Action for U.S. Appl. No. 13/435,831, Jun. 5, 2015, 23 pages, U.S.A.

(Continued)

*Primary Examiner* — Mahmoud Ismail
(74) *Attorney, Agent, or Firm* — Alston & Bird LLP

(57) ABSTRACT

Various embodiments of the present invention are generally directed to a systems and methods for assessing turns made by one or more vehicles. According to various embodiments, the system is configured to identify, based telematics data captured from the vehicles, turns executed by the vehicle during a particular time period. The system is further configured to analyze the identified turns to determine and display various turn segment attributes to a user in order to provide an indication of turns having an abnormal or excessive duration and/or to provide overall efficiency-indicative information relating to the vehicle turns.

11 Claims, 22 Drawing Sheets

(56) References Cited

U.S. PATENT DOCUMENTS

| | | |
|---|---|---|
| 4,492,195 A | 1/1985 | Takahashi et al. |
| 4,514,811 A | 4/1985 | Daubenmier et al. |
| 4,773,011 A | 9/1988 | VanHoose |
| 4,945,759 A | 8/1990 | Krofchalk et al. |
| 4,977,399 A | 12/1990 | Price et al. |
| 5,014,206 A | 5/1991 | Scribner et al. |
| 5,041,976 A | 8/1991 | Marko et al. |
| 5,048,482 A | 9/1991 | Kraft et al. |
| 5,060,156 A | 10/1991 | Vajgart et al. |
| 5,068,656 A | 11/1991 | Sutherland |
| 5,095,500 A | 3/1992 | Tayloe et al. |
| 5,111,902 A | 5/1992 | Sundeen et al. |
| 5,117,682 A | 6/1992 | Amano |
| 5,214,757 A | 5/1993 | Mauney et al. |
| 5,218,367 A | 6/1993 | Sheffer et al. |
| 5,227,614 A | 7/1993 | Danielson et al. |
| 5,347,274 A | 9/1994 | Hassett |
| 5,398,276 A | 3/1995 | Lemke et al. |
| 5,414,809 A | 5/1995 | Hogan et al. |
| 5,444,444 A | 8/1995 | Ross et al. |
| 5,472,097 A | 12/1995 | Villachica |
| 5,481,588 A | 1/1996 | Rickli et al. |
| 5,497,149 A | 3/1996 | Fast |
| 5,500,516 A | 3/1996 | Durbin |
| 5,515,419 A | 5/1996 | Sheffer |
| 5,528,758 A | 6/1996 | Yeh |
| 5,534,684 A | 7/1996 | Danielson |
| 5,561,839 A | 10/1996 | Österberg et al. |
| 5,619,412 A | 4/1997 | Hapka |
| 5,635,693 A | 6/1997 | Benson et al. |
| 5,648,770 A | 7/1997 | Ross |
| 5,708,423 A | 1/1998 | Ghaffari et al. |
| 5,736,725 A | 4/1998 | Danielson |
| 5,739,787 A | 4/1998 | Burke et al. |
| 5,751,245 A | 5/1998 | Janky et al. |
| 5,751,973 A | 5/1998 | Hassett et al. |
| 5,752,164 A | 5/1998 | Jones |
| 5,758,313 A | 5/1998 | Shah et al. |
| 5,771,169 A | 6/1998 | Wendte |
| 5,797,134 A | 8/1998 | McMillan et al. |
| 5,802,545 A | 9/1998 | Coverdill |
| 5,805,419 A | 9/1998 | Hundt et al. |
| 5,808,564 A | 9/1998 | Simms et al. |
| 5,808,565 A | 9/1998 | Matta et al. |
| 5,808,907 A | 9/1998 | Shetty et al. |
| 5,815,093 A | 9/1998 | Kikinis |
| 5,818,356 A | 10/1998 | Schuessler |
| 5,825,283 A | 10/1998 | Camhi |
| 5,834,749 A | 11/1998 | Durbin |
| 5,835,377 A | 11/1998 | Bush |
| 5,857,159 A | 1/1999 | Dickrell et al. |
| 5,862,500 A | 1/1999 | Goodwin |
| 5,867,382 A | 2/1999 | McLaughlin |
| 5,867,785 A | 2/1999 | Averbuch et al. |
| 5,904,727 A | 5/1999 | Prabhakaran |
| 5,919,239 A | 7/1999 | Fraker et al. |
| 5,926,762 A | 7/1999 | Arpee et al. |
| 5,928,291 A | 7/1999 | Jenkins et al. |
| 5,938,716 A | 8/1999 | Shuty et al. |
| 5,946,612 A | 8/1999 | Johansson |
| 5,948,026 A | 9/1999 | Beemer, II et al. |
| 5,974,357 A | 10/1999 | Poonsaengsathit et al. |
| 5,982,325 A | 11/1999 | Thornton et al. |
| 5,987,306 A | 11/1999 | Nilsen et al. |
| 5,991,622 A | 11/1999 | Henry, Jr. |
| 5,993,098 A | 11/1999 | Osada |
| 6,003,010 A | 12/1999 | Scolly et al. |
| 6,003,773 A | 12/1999 | Durbin et al. |
| 6,031,455 A | 2/2000 | Grube et al. |
| 6,034,379 A | 3/2000 | Bunte et al. |
| 6,060,992 A | 5/2000 | Huang et al. |
| 6,064,970 A | 5/2000 | McMillan et al. |
| 6,071,643 A | 6/2000 | Chino et al. |
| 6,075,530 A | 6/2000 | Lucas et al. |
| 6,084,528 A | 7/2000 | Beach et al. |
| 6,084,870 A | 7/2000 | Wooten et al. |
| 6,088,648 A | 7/2000 | Shah et al. |
| 6,092,021 A | 7/2000 | Ehlbeck et al. |
| 6,098,048 A | 8/2000 | Dashefsky et al. |
| 6,108,591 A | 8/2000 | Segal et al. |
| 6,112,152 A | 8/2000 | Tuttle |
| 6,124,806 A | 9/2000 | Cunningham et al. |
| 6,124,810 A | 9/2000 | Segal et al. |
| 6,128,543 A | 10/2000 | Hitchner |
| 6,134,437 A | 10/2000 | Karabinis et al. |
| 6,148,262 A | 11/2000 | Fry |
| 6,157,838 A | 12/2000 | Di Huo et al. |
| 6,169,896 B1 | 1/2001 | Sant et al. |
| 6,181,994 B1 | 1/2001 | Colson et al. |
| 6,202,629 B1 | 3/2001 | Zhu et al. |
| 6,211,781 B1 | 4/2001 | McDonald |
| 6,246,672 B1 | 6/2001 | Lumelsky |
| 6,246,938 B1 | 6/2001 | Giletta et al. |
| 6,249,008 B1 | 6/2001 | Bunte et al. |
| 6,253,129 B1 | 6/2001 | Jenkins et al. |
| 6,272,337 B1 | 8/2001 | Mount et al. |
| 6,278,361 B1 | 8/2001 | Magiawala et al. |
| 6,282,486 B1 | 8/2001 | Bates et al. |
| 6,285,916 B1 | 9/2001 | Kadaba et al. |
| 6,292,724 B1 | 9/2001 | Apsell et al. |
| 6,295,492 B1 | 9/2001 | Lang et al. |
| 6,304,816 B1 | 10/2001 | Berstis |
| 6,306,063 B1 | 10/2001 | Horgan et al. |
| 6,308,120 B1 | 10/2001 | Good |
| 6,313,791 B1 | 11/2001 | Klanke |
| 6,315,255 B1 | 11/2001 | Chan et al. |
| 6,324,659 B1 | 11/2001 | Pierro |
| 6,330,499 B1 | 12/2001 | Chou et al. |
| 6,336,035 B1 | 1/2002 | Somoza et al. |
| 6,338,152 B1 | 1/2002 | Fera et al. |
| 6,339,745 B1 | 1/2002 | Novik |
| 6,356,836 B1 | 3/2002 | Adolph |
| 6,363,323 B1 | 3/2002 | Jones |
| 6,377,881 B1 | 4/2002 | Mullins |
| 6,389,337 B1 | 5/2002 | Kolls |
| 6,400,690 B1 | 6/2002 | Liu et al. |
| 6,401,027 B1 | 6/2002 | Xu et al. |
| 6,405,112 B1 | 6/2002 | Rayner |
| 6,408,232 B1 | 6/2002 | Cannon et al. |
| 6,408,233 B1 | 6/2002 | Solomon et al. |
| 6,411,891 B1 | 6/2002 | Jones |
| 6,433,732 B1 | 8/2002 | Dutta |
| 6,434,512 B1 | 8/2002 | Discenzo |
| 6,449,485 B1 | 9/2002 | Anzil |
| 6,459,967 B1 | 10/2002 | Otto |
| 6,459,969 B1 | 10/2002 | Bates et al. |
| 6,462,675 B1 | 10/2002 | Humphrey et al. |
| 6,466,862 B1 | 10/2002 | DeKock et al. |
| 6,470,240 B1 | 10/2002 | Haynes et al. |
| 6,477,452 B2 | 11/2002 | Good |
| 6,484,080 B2 | 11/2002 | Breed |
| 6,496,775 B2 | 12/2002 | McDonald, Jr. et al. |
| 6,496,806 B1 | 12/2002 | Horwitz et al. |
| 6,498,986 B1 | 12/2002 | Kurtzberg et al. |
| 6,502,030 B2 | 12/2002 | Hilleary |
| 6,509,749 B1 | 1/2003 | Buelna et al. |
| 6,525,672 B2 | 2/2003 | Chainer et al. |
| 6,526,341 B1 | 2/2003 | Bird et al. |
| 6,529,818 B2 | 3/2003 | Kitajima et al. |
| 6,535,142 B2 | 3/2003 | Wakabayashi et al. |
| 6,570,529 B2 | 5/2003 | Richton et al. |
| 6,580,973 B2 | 6/2003 | Leivian et al. |
| 6,587,787 B1 | 7/2003 | Yokota |
| 6,594,579 B1 | 7/2003 | Lowery et al. |
| 6,600,418 B2 | 7/2003 | Francis et al. |
| 6,603,966 B1 | 8/2003 | Sheffield |
| 6,604,033 B1 | 8/2003 | Banet et al. |
| 6,611,740 B2 | 8/2003 | Lowrey et al. |
| 6,611,755 B1 | 8/2003 | Coffee et al. |
| 6,618,668 B1 | 9/2003 | Laird |
| 6,622,083 B1 | 9/2003 | Knockeart et al. |
| 6,629,034 B1 | 9/2003 | Kozak et al. |
| 6,634,329 B2 | 10/2003 | Kusano et al. |
| 6,636,790 B1 | 10/2003 | Lightner et al. |

(56) References Cited

U.S. PATENT DOCUMENTS

| | | |
|---|---|---|
| 6,648,770 B1 | 11/2003 | Snyder |
| 6,664,922 B1 | 12/2003 | Fan |
| 6,675,635 B2 | 1/2004 | Kasen et al. |
| 6,711,404 B1 | 3/2004 | Arpee et al. |
| 6,711,408 B1 | 3/2004 | Raith |
| 6,731,925 B2 | 5/2004 | Naboulsi |
| 6,732,031 B1 | 5/2004 | Lightner et al. |
| 6,741,938 B2 | 5/2004 | Berndorfer |
| 6,745,153 B2 | 6/2004 | White et al. |
| 6,763,903 B2 | 7/2004 | Morimoto et al. |
| 6,772,142 B1 | 8/2004 | Kelling et al. |
| 6,775,642 B2 | 8/2004 | Remboski et al. |
| 6,778,888 B2 | 8/2004 | Cataldo et al. |
| 6,792,352 B1 | 9/2004 | Hoffmann et al. |
| 6,801,850 B1 | 10/2004 | Wolfson |
| 6,802,291 B2 | 10/2004 | Ujifusa |
| 6,819,267 B1 | 11/2004 | Edmark |
| 6,819,988 B2 | 11/2004 | Dietz et al. |
| 6,832,140 B2 | 12/2004 | Fan et al. |
| 6,832,141 B2 | 12/2004 | Skeen et al. |
| 6,840,093 B2 | 1/2005 | Kasen et al. |
| 6,847,871 B2 | 1/2005 | Malik et al. |
| 6,850,823 B2 | 2/2005 | Eun et al. |
| 6,853,842 B1 | 2/2005 | Wilson et al. |
| 6,857,262 B2 | 2/2005 | Rendahl et al. |
| 6,859,039 B2 | 2/2005 | Horie et al. |
| 6,865,457 B1 | 3/2005 | Mittelstaedt et al. |
| 6,868,386 B1 | 3/2005 | Henderson et al. |
| 6,879,910 B2 | 4/2005 | Shike et al. |
| 6,879,969 B2 | 4/2005 | Engstroem et al. |
| 6,895,329 B1 | 5/2005 | Wolfson |
| 6,909,947 B2 | 6/2005 | Douros et al. |
| 6,911,830 B2 | 6/2005 | Heremans et al. |
| 6,915,128 B1 | 7/2005 | Oh |
| 6,919,821 B1 | 7/2005 | Smith |
| 6,920,779 B2 | 7/2005 | Carlstrom et al. |
| 6,925,425 B2 | 8/2005 | Remboski et al. |
| 6,928,280 B1 | 8/2005 | Xanthos et al. |
| 6,931,235 B2 | 8/2005 | Kline et al. |
| 6,933,842 B2 | 8/2005 | Oesterling et al. |
| 6,947,827 B2 | 9/2005 | Fuse et al. |
| 6,960,168 B2 | 11/2005 | Yanagidaira et al. |
| 6,975,928 B2 | 12/2005 | Timko et al. |
| 7,002,579 B2 | 2/2006 | Olson |
| 7,003,289 B1 | 2/2006 | Kolls |
| 7,016,771 B2 | 3/2006 | Watkins et al. |
| 7,024,306 B2 | 4/2006 | Minami et al. |
| 7,027,808 B2 | 4/2006 | Wesby |
| 7,031,663 B2 | 4/2006 | Heinonen et al. |
| 7,034,683 B2 | 4/2006 | Ghazarian |
| 7,062,264 B2 | 6/2006 | Ko et al. |
| 7,075,421 B1 | 7/2006 | Tuttle |
| 7,076,505 B2 | 7/2006 | Campbell |
| 7,089,198 B2 | 8/2006 | Freedenberg et al. |
| 7,089,784 B2 | 8/2006 | Jakoby et al. |
| 7,090,134 B2 | 8/2006 | Ramsager |
| 7,099,669 B2 | 8/2006 | Sheffield |
| 7,107,150 B2 | 9/2006 | Iwamura et al. |
| 7,113,793 B2 | 9/2006 | Veerasamy et al. |
| 7,113,839 B2 | 9/2006 | Ferguson et al. |
| 7,146,264 B2 | 12/2006 | Bates et al. |
| 7,155,321 B2 | 12/2006 | Bromley et al. |
| 7,161,688 B1 | 1/2007 | Bonner et al. |
| 7,162,339 B2 | 1/2007 | Nguyen |
| 7,173,632 B2 | 2/2007 | Inokuchi et al. |
| 7,174,301 B2 | 2/2007 | Florance et al. |
| 7,212,122 B2 | 5/2007 | Gloekler et al. |
| 7,216,037 B2 | 5/2007 | Graulich et al. |
| 7,236,779 B2 | 6/2007 | Lahav et al. |
| 7,248,159 B2 | 7/2007 | Smith |
| 7,251,558 B1 | 7/2007 | McGrath |
| 7,257,396 B2 | 8/2007 | Olsen et al. |
| 7,263,419 B2 | 8/2007 | Wheals et al. |
| 7,266,435 B2 | 9/2007 | Wang |
| 7,271,716 B2 | 9/2007 | Nou |
| 7,289,786 B2 | 10/2007 | Krasner |
| 7,292,152 B2 | 11/2007 | Torkkola et al. |
| 7,299,125 B2 | 11/2007 | Marks et al. |
| 7,302,371 B2 | 11/2007 | Oesterling et al. |
| 7,309,178 B2 | 12/2007 | Ikeda |
| 7,313,530 B2 | 12/2007 | Smith et al. |
| 7,317,975 B2 | 1/2008 | Woolford et al. |
| 7,327,258 B2 | 2/2008 | Fast et al. |
| 7,333,820 B2 | 2/2008 | Sheha et al. |
| 7,343,174 B2 | 3/2008 | Suryanarayana et al. |
| 7,349,782 B2 | 3/2008 | Churchill et al. |
| 7,356,392 B2 | 4/2008 | Hubbard et al. |
| 7,358,857 B1 | 4/2008 | White |
| 7,385,529 B2 | 6/2008 | Hersh et al. |
| 7,389,178 B2 | 6/2008 | Raz et al. |
| 7,394,393 B2 | 7/2008 | Zhang et al. |
| 7,395,140 B2 | 7/2008 | Christie et al. |
| 7,400,954 B2 | 7/2008 | Sumcad et al. |
| 7,409,274 B2 | 8/2008 | Grana et al. |
| 7,412,398 B1 | 8/2008 | Bailey |
| 7,430,471 B2 | 9/2008 | Simon |
| 7,444,311 B2 | 10/2008 | Engstrom et al. |
| 7,457,693 B2 | 11/2008 | Olsen et al. |
| 7,463,951 B2 | 12/2008 | Ampunan et al. |
| 7,469,827 B2 | 12/2008 | Katragadda et al. |
| 7,480,551 B1 | 1/2009 | Lowery et al. |
| 7,486,181 B2 | 2/2009 | Olsen et al. |
| 7,487,036 B2 | 2/2009 | Kim |
| 7,489,996 B2 | 2/2009 | Gowan et al. |
| 7,515,302 B2 | 4/2009 | Furuta |
| 7,523,159 B1 | 4/2009 | Williams et al. |
| 7,532,958 B2 | 5/2009 | Powers et al. |
| 7,536,457 B2 | 5/2009 | Miller |
| 7,542,915 B2 | 6/2009 | Kendrick |
| 7,554,441 B2 | 6/2009 | Viegers et al. |
| 7,561,054 B2 | 7/2009 | Raz et al. |
| 7,561,069 B2 | 7/2009 | Horstemeyer |
| 7,564,377 B2 | 7/2009 | Kimchi et al. |
| 7,565,230 B2 | 7/2009 | Gardner et al. |
| 7,571,036 B2 | 8/2009 | Olsen et al. |
| 7,571,111 B2 | 8/2009 | Ahrens et al. |
| 7,584,033 B2 | 9/2009 | Mittelstadt et al. |
| 7,587,276 B2 | 9/2009 | Gold et al. |
| 7,589,619 B2 | 9/2009 | DeKeuster et al. |
| 7,599,786 B2 | 10/2009 | Utsumi et al. |
| 7,599,843 B2 | 10/2009 | Watkins et al. |
| 7,603,138 B2 | 10/2009 | Zhang et al. |
| 7,616,217 B2 | 11/2009 | Dayan et al. |
| 7,619,515 B2 | 11/2009 | Valania |
| 7,627,406 B2 | 12/2009 | Wang et al. |
| 7,627,535 B2 | 12/2009 | Brockman et al. |
| 7,659,827 B2 | 2/2010 | Gunderson et al. |
| 7,672,774 B2 | 3/2010 | Glaza et al. |
| 7,676,306 B2 | 3/2010 | Kubo et al. |
| 7,683,774 B2 | 3/2010 | Olsen et al. |
| 7,705,743 B2 | 4/2010 | Barone et al. |
| 7,706,938 B2 | 4/2010 | Palladino |
| 7,714,705 B2 | 5/2010 | Rennie et al. |
| 7,715,961 B1 | 5/2010 | Kargupta |
| 7,725,216 B2 | 5/2010 | Kim |
| 7,739,007 B2 | 6/2010 | Logsdon |
| 7,765,058 B2 | 7/2010 | Doering |
| 7,769,499 B2 | 8/2010 | McQuade et al. |
| 7,774,130 B2 | 8/2010 | Pepper |
| 7,778,752 B1 | 8/2010 | Hunt et al. |
| 7,786,895 B2 | 8/2010 | Zoladek et al. |
| 7,788,005 B2 | 8/2010 | Enomoto et al. |
| 7,789,796 B2 | 9/2010 | Choi |
| 7,805,233 B2 | 9/2010 | Gowan et al. |
| 7,860,636 B2 | 12/2010 | Yamaguchi |
| 7,860,637 B2 | 12/2010 | Yamaguchi |
| 7,877,198 B2 | 1/2011 | Tenzer et al. |
| 7,880,767 B2 | 2/2011 | Chinigo |
| 7,881,838 B2 | 2/2011 | Larschan et al. |
| 7,903,001 B2 | 3/2011 | Sheha et al. |
| 7,912,502 B2 | 3/2011 | Ando et al. |
| 7,912,641 B2 | 3/2011 | Osentoski et al. |
| 7,912,796 B2 | 3/2011 | Engstroem et al. |
| 7,913,179 B2 | 3/2011 | Sheha et al. |

(56) References Cited

U.S. PATENT DOCUMENTS

| | | |
|---|---|---|
| 7,917,253 B2 | 3/2011 | Inbarajan et al. |
| 7,917,852 B2 | 3/2011 | Wattenberg et al. |
| 7,920,944 B2 | 4/2011 | Gould et al. |
| 7,925,982 B2 | 4/2011 | Parker et al. |
| 7,925,985 B2 | 4/2011 | Moore |
| 7,982,764 B2 | 7/2011 | Kadaba |
| 7,991,407 B2 | 8/2011 | McCormick et al. |
| 7,996,235 B2 | 8/2011 | Laghrari et al. |
| 8,005,589 B2 | 8/2011 | MacDonald et al. |
| 8,046,167 B2 | 10/2011 | Mishra et al. |
| 8,069,412 B2 | 11/2011 | Bankston et al. |
| 8,078,393 B2 | 12/2011 | Ohi |
| 8,078,485 B1 | 12/2011 | Kraehmueller et al. |
| 8,146,009 B2 | 3/2012 | Mason et al. |
| 8,195,630 B2 | 6/2012 | Ellis et al. |
| 8,214,142 B2 | 7/2012 | Cerecke et al. |
| 8,249,910 B2 | 8/2012 | Wellman et al. |
| 8,275,508 B1 | 9/2012 | Adams et al. |
| 8,275,522 B1 | 9/2012 | Groeneweg et al. |
| 8,284,069 B2 | 10/2012 | Sverrisson |
| 8,290,701 B2 | 10/2012 | Mason et al. |
| 8,315,802 B2 | 11/2012 | Brown |
| 8,330,626 B1 | 12/2012 | Adelson |
| 8,386,283 B2 | 2/2013 | Hand |
| 8,416,067 B2 | 4/2013 | Davidson et al. |
| 8,484,059 B2 | 7/2013 | Bankston et al. |
| 8,732,019 B2 | 5/2014 | Brown et al. |
| 8,775,960 B1 | 7/2014 | Flores |
| 8,855,681 B1 | 10/2014 | George et al. |
| 8,896,430 B2 | 11/2014 | Davidson et al. |
| 8,958,988 B2 | 2/2015 | Gueziec |
| 8,983,762 B2 | 3/2015 | Davidson |
| 8,996,287 B2 | 3/2015 | Davidson et al. |
| 9,070,100 B2 | 6/2015 | Davidson |
| 9,117,190 B2 | 8/2015 | Davidson |
| 9,129,449 B2 | 9/2015 | Davidson |
| 9,208,626 B2 | 12/2015 | Davidson |
| 9,256,992 B2 | 2/2016 | Davidson |
| 9,324,198 B2 | 4/2016 | Davidson et al. |
| 2001/0012976 A1 | 8/2001 | Menig et al. |
| 2001/0018628 A1 | 8/2001 | Jenkins et al. |
| 2001/0029425 A1 | 10/2001 | Myr |
| 2002/0008621 A1 | 1/2002 | Barritz et al. |
| 2002/0024448 A1 | 2/2002 | Olesen |
| 2002/0029108 A1 | 3/2002 | Liu et al. |
| 2002/0032517 A1 | 3/2002 | Buckelew et al. |
| 2002/0044084 A1 | 4/2002 | Itoh et al. |
| 2002/0077742 A1 | 6/2002 | Mintz |
| 2002/0077750 A1 | 6/2002 | McDonald et al. |
| 2003/0014286 A1 | 1/2003 | Cappellini |
| 2003/0083060 A1 | 5/2003 | Menendez |
| 2003/0114206 A1 | 6/2003 | Timothy et al. |
| 2003/0120584 A1 | 6/2003 | Zarefoss et al. |
| 2003/0135304 A1 | 7/2003 | Sroub et al. |
| 2003/0144985 A1 | 7/2003 | Ebert |
| 2003/0149607 A1 | 8/2003 | Ogasawara et al. |
| 2003/0149674 A1 | 8/2003 | Good et al. |
| 2003/0163287 A1 | 8/2003 | Vock et al. |
| 2003/0195606 A1 | 10/2003 | Davidson et al. |
| 2003/0195676 A1 | 10/2003 | Kelly et al. |
| 2003/0195696 A1 | 10/2003 | Jones |
| 2003/0197612 A1 | 10/2003 | Tanaka et al. |
| 2003/0224806 A1 | 12/2003 | Hebron |
| 2004/0039504 A1 | 2/2004 | Coffee et al. |
| 2004/0054607 A1 | 3/2004 | Waddington et al. |
| 2004/0090628 A1 | 5/2004 | Ershov et al. |
| 2004/0178902 A1 | 9/2004 | Koike et al. |
| 2004/0193466 A1 | 9/2004 | Kull et al. |
| 2004/0195320 A1 | 10/2004 | Ramsager |
| 2004/0229560 A1 | 11/2004 | Maloney |
| 2004/0249557 A1 | 12/2004 | Harrington et al. |
| 2004/0254698 A1 | 12/2004 | Hubbard et al. |
| 2004/0260585 A1 | 12/2004 | Spangenberg et al. |
| 2005/0044906 A1 | 3/2005 | Spielman |
| 2005/0065711 A1 | 3/2005 | Dahlgren et al. |
| 2005/0073443 A1 | 4/2005 | Sheha et al. |
| 2005/0125148 A1 | 6/2005 | Van Buer et al. |
| 2005/0131627 A1 | 6/2005 | Ignatin |
| 2005/0134504 A1 | 6/2005 | Harwood et al. |
| 2005/0140523 A1 | 6/2005 | Publicover |
| 2005/0143889 A1* | 6/2005 | Isaji ............... G08G 1/161 701/70 |
| 2005/0203683 A1 | 9/2005 | Olsen et al. |
| 2005/0216553 A1 | 9/2005 | Mallonee et al. |
| 2005/0283699 A1 | 12/2005 | Nomura et al. |
| 2006/0047379 A1 | 3/2006 | Schullian et al. |
| 2006/0047423 A1 | 3/2006 | Min |
| 2006/0055564 A1 | 3/2006 | Olsen et al. |
| 2006/0089787 A1 | 4/2006 | Burr et al. |
| 2006/0095175 A1 | 5/2006 | deWaal et al. |
| 2006/0100779 A1 | 5/2006 | Vergin |
| 2006/0142934 A1 | 6/2006 | Kim |
| 2006/0145837 A1 | 7/2006 | Horton |
| 2006/0155464 A1 | 7/2006 | Smartt |
| 2006/0161315 A1 | 7/2006 | Lewis et al. |
| 2006/0164232 A1 | 7/2006 | Waterhouse et al. |
| 2006/0206261 A1 | 9/2006 | Altaf et al. |
| 2006/0208722 A1 | 9/2006 | Takemasa et al. |
| 2006/0265228 A1 | 11/2006 | Ando |
| 2006/0271246 A1 | 11/2006 | Bell et al. |
| 2007/0027583 A1 | 2/2007 | Tamir et al. |
| 2007/0027726 A1 | 2/2007 | Warren et al. |
| 2007/0038348 A1 | 2/2007 | Larschan et al. |
| 2007/0051544 A1 | 3/2007 | Fernandez |
| 2007/0093943 A1 | 4/2007 | Nelson et al. |
| 2007/0115101 A1 | 5/2007 | Creekbaum et al. |
| 2007/0126605 A1 | 6/2007 | Aleksic et al. |
| 2007/0174004 A1 | 7/2007 | Tenzer et al. |
| 2007/0179680 A1 | 8/2007 | Tamura |
| 2007/0226041 A1 | 9/2007 | Oesterling et al. |
| 2007/0239346 A1 | 10/2007 | Hawkins |
| 2007/0241882 A1 | 10/2007 | Panttaja et al. |
| 2007/0244633 A1 | 10/2007 | Phillips et al. |
| 2007/0271014 A1 | 11/2007 | Breed |
| 2008/0016504 A1 | 1/2008 | Cheng et al. |
| 2008/0045245 A1 | 2/2008 | Billmaier et al. |
| 2008/0046274 A1 | 2/2008 | Geelen et al. |
| 2008/0059055 A1 | 3/2008 | Geelen et al. |
| 2008/0091681 A1 | 4/2008 | Dwivedi et al. |
| 2008/0097731 A1 | 4/2008 | Lanes et al. |
| 2008/0125724 A1 | 5/2008 | Monroe |
| 2008/0140287 A1 | 6/2008 | Yang et al. |
| 2008/0140654 A1 | 6/2008 | Daley |
| 2008/0143834 A1 | 6/2008 | Comeau et al. |
| 2008/0154691 A1 | 6/2008 | Wellman et al. |
| 2008/0162036 A1 | 7/2008 | Breed |
| 2008/0177646 A1 | 7/2008 | Frink |
| 2008/0252487 A1 | 10/2008 | McClellan et al. |
| 2008/0255722 A1 | 10/2008 | McClellan et al. |
| 2008/0255888 A1 | 10/2008 | Berkobin et al. |
| 2008/0262670 A1 | 10/2008 | McClellan et al. |
| 2008/0269978 A1 | 10/2008 | Shirole et al. |
| 2008/0270519 A1 | 10/2008 | Ekdahl et al. |
| 2008/0285886 A1 | 11/2008 | Allen |
| 2008/0295586 A1 | 12/2008 | Fosseen |
| 2008/0307491 A1 | 12/2008 | Duri et al. |
| 2008/0319602 A1 | 12/2008 | McClellan et al. |
| 2009/0007098 A1 | 1/2009 | Chevrette et al. |
| 2009/0024419 A1 | 1/2009 | McClellan et al. |
| 2009/0030574 A1* | 1/2009 | Yamakado ........ B60W 30/045 701/44 |
| 2009/0045924 A1 | 2/2009 | Roberts, Sr. et al. |
| 2009/0051566 A1 | 2/2009 | Olsen et al. |
| 2009/0055091 A1 | 2/2009 | Hines et al. |
| 2009/0070027 A1 | 3/2009 | Newhouse et al. |
| 2009/0070035 A1 | 3/2009 | Van Buer |
| 2009/0088924 A1 | 4/2009 | Coffee et al. |
| 2009/0102638 A1 | 4/2009 | Olsen et al. |
| 2009/0112396 A1 | 4/2009 | Tsai et al. |
| 2009/0114575 A1 | 5/2009 | Carpenter et al. |
| 2009/0177350 A1 | 7/2009 | Williams et al. |
| 2009/0216434 A1 | 8/2009 | Panganiban et al. |
| 2009/0248235 A1 | 10/2009 | Hering et al. |
| 2009/0248236 A1 | 10/2009 | Schwinke |

(56) References Cited

U.S. PATENT DOCUMENTS

| | | |
|---|---|---|
| 2009/0248237 A1 | 10/2009 | Koepf et al. |
| 2009/0271057 A1 | 10/2009 | Stone |
| 2009/0281929 A1 | 11/2009 | Boitet et al. |
| 2009/0287369 A1 | 11/2009 | Nielsen |
| 2009/0287410 A1 | 11/2009 | Kobayashi |
| 2009/0287739 A1 | 11/2009 | Zhang et al. |
| 2009/0306997 A1 | 12/2009 | Betancourt |
| 2009/0318121 A1 | 12/2009 | Marumoto |
| 2009/0319119 A1 | 12/2009 | Park et al. |
| 2009/0319341 A1 | 12/2009 | Berkobin et al. |
| 2009/0326753 A1 | 12/2009 | Chen et al. |
| 2009/0326991 A1 | 12/2009 | Wei et al. |
| 2010/0010732 A1 | 1/2010 | Hartman |
| 2010/0030582 A1 | 2/2010 | Rippel et al. |
| 2010/0030586 A1 | 2/2010 | Taylor et al. |
| 2010/0035602 A1 | 2/2010 | Doherty et al. |
| 2010/0036591 A1 | 2/2010 | Nakai |
| 2010/0042311 A1 | 2/2010 | Nakai |
| 2010/0057356 A1 | 3/2010 | Lin |
| 2010/0059007 A1 | 3/2010 | Senda et al. |
| 2010/0061190 A1 | 3/2010 | Nelson |
| 2010/0063850 A1 | 3/2010 | Daniel |
| 2010/0070153 A1 | 3/2010 | Bradley et al. |
| 2010/0076935 A1 | 3/2010 | Hussain et al. |
| 2010/0082230 A1 | 4/2010 | Hong et al. |
| 2010/0087984 A1 | 4/2010 | Joseph |
| 2010/0088137 A1 | 4/2010 | Weiss et al. |
| 2010/0088163 A1 | 4/2010 | Davidson et al. |
| 2010/0090852 A1 | 4/2010 | Eitan et al. |
| 2010/0094688 A1 | 4/2010 | Olsen, III et al. |
| 2010/0094769 A1 | 4/2010 | Davidson et al. |
| 2010/0100315 A1 | 4/2010 | Davidson et al. |
| 2010/0100507 A1 | 4/2010 | Davidson et al. |
| 2010/0114484 A1 | 5/2010 | Kida et al. |
| 2010/0127843 A1 | 5/2010 | Koenig |
| 2010/0131152 A1 | 5/2010 | Castonguay et al. |
| 2010/0131308 A1 | 5/2010 | Collopy et al. |
| 2010/0138242 A1 | 6/2010 | Ferrick et al. |
| 2010/0153005 A1 | 6/2010 | Cerecke et al. |
| 2010/0168992 A1 | 7/2010 | Nakata |
| 2010/0174485 A1 | 7/2010 | Taylor et al. |
| 2010/0179844 A1 | 7/2010 | LaFergola et al. |
| 2010/0185356 A1 | 7/2010 | Haas et al. |
| 2010/0191403 A1 | 7/2010 | Krause |
| 2010/0205012 A1 | 8/2010 | McClellan |
| 2010/0205022 A1 | 8/2010 | Brown |
| 2010/0211259 A1 | 8/2010 | McClellan |
| 2010/0212629 A1 | 8/2010 | McDonald et al. |
| 2010/0217480 A1 | 8/2010 | Link, II |
| 2010/0217524 A1 | 8/2010 | Oohashi et al. |
| 2010/0228404 A1 | 9/2010 | Link, II et al. |
| 2010/0229815 A1 | 9/2010 | Senda et al. |
| 2010/0235092 A1* | 9/2010 | Kutomi .................. G01C 21/32 701/532 |
| 2010/0245123 A1 | 9/2010 | Prasad et al. |
| 2010/0250021 A1 | 9/2010 | Cook et al. |
| 2010/0250059 A1 | 9/2010 | Sekiyama et al. |
| 2010/0262333 A1 | 10/2010 | Storgaard |
| 2010/0262450 A1* | 10/2010 | Kalish .............. G06Q 10/06315 705/7.25 |
| 2010/0265052 A1 | 10/2010 | Koen |
| 2010/0274440 A1 | 10/2010 | Kim et al. |
| 2010/0305805 A1 | 12/2010 | Yamaguchi |
| 2010/0305807 A1 | 12/2010 | Basir et al. |
| 2010/0332119 A1 | 12/2010 | Geelen et al. |
| 2011/0015851 A1 | 1/2011 | Burr et al. |
| 2011/0035139 A1 | 2/2011 | Konlditslotis et al. |
| 2011/0039587 A1 | 2/2011 | Madhavan et al. |
| 2011/0040438 A1 | 2/2011 | Kluge et al. |
| 2011/0040477 A1 | 2/2011 | Eser et al. |
| 2011/0041088 A1 | 2/2011 | Mason et al. |
| 2011/0046845 A1 | 2/2011 | Kozlay |
| 2011/0050732 A1 | 3/2011 | Arrasvuori |
| 2011/0054767 A1 | 3/2011 | Schafer et al. |
| 2011/0057784 A1 | 3/2011 | Nakamura et al. |
| 2011/0068954 A1 | 3/2011 | McQuade et al. |
| 2011/0071740 A1 | 3/2011 | Nihei et al. |
| 2011/0078024 A1 | 3/2011 | Messier et al. |
| 2011/0090075 A1 | 4/2011 | Armitage et al. |
| 2011/0098880 A1 | 4/2011 | Basir et al. |
| 2011/0101610 A1 | 5/2011 | Mayalidag |
| 2011/0102167 A1 | 5/2011 | Baur et al. |
| 2011/0106416 A1 | 5/2011 | Scofield et al. |
| 2011/0112717 A1 | 5/2011 | Resner |
| 2011/0112740 A1 | 5/2011 | Hashimoto |
| 2011/0112870 A1 | 5/2011 | Berg et al. |
| 2011/0118934 A1 | 5/2011 | Lowrey et al. |
| 2011/0122858 A1 | 5/2011 | Yashiro et al. |
| 2011/0130906 A1 | 6/2011 | Mayer |
| 2011/0130916 A1 | 6/2011 | Mayer |
| 2011/0130960 A1 | 6/2011 | Sheha et al. |
| 2011/0137489 A1 | 6/2011 | Gilleland et al. |
| 2011/0137511 A1 | 6/2011 | Harumoto et al. |
| 2011/0137684 A1 | 6/2011 | Peak et al. |
| 2011/0143669 A1 | 6/2011 | Farrell et al. |
| 2011/0153367 A1 | 6/2011 | Amigo et al. |
| 2011/0160986 A1 | 6/2011 | Wu et al. |
| 2011/0161118 A1 | 6/2011 | Borden et al. |
| 2011/0163896 A1 | 7/2011 | Chinigo |
| 2011/0178695 A1 | 7/2011 | Okumoto et al. |
| 2011/0196644 A1 | 8/2011 | Davidson et al. |
| 2011/0205043 A1 | 8/2011 | Fujiki et al. |
| 2011/0205044 A1 | 8/2011 | Enomoto et al. |
| 2011/0210838 A1 | 9/2011 | Fujiki et al. |
| 2011/0225098 A1 | 9/2011 | Wolff et al. |
| 2011/0231055 A1 | 9/2011 | Knight et al. |
| 2011/0238457 A1 | 9/2011 | Mason et al. |
| 2011/0238543 A1 | 9/2011 | Paez et al. |
| 2011/0298638 A1 | 12/2011 | Groeneweg |
| 2012/0030133 A1 | 2/2012 | Rademaker |
| 2012/0095682 A1 | 4/2012 | Wilson |
| 2012/0116678 A1 | 5/2012 | Witmer |
| 2012/0226390 A1 | 9/2012 | Adams et al. |
| 2012/0232939 A1 | 9/2012 | Pierre et al. |
| 2012/0246192 A1 | 9/2012 | Kenyon |
| 2012/0253548 A1 | 10/2012 | Davidson |
| 2012/0253587 A1 | 10/2012 | Davidson |
| 2012/0253632 A1 | 10/2012 | Davidson |
| 2012/0253668 A1 | 10/2012 | Sheha et al. |
| 2012/0253861 A1 | 10/2012 | Davidson et al. |
| 2012/0253862 A1 | 10/2012 | Davidson |
| 2012/0253888 A1 | 10/2012 | Davidson |
| 2012/0253889 A1 | 10/2012 | Davidson et al. |
| 2012/0253892 A1 | 10/2012 | Davidson |
| 2013/0030873 A1 | 1/2013 | Davidson |
| 2013/0197776 A1 | 8/2013 | Davidson et al. |
| 2013/0245934 A1 | 9/2013 | Yagi |
| 2013/0297175 A1 | 11/2013 | Davidson |
| 2013/0304347 A1 | 11/2013 | Davidson |
| 2013/0304348 A1 | 11/2013 | Davidson et al. |
| 2013/0304349 A1 | 11/2013 | Davidson |
| 2014/0148970 A1* | 5/2014 | Dufford .................. G01C 21/00 701/1 |
| 2014/0188533 A1 | 7/2014 | Davidson |
| 2014/0278055 A1 | 9/2014 | Wang et al. |
| 2014/0358423 A1 | 12/2014 | Thiele et al. |
| 2015/0046062 A1 | 2/2015 | Davidson et al. |
| 2015/0161828 A1 | 6/2015 | Davidson |
| 2015/0170440 A1 | 6/2015 | Davidson et al. |
| 2015/0170514 A1 | 6/2015 | Stenneth |
| 2015/0179004 A1 | 6/2015 | Davidson et al. |
| 2015/0185031 A1 | 7/2015 | Davidson |
| 2015/0198451 A1 | 7/2015 | Davidson |
| 2015/0206356 A1 | 7/2015 | Davidson |
| 2015/0248795 A1 | 9/2015 | Davidson |
| 2015/0254592 A1 | 9/2015 | Davidson |
| 2015/0262433 A1 | 9/2015 | Davidson |
| 2016/0018239 A1 | 1/2016 | Ko et al. |
| 2016/0078758 A1 | 3/2016 | Basalamah |
| 2016/0125734 A1 | 5/2016 | Stenneth |
| 2016/0334221 A1 | 11/2016 | Davidson |

(56) References Cited

U.S. PATENT DOCUMENTS

| | | |
|---|---|---|
| 2016/0334225 A1 | 11/2016 | Davidson |
| 2016/0334227 A1 | 11/2016 | Davidson |

FOREIGN PATENT DOCUMENTS

| | | |
|---|---|---|
| DE | 102004061331 | 6/2006 |
| EP | 0 635 800 A1 | 1/1995 |
| EP | 0 977 450 A2 | 2/2000 |
| EP | 1113268 | 7/2001 |
| EP | 1 216 901 A1 | 6/2002 |
| EP | 1 229 508 | 8/2002 |
| EP | 1566665 | 8/2005 |
| FR | 2710767 | 9/1993 |
| FR | 2831665 | 10/2001 |
| GB | 2 225 459 A | 5/1990 |
| GB | 2 358 427 A | 7/2001 |
| GB | 2 363 884 A | 1/2002 |
| JP | 3251351 | 11/1991 |
| JP | H6-333117 | 12/1994 |
| JP | 07-199861 | 8/1995 |
| JP | 3062509 | 7/1999 |
| JP | 2000/059292 | 2/2000 |
| JP | 2000/295168 | 10/2000 |
| JP | 2001/024577 | 1/2001 |
| JP | 2001/218252 | 8/2001 |
| JP | 2001/278414 | 10/2001 |
| JP | 2002/112302 | 4/2002 |
| JP | 2002/335202 | 11/2002 |
| WO | WO 96/31846 | 10/1996 |
| WO | WO 01/91438 A1 | 11/2001 |
| WO | WO 03/014752 A1 | 2/2003 |
| WO | WO 03/081560 A1 | 10/2003 |
| WO | WO 2005/069203 | 7/2005 |
| WO | WO 2005/109273 A1 | 11/2005 |
| WO | WO 2006/065492 | 6/2006 |
| WO | WO 2010/030341 A1 | 3/2010 |
| WO | WO 2011/020101 A2 | 2/2011 |
| WO | WO 2011/036495 A2 | 3/2011 |

OTHER PUBLICATIONS

United States Patent and Trademark Office, Office Action for U.S. Appl. No. 14/133,258, Jun. 10, 2015, 68 pages, U.S.A.
United States Patent and Trademark Office, Office Action for U.S. Appl. No. 13/436,083, Jun. 9, 2015, 13 pages, U.S.A.
United States Patent and Trademark Office, Notice of Allowance for U.S. Appl. No. 13/940,742, Jun. 30, 2015, 15 pages, U.S.A.
United States Patent and Trademark Office, Office Action for U.S. Appl. No. 13/435,686, Jul. 1, 2015, 41 pages, U.S.A.
United States Patent and Trademark Office, Office Action for U.S. Appl. No. 13/435,592, Jul. 22, 2015, 26 pages, U.S.A.
United States Patent and Trademark Office, Office Action for U.S. Appl. No. 13/559,474, Jul. 27, 2015, 27 pages, U.S.A.
United States Patent and Trademark Office, Notice of Allowance for U.S. Appl. No. 13/307,997, Jul. 28, 2015, 16 pages, U.S.A.
United States Patent and Trademark Office, Office Action for U.S. Appl. No. 14/517,500, Aug. 25, 2015, 46 pages, U.S.A.
United States Patent and Trademark Office, Office Action for U.S. Appl. No. 14/633,802, Aug. 25, 2015, 38 pages, U.S.A.
International Searching Authority, International Search Report and Written Opinion for International Application No. PCT/US2014/034323, Nov. 7, 2014, 10 pages, United States Patent and Trademark Office, USA.
United States Patent and Trademark Office, Office Action for U.S. Appl. No. 13/940,789, Oct. 22, 2014, 41 pages, USA.
United States Patent and Trademark Office, Notice of Allowance and Fee(s) Due for U.S. Appl. No. 13/435,498, Nov. 3, 2014, 42 pages, USA.
United States Patent and Trademark Office, Office Action for U.S. Appl. No. 13/940,699, Nov. 5, 2014, 44 pages, USA.
United States Patent and Trademark Office, Office Action for U.S. Appl. No. 13/940,824, Nov. 20, 2014, 44 pages, USA.
United States Patent and Trademark Office, Corrected Notice of Allowability for U.S. Appl. No. 13/435,498, Dec. 10, 2014, 6 pages, USA.
United States Patent and Trademark Office, Office Action for U.S. Appl. No. 13/436,007, Dec. 2, 2014, 27 pages, USA.
"Oil Lasts Longer in Diesels, thanks to novel viscosity sensor", Dec. 14, 2006, pp. 1-3; http://machinedesign.com/ContentItem/57322/Oillastslongerindieselsthankstonovelviscositysensor.aspx.
"On—The New World of Communication: Notes: Tools for Precision: A Tool Kit to Optimize WCDMA Networks," www.ericsson.com/tems; date of publication unknown; one page, numbered p. 46.
"TEMS™—Making Wireless Better," by Ericcson; APAC Workshop (Sep. 2004); seventeen pages.
"TEMS™ Automatic WCDMA: Take Control of Your Mobile Internet Quality of Service," www.ericsson.com; Publication AE/LZT 123 6694 R1; date of publication unknown (copyright 2001); two pages.
"TEMS™ Automatic: Making Wireless Better: Take Control of Your Mobile Internet Quality of Service," www.ericsson.com/services/tems/_cdma/automatic-cdma.shtml; Oct. 19, 2004; two pages.
"TEMS™ Automatic: Streamlined Operations and Improved QoS: GSM/GPRS, CDMA, and TDMA," www.ericsson.com/tems; Publication 287 01-FAP 901 0409 B; date of publication unknown (copyright 2004); four pages.
"TEMS™ Drive Tester CDMA: An Innovative Drive Test Solution," www.ericsson.com/tems; Publication AE/LZT 123 7307, R3; date of publication unknown (copyright 2003); four pages.
"TEMS™ Drive Tester CDMA: An Innovative Drive Test Solution," www.ericsson.com/tems; Publication 287 01-FAP 901 0539 Uen; date of publication unknown (copyright 2005); four pages.
"TEMS™ Drivetester CDMA2000 2.0: An Innovative Drive Test solution for CDMA Networks," www.ericsson.com/products/_TEMSdrivetesterCDMA200020pos.shtml; date of publication unknown; one page.
"TEMS™ Tech Support: TEMS Automatic GSM: Making Wireless Better: Take Control of Your Mobile Internet Quality of Service," FAQ's www.ericsson.com/services/tems/support/automatic/sup_automatic_gsm.shtml; Nov. 5, 2004; three pages, version 3.2.1.
"TEMS™ Tech Support: TEMS DriveTester CDMA: Making Wireless Better: Instantly Isolate Network Trouble Spots," FAQ's www.ericsson.com/services/tems/support/drivetester/_sup_drivetester_cdma.shtml; Jun. 9, 2004; two pages; version 2.0.1.
"TEMS™ Tech Support: TEMS DriveTester GSM/TDMA: Making Wireless Better: Instantly Isolate Network Trouble Spots," www.ericsson.com/services/tems/support/drivetester/_sup_drivetester_gsm_tdma.shtml; May 13, 2004; two pages; version 1.1.1.
"TEMS™ Tech Support: TEMS LinkPlanner: Making Wireless Better: FAQ's, Import/Export:" www.ericsson.com/services/tems/support/_linkplanner/sup_linkplanner_faq_import.shtml; Aug. 26, 2004; two pages.
"TEMS™ Tech Support: TEMS LinkPlanner: Making Wireless Better: FAQ's: Map Data," www.ericsson.com/services/tems/support/_linkplanner/sup_linkplanner_faq_mapdata.shtml; date of publication unknown; one page.
"TEMS™ Tech Support: TEMS LinkPlanner: Making Wireless Better: FAQ's: General," www.ericsson.com/services/tems/support/_linkplanner/sup_linkplanner_faq_general.shtml; Sep. 10, 2004; one page.
Advanced Vehicle Telematics—Telogis Fleet, Telogis, Feb. 2010.
Bing.com/Maps—Bing Maps Platform—web pages Microsoft, Feb. 2010, Retrieved from Archive.org Jul. 19, 2013.
Canadian Intellectual Property Office, Examiner Requisition for Application No. 2,736,168, Jun. 12, 2013, 4 pages, Canada.
Cloin, Lauren, et al., Fleet Telematics Becoming a 'Must-Have' Automotive Fleet, Feb. 2007.
European Patent Office, Extended European Search Report for Application No. 09813349.9, Nov. 20, 2013, 6 pages, The Netherlands.
Geocortex Fleet Tracker User Guide Latitude Geographies Group, Ltd. Nov. 2010.

(56) References Cited

OTHER PUBLICATIONS

Golias, Mihalis, et al., GPS/GIS Analysis of Tennessee Truck Trips The Univerity of Memphis, Dec. 7, 2012.
Hedin, Lars-Göran, Editor; "On: The New World of Communication," an Ericsson global customer magazine (Mar. 2002); sixteen pages.
Howard County Bureau of Highways Web-enabled Snowplow Tracking System, Howard County Maryland, 1999.
International Preliminary Report on Patentability for Application No. PCT/US2005/000729 dated Jul. 17, 2006.
International Preliminary Report on Patentability for Application No. PCT/US2005/000789 dated Jul. 17, 2006.
International Preliminary Report on Patentability for Application No. PCT/US2009/004978, dated Dec. 23, 2010.
International Preliminary Report on Patentability for Application No. PCT/US2009/005049 dated Aug. 20, 2010.
International Preliminary Report on Patentability for Application No. PCT/US2009/056063, dated Dec. 23, 2010.
International Search Report and Written Opinion for PCT/US2005/000729 dated Jan. 10, 2006.
International Search Report and Written Opinion for PCT/US2005/000789 dated Jan. 10, 2006.
International Search Report and Written Opinion from International Application No. PCT/US2009/004978 mailed Jan. 12, 2010.
International Search Report and Written Opinion from International Application No. PCT/US09/05049 mailed Oct. 28, 2009.
International Search Report and Written Opinion from International Application No. PCT/US2009/056063 mailed Jan. 12, 2010.
International Search Report for PCT/US2005/000789 dated Oct. 26, 2005.
International Searching Authority, International Search Report and Written Opinion for International Application No. PCT/US2012/048405, Dec. 19, 2012, 10 pages, United States Patent and Trademark Office, USA.
International Searching Authority, International Search Report and Written Opinion for International Application No. PCT/US2012/031172, Dec. 27, 2012, 11 pages, United States Patent and Trademark Office, USA.
Kruse, John, Snow and Ice go High-Tech, Mobile Radio Technology, Oct. 1, 1999.
Lenarcic, Robert, Off the Shelf Approach to ArcGIS Server & The Dashboard Approach to Gaining Insight to ArcGIS Server Latitude Geographies Group Ltd., Northeast Arc Users Group, NEARC, 2008.
Lo, Grace, Introduction to ArcGIS Tracking Analyst, Texas A&M University, Dec. 2007.
Ma, Xiaolei, et al., Processing Commercial GPS Data to Develop a Web-Based Truck Performance Measures Program, University of Washington, Mar. 15, 2011.
McCormack, Edward D., Developing a GPS-Based Truck Freight Performance Measure Platform, Washington State Department of Transportation, Apr. 2010.
McLean, Brett, Tracking Geocortex Fleet Tracker, Geocortex Blog, Aug. 24, 2009.
Murphy, Jean V., "Yard Management Systems Extend Automation Beyond the Dock Door", SupplyChainBrain.com, Mar. 2005, Global Logistic & Supply Chain Strategies.
Notice of Allowance and Fees Due for U.S. Appl. No. 12/556,140 mailed May 4, 2012.
Notice of Allowance and Fees Due from U.S. Appl. No. 12/254,031 mailed Mar. 30, 2009.
Office Action from U.S. Appl. No. 12/254,031 mailed Jan. 15, 2009.
On the Go FedEx GIS Tracking Operations ESRI, 2011.
Resource Optimization & Scheduling—Telogis Route, Telogis, Feb. 2010.
Scapinakis, Dimitris, et al., Communications and Positioning Systems in the Motor Carrier Industry, Institute of Transportation Studies, University of California at Berkley, Research Reports, California Partners for Advanced, Transit and Highways (PATH), Institute of Transportation Studies (UCB), UC Berkeley, Jan. 1, 1992.
Sigler, Lisa, Editor; TEMS an Ericsson Newsletter (No. 2, Jun. 2003); eight pages.
Sigler, Lisa, Editor; TEMS an Ericsson Newsletter (No. 2, Q2 2004); eight pages.
Sigler, Lisa, Editor; TEMS an Ericsson Newsletter (No. 3, Q3 2004); eight pages.
Sigler, Lisa; "Assess speech quality with PESQ, now in TEMSTm Automatic;" date of publication unknown; one page.
State Intellectual Property Office of the P.R.C., Third Office Action for Chinese Application No. 200980135226.X, dated Jan. 9, 2014, 7 pages, China.
State Intellectual Property Office of the People's Republic of China, Second Office Action for Application No. 200980135226.X, Mar. 1, 2013, 4 pages, China.
Tai, Hideo, "Urban Gas Monitoring System Using Optical Sensors," Proceedings of the SPIE, Jan. 1999,vol. 3746, pp. 332-336.
Telogis Announces OnTrack 7, Delivering the Latest in Saas GPS Fleet Management Software, Directions Magazine, Oct. 8, 2009.
Telogis Introduces New Advanced Scaleable Fleet Management Platform to European Markets: Telogis 8, Directions Magazine, Dec. 14, 2010.
Telogis, a GPS Fleet Tracking and Productivity Software Provider Launches New Brand and Web Site, Directions Magazine, May 21, 2007.
Telogis.com web pages, Telogis, Inc., Oct. 2007, Retrieved from Archive.org Feb. 4, 2013.
United States Patent and Trademark Office, Notice of Allowance for U.S. Appl. No. 12/556,140, dated Dec. 12, 2012, 9 pages, USA.
United States Patent and Trademark Office, Office Action for U.S. Appl. No. 13/436,007, dated Apr. 10, 2013, 36 pages, USA.
United States Patent and Trademark Office, Office Action for U.S. Appl. No. 13/435,831, dated Nov. 21, 2012, 33 pages, USA.
United States Patent and Trademark Office, Office Action for U.S. Appl. No. 13/435,934, Feb. 15, 2013, 48 pages, USA.
United States Patent and Trademark Office, Office Action for U.S. Appl. No. 13/307,997, May 16, 2013, 60 pages, USA.
United States Patent and Trademark Office, Office Action for U.S. Appl. No. 13/559,474, Nov. 29, 2013, 52 pages, USA.
United States Patent and Trademark Office, Office Action for U.S. Appl. No. 13/799,627, May 30, 2013, 12 pages, USA.
United States Patent and Trademark Office, Office Action for U.S. Appl. No. 13/799,627, Jan. 6, 2014, 37 pages, USA.
United States Patent and Trademark Office, Office Action for U.S. Appl. No. 13/307,997, Jan. 17, 2014, 40 pages, USA.
United States Patent and Trademark Office, Office Action for U.S. Appl. No. 13/435,934, Jul. 25, 2013, 31 pages, USA.
United States Patent and Trademark Office, Office Action for U.S. Appl. No. 13/435,755, Aug. 2, 2013, 42 pages, USA.
United States Patent and Trademark Office, Office Action for U.S. Appl. No. 13/435,498, Sep. 13, 2013, 20 pages, USA.
United States Patent and Trademark Office, Office Action for U.S. Appl. No. 13/436,083, Sep. 13, 2013, 38 pages, USA.
United States Patent and Trademark Office, Office Action for U.S. Appl. No. 13/436,007, Sep. 26, 2013, 25 pages, USA.
United States Patent and Trademark Office, Office Action for U.S. Appl. No. 13/435,831, Oct. 11, 2013, 25 pages, USA.
Users Guide to ROADNET 5000—Routing & Scheduling System, Version 5.6, Roadnet Technologies, Inc., A United Parcel Service Company, 1996.
Wheeler, Nikki, et al., Multi-Criteria Trucking Freeway Performance Measures in Congested Corridors, Portland State University, Jan. 23-27, 2011.
Wischoff, et al., "SOTIS—a Self-Organizing Traffic Information System," VTC 2003-Spring, the 57th IEEE Semiannual Vehicular Technology Conference, Jeju Korea Apr. 22-25, 2003, vol. 4, pp. 2442-2446.
United States Patent and Trademark Office, Notice of Allowance for U.S. Appl. No. 13/940,789, Jan. 22, 2015, 9 pages, USA.
United States Patent and Trademark Office, Notice of Allowance for U.S. Appl. No. 13/940,699, Feb. 2, 2015, 9 pages, USA.

(56) References Cited

OTHER PUBLICATIONS

United States Patent and Trademark Office, Notice of Allowance for U.S. Appl. No. 13/940,824, Feb. 18, 2015, 9 pages, USA.
United States Patent and Trademark Office, Office Action for U.S. Appl. No. 13/435,686, Dec. 26, 2014, 36 pages, USA.
United States Patent and Trademark Office, Office Action for U.S. Appl. No. 13/436,083, Dec. 29, 2014, 9 pages, USA.
United States Patent and Trademark Office, Office Action for U.S. Appl. No. 13/435,831, Dec. 29, 2014, 27 pages, USA.
United States Patent and Trademark Office, Office Action for U.S. Appl. No. 13/435,592, Jan. 16, 2015, 16 pages, USA.
United States Patent and Trademark Office, Office Action for U.S. Appl. No. 13/559,474, Feb. 23, 2015, 27 pages, USA.
United States Patent and Trademark Office, Office Action for U.S. Appl. No. 13/307,997, Feb. 20, 2015, 47 pages, USA.
United States Patent and Trademark Office, Office Action for U.S. Appl. No. 13/940,742, Mar. 3, 2015, 46 pages, USA.
European Patent Office, Communication Pursuant to Article 94(3) EPC for Application No. 09813349.9, Aug. 29, 2014, 7 pages, The Netherlands.
United States Patent and Trademark Office, Office Action for U.S. Appl. No. 13/436,007, Aug. 11, 2014, 31 pages, USA.
United States Patent and Trademark Office, Office Action for U.S. Appl. No. 13/435,831, Aug. 14, 2014, 21 pages, USA.
United States Patent and Trademark Office, Office Action for U.S. Appl. No. 13/435,686, Aug. 14, 2014, 69 pages, USA.
United States Patent and Trademark Office, Office Action for U.S. Appl. No. 13/435,934, Sep. 17, 2014, 36 pages, USA.
United States Patent and Trademark Office, Supplemental Notice of Allowability for U.S. Appl. No. 13/799,627, Sep. 3, 2014, 3 pages, USA.
Hillier, Amy, "ArcGIS 9.3 Manual", SelectedWorkds by Amy Hiller, Jan. 2007, University of Pennsylvania, 110 pages, USA.
"White Paper: Business Value Through Fleet Management Optimization", Cadec Global, Inc., Nov. 2007, 19 pages.
Schueneman, Thomas, "Brown Continues Getting Greener: Telematics Helps UPS Squeeze Out Higher Efficiencies and Increased Safety", May 7, 2008, Triplepundit.com, retrieved on Sep. 11, 2014.
"ArcGIS9—ArcMap Tutorial", ESRI, 2008, 58 pages, USA.
Scott, L.M., et al., "A.1 Spatial Statistics in ArcGIS", *Handbook of Applied Spatial Analysis: Software Tools, Methods and Applications*, 2010, pp. 27-41, Springer.
Cooney, Ryan, "Tracking Geocortex Fleet Tracker", *Geocortex Blog*, Aug. 24, 2009, 1 page, retrieved from <http://blog.geocortex.com/2009/08/24/tracking-geocortex-fleet-tracker/> on Sep. 25, 2014.
United States Patent and Trademark Office, Office Action for U.S. Appl. No. 13/435,755, Apr. 2, 2015, 24 pages, USA.
United States Patent and Trademark Office, Office Action for U.S. Appl. No. 13/435,934, Apr. 16, 2015, 36 pages, USA.
United States Patent and Trademark Office, Office Action for U.S. Appl. No. 13/436,007, May 15, 2015, 25 pages, USA.
European Patent Office, Extended European Search Report for Application No. 12743628.5, Feb. 27, 2015, 5 pages, Germany.
International Preliminary Examining Authority, International Preliminary Report on Patentability for International Application No. PCT/US2014/034323, Apr. 23, 2015, 18 pages, United States Patent and Trademark Office, USA.
United States Patent and Trademark Office, Office Action for U.S. Appl. No. 13/435,755, Apr. 3, 2014, 24 pages, USA.
United States Patent and Trademark Office, Office Action for U.S. Appl. No. 13/436,083, May 6, 2014, 11 pages, USA.
United States Patent and Trademark Office, Office Action for U.S. Appl. No. 13/435,592, Jun. 3, 2014, 51 pages, USA.
United States Patent and Trademark Office, Office Action for U.S. Appl. No. 13/435,498, Jun. 16, 2014, 19 pages, USA.
United States Patent and Trademark Office, Office Action for U.S. Appl. No. 13/559,474, Jun. 18, 2014, 20 pages, USA.

United States Patent and Trademark Office, Notice of Allowance for U.S. Appl. No. 13/799,627, Jul. 18, 2014, 7 pages, USA.
Barringer & Associates, Inc., Pareto Principle (available at http://www.barringer1.com/anvil_files/anvi104.htm) captured Sep. 8, 2008.
European Patent Office, Communication pursuant to Article 94(3) EPC for Application No. 12743628.5, Nov. 2, 2015, 6 pages, Germany.
European Patent Office, Extended European Search Report for Application No. 12717936.4, Nov. 9, 2015, 7 pages, Germany.
United States Patent and Trademark Office, Notice of Allowance for U.S. Appl. No. 14/633,802, Dec. 23, 2015, 9 pages, U.S.A.
United States Patent and Trademark Office, Office Action for U.S. Appl. No. 13/435,831, Jan. 20, 2016, 30 pages, U.S.A.
United States Patent and Trademark Office, Office Action for U.S. Appl. No. 13/435,592, Jan. 21, 2016, 32 pages, U.S.A.
Canadian Intellectual Property Office, Requisition by the Examiner for Application No. 2,842,842, Oct. 6, 2015, 6 pages, Canada.
Kruse, John, "Snow and ice go high-tech", MRT, Oct. 1, 1999, 3 pages, retrieved from <http://preview.mrtmag.com/mag/radio_snow_ice_go/> on Sep. 24, 2015.
Sisiopiku, Virginia P., et al., "Winter Road Maintenance—ITS Options", 2001 IEEE Intelligent Transportation Systems Conference Proceedings, Aug. 25-29, 2001, pp. 298-302, IEEE, U.S.A.
United States Patent and Trademark Office, Notice of Allowance for U.S. Appl. No. 13/436,007, Sep. 30, 2015, 12 pages, U.S.A.
United States Patent and Trademark Office, Office Action for U.S. Appl. No. 13/435,755, Oct. 10, 2015, 25 pages, U.S.A.
United States Patent and Trademark Office, Office Action for U.S. Appl. No. 13/435,934, Oct. 16, 2015, 46 pages, U.S.A.
United States Patent and Trademark Office, Office Action for U.S. Appl. No. 14/133,258, Nov. 12, 2015, 22 pages, U.S.A.
United States Patent and Trademark Office, Office Action for U.S. Appl. No. 13/435,686, Nov. 23, 2015, 42 pages, U.S.A.
United States Patent and Trademark Office, Office Action for U.S. Appl. No. 14/517,500, Feb. 8, 2016, 13 pages, U.S.A.
United States Patent and Trademark Office, Office Action for U.S. Appl. No. 13/435,934, Mar. 4, 2016, 18 pages, U.S.A.
United States Patent and Trademark Office, Office Action for U.S. Appl. No. 14/633,603, Apr. 14, 2016, 44 pages, U.S.A.
Canadian Intellectual Property Office, Requisition by the Examiner for Application No. 2, 831,712, Apr. 26, 2016, 4 pages, Canada.
International Searching Authority, International Search Report and Written Opinion for Application No. PCT/US2016/022272, Jun. 3, 2016, 10 pages, European Patent Office, The Netherlands.
State Intellectual Property Office of the P.R.C., First Office Action for Application No. 201280046510.1, May 17, 2016, 17 pages, China.
United States Patent and Trademark Office, Office Action for U.S. Appl. No. 13/435,592, Jun. 2, 2016, 32 pages, U.S.A.
United States Patent and Trademark Office, Office Action for U.S. Appl. No. 13/435,934, Jul. 21, 2016, 21 pages, U.S.A.
United States Patent and Trademark Office, Office Action for U.S. Appl. No. 14/517,500, Jun. 16, 2016, 11 pages, U.S.A.
United States Patent and Trademark Office, Office Action for U.S. Appl. No. 14/639,740, Jul. 13, 2016, 49 pages, U.S.A.
Canadian Intellectual Property Office, Requisition by the Examiner for Application No. 2,736,168, Aug. 9, 2016, 6 pages, Canada.
International Searching Authority, International Search Report and Written Opinion for International Application No. PCT/US2016/020392, Jun. 6, 2016, 12 pages, European Patent Office, Netherlands.
U.S. Appl. No. 61/449,044, "History Timeline Display for Multiple Vehicles", Unpublished (filed Mar. 3, 2011), (Mark Freyer, Inventor) (Telogis, Inc., assignee).
United States Patent and Trademark Office, Office Action for U.S. Appl. No. 14/620,443, Jul. 29, 2016, 16 pages, U.S.A.
United States Patent and Trademark Office, Office Action for U.S. Appl. No. 14/667,042, Aug. 3, 2016, 54 pages, U.S.A.
United States Patent and Trademark Office, Office Action for U.S. Appl. No. 14/670,464, Aug. 29, 2016, 53 pages, U.S.A.
United States Patent and Trademark Office, Notice of Allowance for U.S. Appl. No. 14/633,603, Aug. 22, 2016, 8 pages, U.S.A.

(56) References Cited

OTHER PUBLICATIONS

Canadian Intellectual Property Office, Requisition by the Examiner for Application No. 2,917,808, Aug. 30, 2016, 3 pages, Canada.
Canadian Intellectual Property Office, Requisition by the Examiner for Application No. 2,842,842, Oct. 12, 2016, 4 pages, Canada.
United States Patent and Trademark Office, Office Action for U.S. Appl. No. 14/133,258, Sep. 7, 2016, 20 pages, U.S.A.
United States Patent and Trademark Office, Office Action for U.S. Appl. No. 13/435,831, Oct. 14, 2016, 28 pages, U.S.A.
United States Patent and Trademark Office, Office Action for U.S. Appl. No. 14/711,806, Nov. 4, 2016, 51 pages, U.S.A.
United States Patent and Trademark Office, Office Action for U.S. Appl. No. 14/517,500, Nov. 16, 2016, 12 pages, U.S.A.
United States Patent and Trademark Office, Notice of Allowance for U.S. Appl. No. 13/435,755, Nov. 18, 2016, 28 pages, U.S.A.
United States Patent and Trademark Office, Notice of Allowance for U.S. Appl. No. 14/667,042, Nov. 22, 2016, 10 pages, U.S.A.
European Patent Office, Summons to Attend Oral Proceedings pursuant to Rule 115(1) EPC for Application No. 12743628.5, Oct. 24, 2016, 7 pages, Germany.
State Intellectual Property Office of the P.R.C., Second Office Action for Application No. 201280046510.1, Nov. 22, 2016, 17 pages, China.
United States Patent and Trademark Office, Office Action (Corrected Notice of Allowability) for U.S. Appl. No. 14/667,042, Dec. 13, 2016, 7 pages, U.S.A.
United States Patent and Trademark Office, Office Action for U.S. Appl. No. 13/435,592, Dec. 1, 2016, 34 pages, U.S.A.
United States Patent and Trademark Office, Office Action for U.S. Appl. No. 14/708,648, Jan. 4, 2017, 54 pages, U.S.A.
United States Patent and Trademark Office, Office Action for U.S. Appl. No. 14/708,624, Jan. 4, 2017, 50 pages, U.S.A.
United States Patent and Trademark Office, Office Action for U.S. Appl. No. 14/708,473, Jan. 4, 2017, 50 pages, U.S.A.
United States Patent and Trademark Office, Office Action for U.S. Appl. No. 13/435,934, Jan. 12, 2017, 9 pages, U.S.A.
United States Patent and Trademark Office, Notice of Allowance for U.S. Appl. No. 14/639,740, Jan. 20, 2017, 12 pages, U.S.A.
United States Patent and Trademark Office, Corrected Notice of Allowability for U.S. Appl. No. 14/639,740, Feb. 15, 2017, 7 pages, U.S.A.
United States Patent and Trademark Office, Notice of Allowance for U.S. Appl. No. 14/517,500, Mar. 10, 2017, 9 pages, U.S.A.
United States Patent and Trademark Office, Notice of Allowance for U.S. Appl. No. 14/133,258, Feb. 23, 2017, 16 pages, U.S.A.
United States Patent and Trademark Office, Office Action for U.S. Appl. No. 14/716,160, Jan. 27, 2017, 52 pages, U.S.A.
United States Patent and Trademark Office, Office Action for U.S. Appl. No. 14/716,160, Apr. 3, 2017, 6 pages, U.S.A.
United States Patent and Trademark Office, Office Action for U.S. Appl. No. 14/670,464, Feb. 7, 2017, 14 pages, U.S.A.
United States Patent and Trademark Office, Office Action for U.S. Appl. No. 14/620,443, Feb. 15, 2017, 18 pages, U.S.A.
United States Patent and Trademark Office, Office Action for U.S. Appl. No. 13/435,592, Mar. 23, 2017, 39 pages, U.S.A.
United States Patent and Trademark Office, Office Action for U.S. Appl. No. 14/667,042, Feb. 7, 2017, 8 pages, U.S.A.
Notice of Allowance and Fees Due (PTOL-85) dated Jun. 21, 2017 for U.S. Appl. No. 13/435,934.
Notice of Allowance and Fees Due (PTOL-85) dated Jul. 13, 2017 for U.S. Appl. No. 14/670,464.
International Preliminary Examining Authority, Written Opinion (Second) for International Application No. PCT/US2016/022272, dated May 12, 2017, European Patent Office, 5 pages.
Final Rejection dated May 15, 2017 for U.S. Appl. No. 14/711,806.
Final Rejection dated May 5, 2017 for U.S. Appl. No. 13/435,831.
Final Rejection dated Jul. 25, 2017 for U.S. Appl. No. 14/708,473.
Final Rejection dated Jul. 12, 2017 for U.S. Appl. No. 14/708,648.
Final Rejection dated Jul. 11, 2017 for U.S. Appl. No. 14/708,624.
Final Rejection dated Jul 10, 2017 for U.S. Appl. No. 14/716,160.
English Translation of CN Office Action dated May 17, 2017 for CN Application No. 201280046510.
Communication from the Examining Division dated May 12, 2017 for EP Application No. 12743628.
CN Office Action dated May 17, 2017 for CN Application No. 201280046510.
Notice of Allowance and Fees Due (PTOL-85) dated Sep. 7, 2017 for U.S. Appl. No. 13/436,083.
Notice of Allowance and Fees Due (PTOL-85) dated Aug. 31, 2017 for U.S. Appl. No. 14/711,806.
Notice of Allowance and Fees Due (PTOL-85) dated Aug. 25, 2017 for U.S. Appl. No. 14/670,464.
Notice of Allowance and Fees Due (PTOL-85) dated Aug. 16, 2017 for U.S. Appl. No. 14/620,443.
English Translation of CN Office Action dated Jul. 20, 2017 for CN Application No. 201280025670.
CN Office Action dated Jul. 20, 2017 for CN Application No. 201280025670.
(IPEA/408) Written opinion under Chapter II dated Aug. 3, 2017 for WO Application No. PCT/US16/022272.

* cited by examiner

SYSTEMS AND METHODS FOR ASSESSING TURNS MADE BY A VEHICLE

BACKGROUND OF THE INVENTION

Field of the Invention

Various embodiments of the present invention described herein generally relate to efficiency management systems for identifying and analyzing turns made by at least one vehicle.

Description of Related Art

Improving operational efficiency has become an increasingly high priority for many businesses. In particular, the increasing cost of energy resources, such as fuel, and recent trends toward improving environmental sustainability have made reducing the consumption of energy resources essential for many businesses to maintain a competitive advantage in their respective industries. Likewise, volatile economic climates have increased competition in various industry sectors and prompted competing businesses to provide better services at a lower cost. As a result, many businesses are searching for ways to improve their operational efficiency in order to reduce costs and provide improved service to customers.

As business emphasis on operational efficiency has grown, so too has the development of technology capable of monitoring various operational characteristics. For example, businesses can use GPS (or other GNSS systems) and RFID technology to track the location of people, vehicles, and items and generate data representative of those locations in relation to time. In addition, telematics devices are currently used in vehicles to capture information relating to various vehicle dynamics, such as fuel consumption and location.

Although such technology allows businesses to capture large amounts of operational data reflecting a variety of operational characteristics, many businesses are unable to effectively utilize such data to improve efficiencies. This problem is commonly the result of an inability to effectively translate otherwise overwhelming amounts of data into a format that is meaningful in the context of analyzing a particular efficiency. Thus, there is a need in the art for improved systems and methods for capturing and evaluating operational data in order to improve operational efficiencies in a variety of business contexts.

BRIEF SUMMARY OF THE INVENTION

Various embodiments of the present invention are generally directed to a system for assessing turns made by at least one vehicle. According to various embodiments, the system comprises one or more memory storage areas; and one or more processors in communication with said one or more memory storage areas. The processors are, collectively, configured to: receive vehicle telematics data indicative of a travel path of the vehicle during one or more time periods; identify, based at least in part on said vehicle telematics data, one or more turns executed by the vehicle during the one or more time periods, the one or more turns each comprising instances in which the vehicle executes a turn in order to change from (i) traveling in a first roadway direction on a first road to (ii) traveling on a second road or traveling in a second roadway direction on the first road; and determine for each identified turn a turn segment comprising a beginning turn point and an ending turn point, the time elapsed between the beginning turn point and ending turn point defining the duration of the turn segment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

The present invention will now be described more fully hereinafter with reference to the accompanying drawings, in which some—but not all—embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the invention set forth herein will come to mind to one skilled in the art to which this invention pertains having the benefit of the teachings presented in the descriptions herein and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Overview

Figure 1:
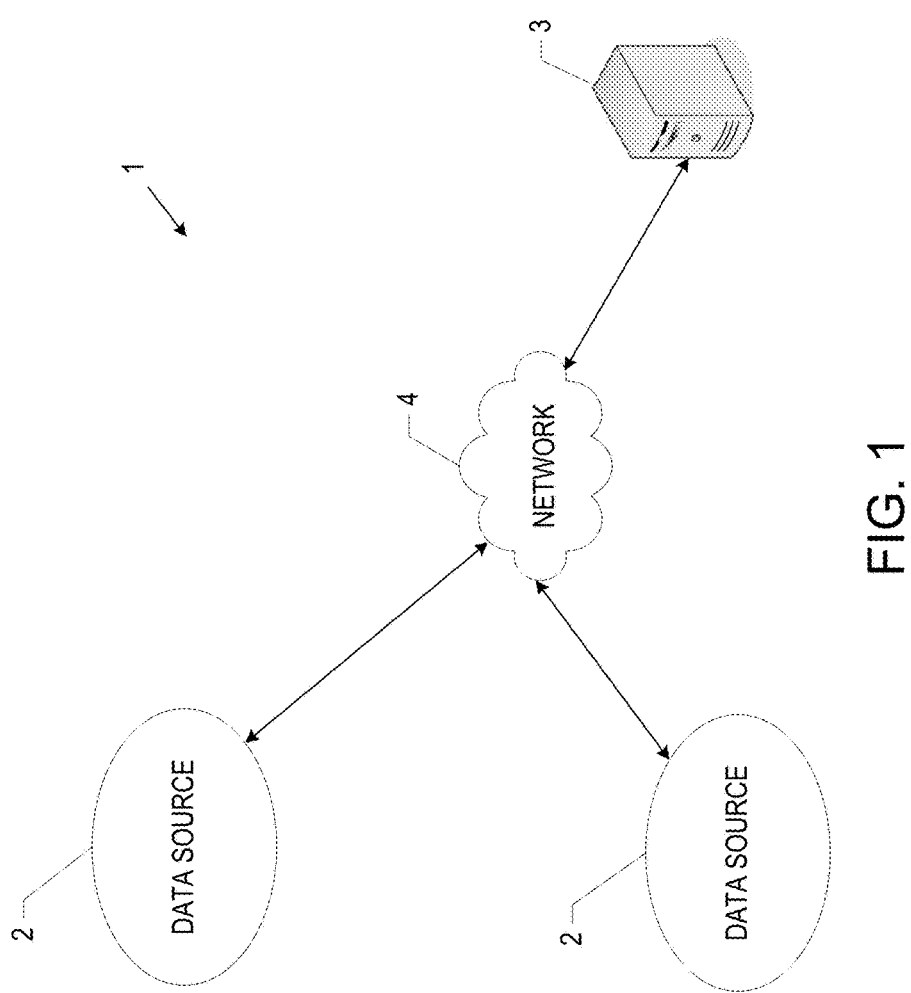
FIG. 1 is a block diagram of an efficiency management system according to one embodiment of the present invention.

According to various embodiments of the present invention, an efficiency management system is provided for evaluating various operational efficiencies based on operational data. FIG. 1 illustrates the high-level system architecture of an efficiency management system 1 according to various embodiments. As shown, the efficiency management system 1 includes one or more data sources 2 and a central server 3. The data sources 2 may be, for example, devices configured for capturing and communicating operational data indicative of one or more operational characteristics (e.g., a telematics device capturing telematics data from a vehicle). The data sources 2 are configured to communicate with the central server 3 by sending and receiving operational data over a network 4 (e.g., the Internet, an Intranet, or other suitable network). The central server 3 is configured to process and evaluate operational data received from the data sources 2 in accordance with user input received via a user interface (e.g., a graphical user interface provided on a local or remote computer). For example, in certain embodiments, the central server 3 is configured for segmenting operational data according to various operational activities, identifying various undesirable or inefficient activities or occurrences based on the operational data, and/or generating a graphical presentation based on the operational data that displays operational activities in the context of other efficiency-indicative data.

As discussed in greater detail below, the components and general system architecture of the efficiency management system 1 illustrated in FIG. 1 may be adapted for use in specific environments. For example, in certain embodiments, the efficiency management system is configured as a "fleet management system" adapted for evaluating and managing a fleet of vehicles (e.g., a fleet of delivery vehicles operated by a shipping entity, a fleet of taxis or buses operated by a private or public transportation entity). In such embodiments, the data sources may comprise telematics devices positioned on various vehicles in the fleet, as well as mobile service devices operated at least in part by operators of the fleet vehicles. Likewise, the central server may be configured for evaluating telematics data received from the telematics devices in order to assess vehicle efficiency and other logistical efficiencies. In addition, the central server may be configured for providing graphical presentations of telematics data in efficiency-indicative formats, as well as for updating GPS-based maps based on vehicle telematics data.

The following description provides a detailed explanation of certain embodiments of the efficiency management system, including the aforementioned fleet management system. As will be appreciated from the detailed description herein, the various components and features of these systems may be modified and adapted to assess efficiencies in a variety of operational contexts.

Fleet Management System

According to various embodiments, a fleet management system is provided for capturing and storing operational data for a fleet of vehicles, and for evaluating the operational data in order to assess various fleet efficiencies and improve the overall operational efficiency of the fleet. The fleet management system may be used, for example, by a shipping entity (e.g., United Parcel Service, Inc., FedEx Corp., or the United States Postal Service) to evaluate the efficiency of a fleet of vehicles used to deliver freight or packages. As described in detail below, various embodiments of the fleet management system are configured to capture operational data from the fleet—including telematics data from fleet vehicles—and evaluate the captured operational data in order to identify inefficient operations. As a particular example, the efficiency management system is configured to evaluate telematics data captured from one or more vehicles to evaluate the operational efficiency of turns made by a vehicle during a particular time period, along a particular travel route, and/or within a particular geographic area. As will be appreciated from the description herein, this and other system attributes allow the fleet management system to assist vehicle fleet managers (e.g., shipping entities) in improving the operating efficiency of their fleet.

Figure 2:
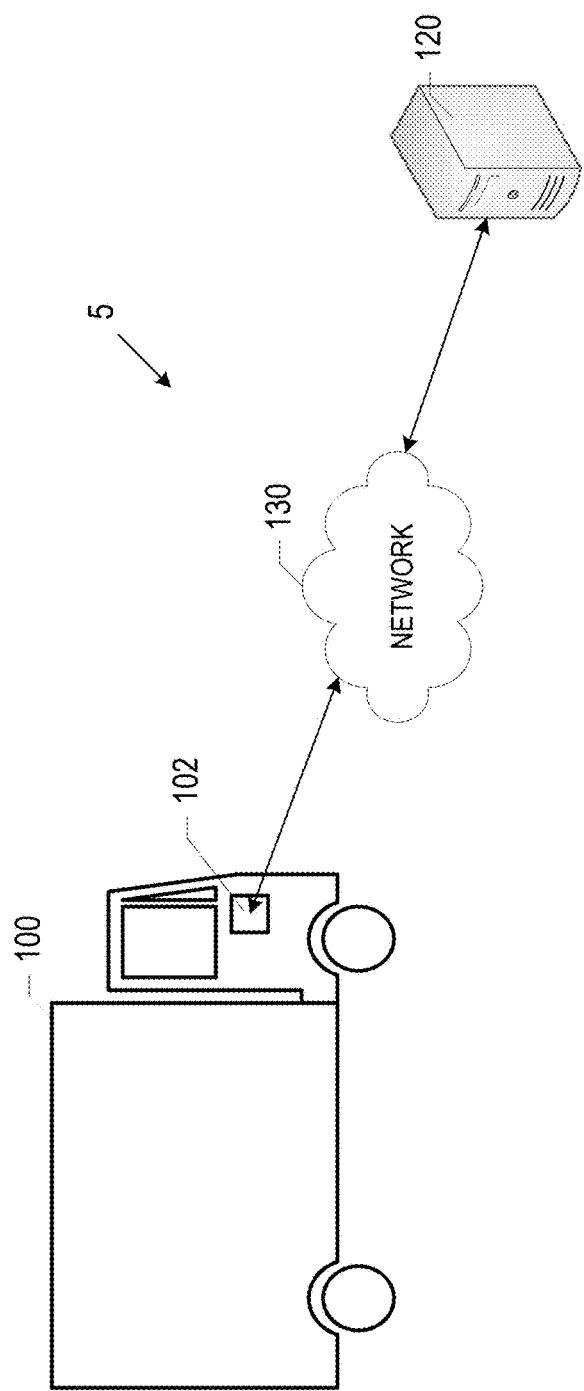
FIG. 2 is a block diagram of a fleet management system according to one embodiment of the present invention.

Fleet Management System Architecture FIG. 2 shows the system architecture of a fleet management system 5 according to various embodiments. In the illustrated embodiment, the fleet management system 5 comprises a vehicle telematics device 102 positioned on a delivery vehicle 100 and a central server 120. The telematics device 102 and the central server 120 are configured to communicate with each other via a communications network 130 (e.g., the Internet, an Intranet, a cellular network, or other suitable network). In addition, the telematics device 102 and central server 120 are configured for storing data to an accessible central server database (not shown) located on, or remotely from, the central server 120.

In the description provided herein, the fleet management system 5 may be configured for managing and evaluating the operation of a large fleet of delivery vehicles. As such, in various embodiments, the fleet management system 5 may further comprise a plurality of telematics devices 102, each being associated with one of a plurality of delivery vehicles 100. While the detailed description of the fleet management system's components is provided below with reference to individual components or devices, it will be understood from the description herein that various embodiments of the fleet management system 5 may include a plurality of the components each configured as described below. For example, large-scale embodiments of the fleet management system may include thousands of telematics devices 102 each capturing data from a unique delivery vehicle 100 and transmitting the captured data to multiple servers 120. In addition, as will be appreciated from the description herein, the fleet management system 5 may be adapted for managing and evaluating a fleet of vehicles in a variety of contexts, such as a fleet of taxis, buses, and other service vehicles. Accordingly, the telematics device 102 represents one embodiment of a telematics device that may be adapted for providing telematics data for a fleet of vehicles.

In the illustrated embodiment of FIG. 2, the delivery vehicle 100 includes a plurality of vehicle sensors configured for generating telematics data indicative of various vehicle dynamics, such as engine ignition, engine speed, vehicle speed, vehicle location, vehicle heading, and the status of various vehicle components. The vehicle sensors may be controlled by the telematics device 102, which may be positioned on or within the vehicle 100. In controlling the various vehicle sensors, the telematics device 102 is able to capture and store telematics data from the various vehicle sensors according to a programmed logic and associate the captured telematics data with contextual data (e.g., date, time, location). The captured telematics data and contextual data may then be transmitted by the telematics device 102 directly to the central server 120 via the network 130, or to another computing device (which may later transmit the data to the central server 120 itself).

According to various embodiments, the central server 120 is generally configured for evaluating operational data (e.g., telematics data) for a fleet of vehicles in order to assess various fleet efficiencies and aid fleet management system 5 users in managing the fleet. As shown in FIG. 2, the central server 120 may be configured for receiving and storing telematics data from the telematics device 102 over the network 130. By collecting such operational data over a period of time from various telematics devices 102—which may be associated with a fleet of vehicles 100—the central server 120 is able to amass operational data reflecting the overall operations of the fleet. As will be described in greater detail below, the central server 120 may be configured for evaluating telematics data, presenting the data to a user, and evaluating the data in a variety of ways in order to improve the operating efficiency of the fleet of vehicles 100.

The various components of the fleet management system 5 are now described in detail below according to various embodiments.

Network

According to various embodiments of the present invention, the communications network 130 may be capable of supporting communication in accordance with any one or more of a number of second-generation (2G), 2.5G, third-generation (3G), and/or fourth-generation (4G) mobile communication protocols or the like. More particularly, the network 130 may be capable of supporting communication in accordance with 2G wireless communication protocols IS-136 (TDMA), GSM, and IS-95 (CDMA). Also, for example, the network 130 may be capable of supporting communication in accordance with 2.5G wireless communication protocols GPRS, Enhanced Data GSM Environment (EDGE), or the like. In addition, for example, the network 130 can be capable of supporting communication in accordance with 3G wireless communication protocols such as Universal Mobile Telephone System (UMTS) network employing Wideband Code Division Multiple Access (WCDMA) radio access technology. As yet another example, the network 130 may support communication between the fleet management system 5 components (e.g., the telematics device 102) in accordance with techniques such as, for example, radio frequency (RF), Bluetooth™, infrared (IrDA), or any of a number of different wireless networking techniques, including Wireless LAN (WLAN) techniques.

Vehicle Sensors

As noted above, in various embodiments the delivery vehicle 100 is equipped with a variety of vehicle sensors capable of generating vehicle telematics data. For example, in one embodiment, the vehicle 100 includes sensors configured to make measurements and capture data pertaining to the following vehicle dynamics: engine ignition (e.g., on or off), engine speed (e.g., RPM and idle time events), vehicle speed (e.g., miles per hour), seat belt status (e.g., engaged or disengaged), vehicle heading (e.g., degrees from center), vehicle backing (e.g., moving in reverse or not moving in reverse), vehicle door status (e.g., open or closed), vehicle handle status (e.g., grasped or not grasped by a driver), vehicle location (e.g., GPS coordinates; latitude and longitude), distance traveled (e.g., miles between two points), throttle position, brake pedal position, parking brake position, distance or time since last maintenance, and various engine measurements (e.g., engine oil pressure, engine temperature, and engine faults). In various other embodiments, the delivery vehicle 100 may include any combination of the above-referenced sensors (and additional sensors known in the art) depending on the operational data desired by a fleet management system 5 user.

According to various embodiments, the vehicles sensors disposed within the delivery vehicle 100 comprise on/off sensors, which register a voltage amount that corresponds with an on/off condition. For example, in one embodiment, a seat belt sensor may register 0V when the seat belt is disengaged and 12V when the seat belt is engaged. Such on/off sensors are sufficient for measuring vehicle dynamics in which operational data is needed to indicate two conditions, such as a seat belt, which is either engaged or disengaged at all times. As another example, one or more door position sensors may be connected, for example, to the driver side, passenger side, and bulkhead doors, and may register 0V when the door with which the sensor is associated is in an open position, and 12V when the door is closed. As another example, an ignition sensor may register 0V when the vehicle 100 is turned off and 12V when the vehicle 100 is turned on. As yet another example, a backing light sensor may register 0V when the vehicles' backing lights are off and 12V when the vehicle's backing lights are on. As yet another example, the engine idle sensor may be configured to generate 0V when the engine speed is above idle and 12V when the engine is idling.

In addition, according to various embodiments, the vehicle sensors disposed within the delivery vehicles 100 also comprise variable voltage sensors, which may be used to register variations in voltage reflecting a certain vehicle dynamic. For example, the engine speed sensor may detect the speed of the engine in revolutions per minute (RPM) by registering a particular voltage that corresponds to a particular RPM reading. The voltage of the sensor may increase or decrease proportionately with increases or decreases in the engine RPM. As another example, oil pressure sensors may detect the vehicle's oil pressure by registering a particular voltage that corresponds to a particular oil pressure. Other examples of variable voltage sensors may include temperature sensors, vehicle speed sensors, vehicle heading sensors, and vehicle location sensors.

The exemplary vehicle sensors described above may be configured, for example, to operate in any fashion suitable to generate computer-readable data that may be captured, stored, and transmitted by the telematics device 102. In addition, while certain sensors are preferably disposed at particular locations on or within the vehicles 100 (e.g., handle sensors at the vehicle handles), other sensors may be disposed anywhere within the vehicle, such as within the telematics device 102 itself (e.g., a location sensor).

Telematics Device

As noted above, according to various embodiments, the telematics device 102 is configured to control various vehicle sensors positioned on an associated delivery vehicle 100, capture vehicle telematics data generated by those sensors, and transmit the captured telematics data to the central server 120 via one of several communication methods. According to various embodiments, the various functions of the telematics device 102 described herein may be generally understood as being performed by one or more of the telematics device 102 components described below.

Figure 3:
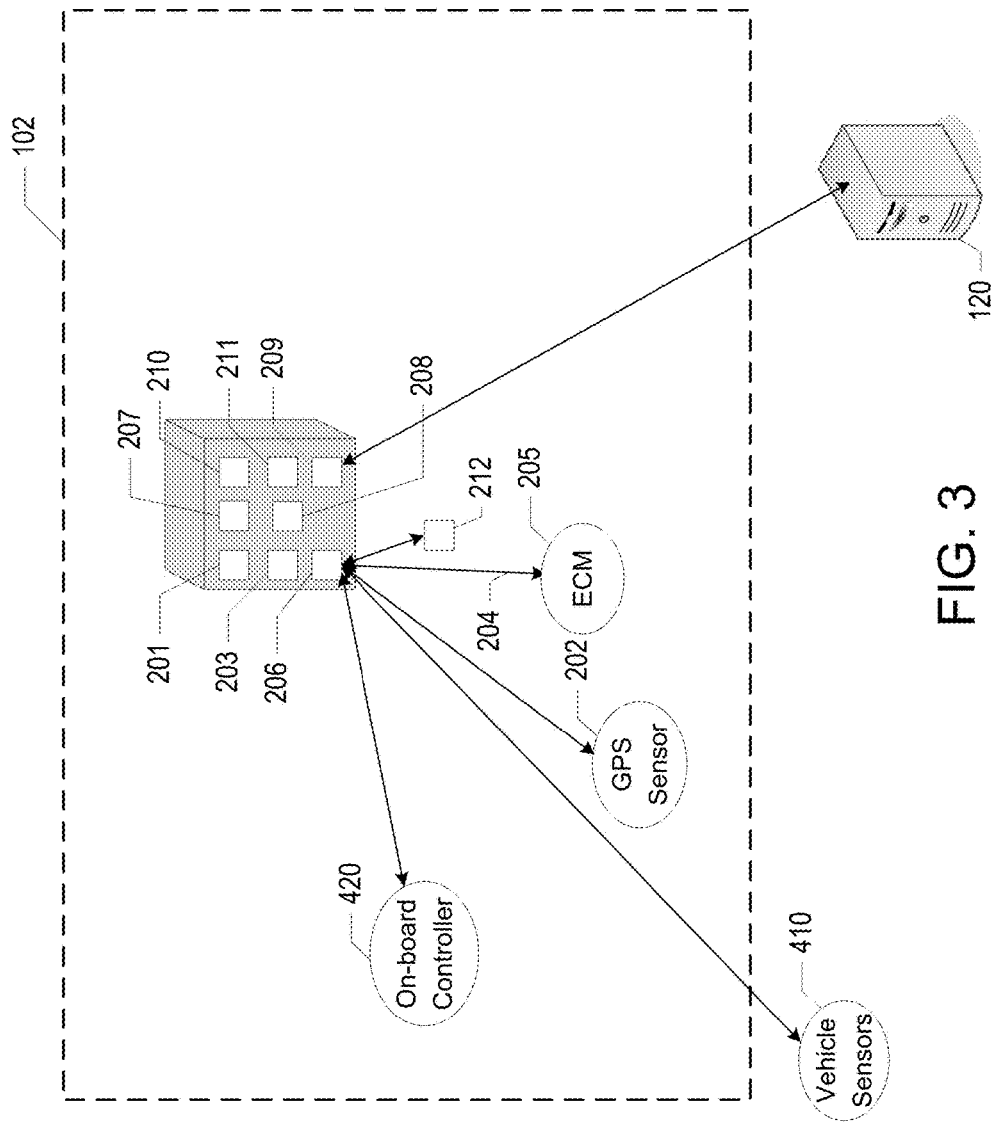
FIG. 3 is a block diagram of a telematics device according to one embodiment of the present invention.

FIG. 3 illustrates a detailed schematic block diagram of an exemplary telematics device 102 according to one embodiment. In the illustrated embodiment, the telematics device 102 includes the following components: a processor 201, a location-determining device or sensor 202 (e.g., GPS sensor), a real-time clock 203, J-Bus protocol architecture 204, an electronic control module (ECM) 205, a port 206 for receiving data from vehicle sensors 410 located in one of the delivery vehicles 100 (shown in FIG. 2), a communication port 207 for receiving instruction data, a radio frequency identification (RFID) tag 212, a power source 208, a data radio 209 for communication with a WWAN, a WLAN and/or a WPAN, FLASH, DRAM, and NVRAM memory modules 210, and a programmable logic controller (PLC) 211. In an alternative embodiment, the RFID tag 212, the location sensor 202, and the PLC 211 may be located in the delivery vehicle 100, external from the telematics device 102. In other embodiments, the processes described herein as being carried out by a single processor 201 may be accomplished by multiple processors. In various embodiments, the telematics device 102 may not include certain of the components described above, and may include any other suitable components in addition to, or in place of, those described above. For example, the telematics device 102 may include various types of communications components other than those described above (e.g., to support new or improved communications techniques).

In one embodiment, the location sensor 202 may be one of several components available in the telematics device 102. The location sensor 202 may be, for example, a GPS-based sensor compatible with a low Earth orbit (LEO) satellite system, medium Earth orbit satellite system, or a Department of Defense (DOD) satellite system. Alternatively, triangulation may be used in connection with various cellular towers positioned at various locations throughout a geographic area in order to determine the location of the delivery vehicle 100 and/or its driver. The location sensor 202 may be used to receive position, time, and speed data. In addition, the location sensor 202 may be configured to detect when its delivery vehicle 100 has entered or exited a GPS-defined geographic area (e.g., a geo-fenced area). As will be appreciated from the description herein, more than one location sensor 202 may be utilized, and other similar techniques may likewise be used to collect geo-location information associated with the delivery vehicle 100 and/or its driver.

In one embodiment, the ECM 205 with J-Bus protocol 204 may be one of several components available in the telematics device 102. The ECM 205, which may be a scalable and subservient device to the telematics device 102, may have data processor capability to decode and store analog and digital inputs and ECM data streams from vehicle systems and sensors 410, 420. The ECM 205 may further have data processing capability to collect and present vehicle data to the J-Bus 204 (which may allow transmittal to the telematics device 102), and output standard vehicle diagnostic codes when received from a vehicle's J-Bus-compatible on-board controllers 420 or vehicle sensors 410.

In one embodiment, the instruction data receiving port 207 may be one of several components available in the telematics device 102. Embodiments of the instruction data receiving port 207 may include an Infrared Data Association (IrDA) communication port, a data radio, and/or a serial port. The instruction receiving data port 207 may receive instructions for the telematics device 102. These instructions may be specific to the vehicle 100 in which the telematics device 102 is installed, specific to the geographical area in which the vehicle 100 will be traveling, or specific to the function the vehicle 100 serves within the fleet.

In one embodiment, a radio frequency identification (RFID) tag 212 may be one of several components available for use with the telematics device 102. One embodiment of the RFID tag 212 may include an active RFID tag, which comprises at least one of the following: (1) an internal clock; (2) a memory; (3) a microprocessor; and (4) at least one input interface for connecting with sensors located in the vehicle 100 or the telematics device 102. Another embodiment of the RFID tag 212 may be a passive RFID tag. One or more RFID tags 212 may be internal to the telematics device 102, wired to the telematics device 102, and/or proximate to the telematics device 102. Each RFID tag 212 may communicate wirelessly with RFID interrogators within a certain geographical range of each other. RFID interrogators may be located external to the vehicle 100.

In one embodiment, the data radio 209 may be one of several components available in the telematics device 102. The data radio 209 may be configured to communicate with a WWAN, WLAN, or WPAN, or any combination thereof. In one embodiment, a WPAN data radio provides connectivity between the telematics device 102 and peripheral devices used in close proximity to the vehicle 100, a local computer, a cellular telephone, and/or the like. As mentioned above, in one embodiment of the invention, a WPAN, such as, for example, a Bluetooth™ network (IEEE 802.15.1 standard compatible) may be used to transfer information between the telematics device 102 and a portable data acquisition device or a peripheral device. In other embodiments, WPANs compatible with the IEEE 802 family of standards may be used. In one embodiment, the data radio 209 may be a Bluetooth™ serial port adapter that communicates wirelessly via WPAN to a Bluetooth™ chipset located in a peripheral device. In addition, a Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and portable data acquisition devices equipped with Bluetooth™ devices. As discussed above with regard to FIG. 2, and as one of ordinary skill in the art will readily recognize, other wireless protocols exist (e.g., cellular technology) and can likewise be used in association with embodiments of the present invention.

As described in greater detail below, in various embodiments, the telematics device 102 may be configured to capture and store telematics data from the vehicle sensors 410 at predefined time intervals and in response to detecting the occurrence of one or more of a plurality of predefined vehicle events. Generally, a vehicle event may be defined as a condition relating to any parameter or combination of parameters measurable by the one or more vehicle sensors 410 (e.g., the engine idling, vehicle speed exceeding a certain threshold, etc.). As such, the telematics device 102 may be configured to continuously monitor the various vehicle sensors 410 and detect when the data being generated by one or more the vehicle sensors 410 indicates one or more of the plurality of predefined vehicle events. In response to detecting a vehicle event, the telematics device 102 captures data from all of the vehicle sensors 410 or a particular subset of the vehicle sensors 410 associated with the detected vehicle event.

As an example, the telematics device 102 may be configured to recognize the occurrence of a first vehicle event (e.g., the vehicle's 100 engine being turned on or off), a second vehicle event (e.g., the vehicle's 100 speed exceeding a certain threshold), a third vehicle event (e.g., a seat belt in the vehicle 100 being engaged or disengaged), and/or a fourth vehicle event (e.g., vehicle's 100 heading reaching a threshold away from center). In one embodiment, the telematics device 102 is configured to capture and store telematics data from all of the vehicle sensors 410 in response to detecting any of the first vehicle event, the second vehicle event, the third vehicle event, and/or the fourth event. In another embodiment, the telematics device 102 is further configured such that the first vehicle event is associated with a first subset of vehicle sensors (e.g., the seat belt sensor and location sensor), the second vehicle event is associated with a second subset of vehicle sensors (e.g., a vehicle speed sensor and location sensor), the third vehicle event is associated with a third subset of vehicle sensors (e.g., a seat belt sensor, engine speed sensor, and vehicle speed sensor), and the fourth vehicle event is associated with a fourth subset of vehicle sensors (e.g., a heading sensor and a location sensor). Accordingly, in this embodiment, the telematics device 102 will capture and store telematics data from the first set of vehicle sensors after detecting the first vehicle event, the second set of vehicle sensors after detecting the second vehicle event, the third set of vehicle sensors after detecting the third vehicle event, and the fourth set of vehicle sensors after detecting the fourth vehicle event.

The vehicle events programmed for recognition by the telematics device 102 can be defined in a variety of ways. As will be appreciated from the description herein, the telematics device 102 may be configured to capture telematics data in response to vehicle events defined by any combination of conditions sensed by the vehicle sensors 410. These predefined vehicle events may be stored, for example, on the telematics device's memory modules 210, or on another data storage medium accessible by the telematics device's processor 201.

For example, in various embodiments, the telematics device 102 is configured to recognize vehicle events characterized by data generated by on/off vehicle sensors. These vehicle events may include: (a) a vehicle's engine being turned on, (b) a vehicle's engine being turned off, (c) a vehicle door opening, (d) a vehicle door closing, (e) a vehicle door being locked, (f) a vehicle door being unlocked, (g) a vehicle's reverse gear being selected, (h) a vehicle's one or more forward drive gears being selected, (i) a vehicle's neutral or park gear being selected, (j) a vehicle's parking break being engaged, (k) a vehicle's seat belt being engaged, (l) a vehicle's seat belt being disengaged, and any other event definable by a parameter measured by an on/off sensor.

In addition, various embodiments of the telematics device 102 are also configured to recognize vehicle events characterized by data generated by variable voltage vehicles sensors or other types of dynamic vehicle sensors. These vehicle events may include (a) a vehicle's speed increasing from standstill to a non-zero value, (b) a vehicle's speed decreasing from a non-zero value to standstill, (c) a vehicle's engine speed exceeding a certain threshold, (d) a vehicle's engine speed dropping below a certain threshold, (e) a vehicle beginning to move in a reverse direction, (f) a vehicle ceasing to move in a reverse direction, (g) a vehicle's heading reaching a threshold away from center, (h) a vehicle's engine temperature exceeding a certain threshold, (i) a vehicle's gas level falling below a certain level, (j) a vehicle's speed exceeding a certain threshold, and any other event definable by a parameter measured by a variable voltage or other dynamic sensor.

In addition, various embodiments of the telematics device 102 are also configured to recognize vehicle events characterized by data generated by GPS-sensors or other location sensing devices. These vehicle events may include (a) a vehicle moving into a geo-fenced area (e.g., a geo-fenced area defining a shipping hub, delivery area, or other work area), (b) a vehicle moving out of a geo-fenced area (e.g., a geo-fenced area defining a shipping hub, delivery area, or other work area), (c) a vehicle traveling onto a predefined route (e.g., a GPS-based road route), (d) a vehicle traveling off of a predefined route, (e) a vehicle traveling onto a known road (e.g., a road recognized by a GPS device), (f) a vehicle traveling off of a known road (e.g., exceeding a certain predefined distance from a known road), and any other event definable by a parameter measured by a location sensing device.

According to various embodiments, the telematics device 102 may be also configured to recognize multiple unique vehicle events based on a single varying parameter measured by one of the vehicle sensors 410. As one example, the telematics device 102 may be configured such that a first vehicle event is detected anytime the vehicle's speed begins to exceed 50 miles-per-hour, while a second vehicle event is detected anytime the vehicle's speed begins to exceed 70 miles-per-hour. As such, the telematics device 102 may capture telematics data from vehicle sensors 410 in response to the vehicle 100 accelerating past 50 miles-per-hour, and again as the vehicle 100 accelerates past 70 miles-per-hour. In addition, as noted earlier, the telematics device 102 may capture telematics data from unique subsets of vehicle sensors based on the varying measurements of vehicle speed (e.g., a first subset of vehicles sensors associated with the 50-mph vehicle event and a second subset of vehicle sensors associated with the 70-mph vehicle event). This concept may also be applied to other variable parameters sensed by vehicle sensors, such as vehicle heading (e.g., various threshold degrees from center), engine speed (e.g., various threshold RPM measurements), and vehicle distance from a predefined path (e.g., threshold value for feet from a known road, vehicle route, or other GPS-based geographic location).

In addition, vehicle events may be defined by a combination of conditions indicated by various vehicle sensors 410. For example, in certain embodiments, the telematics device 102 may be configured to detect instances of stationary vehicle engine idling (e.g., where the engine is on and the vehicle is not moving) based on a combination of data from a vehicle engine sensor and a vehicle speed sensor. In such embodiments, a first vehicle event is defined as the vehicle 100 being turned on and beginning to idle (e.g., instances in which the vehicle sensors 410 indicate the vehicle's engine is turned on and the vehicle speed is zero), a second vehicle event is defined as the vehicle 100 beginning to move and thereby ceasing to idle (e.g., instances in which the vehicle sensors 410 indicate the vehicle's engine is on and the vehicle's speed has increased from zero to a non-zero value), a third vehicle event is defined as the vehicle 100 slowing to a stop and beginning to idle again (e.g., any instance in which the vehicle sensors 410 indicate the vehicle's engine is on and the vehicle's speed has decreased from a non-zero value to zero), and a fourth vehicle event is defined as the vehicle 100 being turned off and again ceasing to idle (e.g., any instance in which the vehicle sensors 410 indicate the vehicle's engine is turned off and the vehicle speed is zero). As a result, in this embodiment, vehicle events are detected and telematics data is captured at the beginning and end of every period during which the vehicle's engine is idling. In various embodiments, the telematics device 102 captures every period of engine idling for each delivery vehicle. Other examples of vehicle events defined by a combination of conditions include (a) where a vehicle seat belt is engaged or disengaged while the vehicle is idling, (b) where a vehicle exceeds a certain speed while located within a certain geographic area associated with the certain speed, and (c) a vehicle door opening or closing while the engine is on.

In addition to—or as an alternative to—capturing telematics data in response to detected vehicle events, the telematics device 102 may be further configured to automatically capture telematics data from the vehicle sensors 410 at predefined time intervals. For example, in one embodiment, the telematics device 102 is programmed with a threshold data capture time (e.g., one second, 10 seconds, one minute) and is configured to automatically capture telematics data from the vehicle sensors 410 where no vehicle events are detected for a period exceeding the defined time. This configuration ensures that the threshold data capture time is the longest possible duration between telematics data being collected and ensures that the vehicle 100 is continuously monitored even through periods where none of the predefined vehicle events are detected. As will be appreciated from the description herein, the threshold data capture time may be defined as any period of time according to the preference of a fleet management system 5 user. Where no vehicle events are defined, the telematics device 102 would then capture telematics data from the vehicle sensors according to the threshold data capture time interval as a default setting.

Although the telematics device 102 is described above as capturing telematics data in response to detected vehicle events, or in response to a certain elapsed time, the telematics device 102 may also be configured to capture telematics data in response to other occurrences. For example, the telematics device 102 may be triggered remotely from the central server to capture telematics data from all, or particular, vehicle sensors at any time.

As noted above, in response to a triggering event—such as a defined vehicle event or elapsed threshold data capture time—the telematics device 102 captures telematics data from the vehicle sensors 410. In one embodiment, the telematics device 102 is configured to store the captured telematics data in fields of one or more data records, each field representing a unique measurement or other data from a unique vehicle sensor. As the telematics device 102 continues to capture telematics data in response to triggering events, multiple records of data comprising multiples sets of concurrently captured telematics data are amassed. The captured telematics data may be initially stored, for example, in the telematics devices memory modules 201, in another data storage component of the telematics device 102, or in a remote location (e.g., a cloud database).

In various embodiments, after capturing data from any of the vehicle sensors 410, the telematics device 102 may be further configured to concurrently capture and store contextual data. The contextual data may include, for example, the date (e.g., 12/30/10) and time (e.g., 13:24) the data was captured, the vehicle from which the data was captured (e.g., a vehicle identification number such as 16234), the driver of the vehicle from which the data was captured at the time it was captured (e.g., John Q. Doe), and/or a logged reason for the data capture (e.g., a code indicating a detected vehicle event or indicating that the predefined time interval had elapsed). The contextual data may be captured, for example, from various telematics device components (e.g., an internal clock) and from data stored on the telematics device 102 (e.g., current driver name, current vehicle id, or various vehicle event codes). Further, the telematics device 102 may be configured to associate the captured telematics data with the captured contextual data in order to ensure concurrently captured telematics data and contextual data are linked. For example, in one embodiment, the telematics device 102 stores concurrently captured telematics data and contextual data in the same data record or records.

In various embodiments, a driver may be required to enter his or her driver ID number (or name) and vehicle id number at the beginning of each day (e.g., using a portable data acquisition device in communication with the telematics device 102) in order to enable the telematics device 102 to associate telematics data captured that day with accurate contextual data. In other embodiments, the telematics device 102 may be programmed remotely (e.g., from the central server 120 over the network 130) such that it is associated with the appropriate driver and vehicle information. According to various embodiments, the contextual data may be formatted in any computer-readable and transmittable data format. For example, in one embodiment, the contextual data is metadata. As the telematics data captured from the various vehicle sensors 410 is associated with the captured contextual data, the central server 120 will later be able to search and identify stored telematics data based on—for example—a particular date, time, vehicle, driver, and/or vehicle event.

As noted above, the telematics device 102 is also configured to transmit captured telematics data and contextual data to the central server 120. According to various embodiments, the captured data may be transmitted using any of the communication methods or protocols described herein, as well as various other methods and protocols known in the art. For example, the telematics device 102 may be configured to first attempt to establish a connection with the central server 120 (e.g., via a wireless signal). If a successful connection is made, the telematics device 102 will transfer captured data to the central server 120. However, if a successful connection cannot be made, the telematics device may be configured to alternatively transfer data to a portable data acquisition device (e.g., via a wireless signal or USB connection).

According to various embodiments, the defined vehicle events that trigger the telematics device 102 to capture and store telematics data, the sensors 410 from which telematics data are captured, and the intervals defined for capturing and storing data when no vehicle events are detected each may impact the effectiveness with which the fleet management system 5 is able to evaluate the captured telematics data. For example, capturing data from a large number of vehicle sensors at a high frequency may allow the fleet management system 5 to analyze the telematics data with greater accuracy. This could be accomplished, for example, by a fleet management system with many defined vehicle events and relatively short intervals for automatically capturing telematics data.

However, as some embodiments of the fleet management system 5 will have more limited storage capacity for storing captured telematics data, the amount of telematics data collected may be regulated based on the system variables described above. For example, a system user that has limited data storage resources and that is particularly interested in monitoring seat belt usage in a fleet of vehicles may configure the telematics devices 102 of the fleet vehicles 100 to capture and store data from only those sensors relevant to seat belt status. In addition, the user may configure the telematics devices 102 to capture data at the minimal frequency necessary to accurately report seat belt usage. This embodiment could use, for example, a small number of vehicle events and long time interval for capturing telematics data when no vehicle events are detected. As a contrasting example, a large fleet management entity having large amounts of data storage resources may configure the telematics devices 102 of its large fleet of vehicles 100 to capture and store data from a wide variety of vehicle sensors at a high frequency such that the telematics data may be analyzed to assess a wide variety of vehicle and driver efficiencies. As described above, this embodiment could use, for example, a large number of vehicle events and short time interval for automatically capturing telematics data. Accordingly, the telematics device 102 may be flexibly configured to suit the needs of a particular fleet management system 5 user.

Central Server

As noted above, various embodiments of the central server 120 are generally configured for receiving and storing operational data (e.g., telematics data received from the telematics device 102) and evaluating the operational data for a fleet of vehicles in order to assess various fleet efficiencies and aid fleet management system 5 users in improving the operational efficiency of the fleet. According to various embodiments, the central server 120 includes various means for performing one or more functions in accordance with embodiments of the present invention, including those more particularly shown and described herein. As will be appreciated from the description herein, however, the central server 120 may include alternative devices for performing one or more like functions without departing from the spirit and scope of the present invention.

Figure 4:
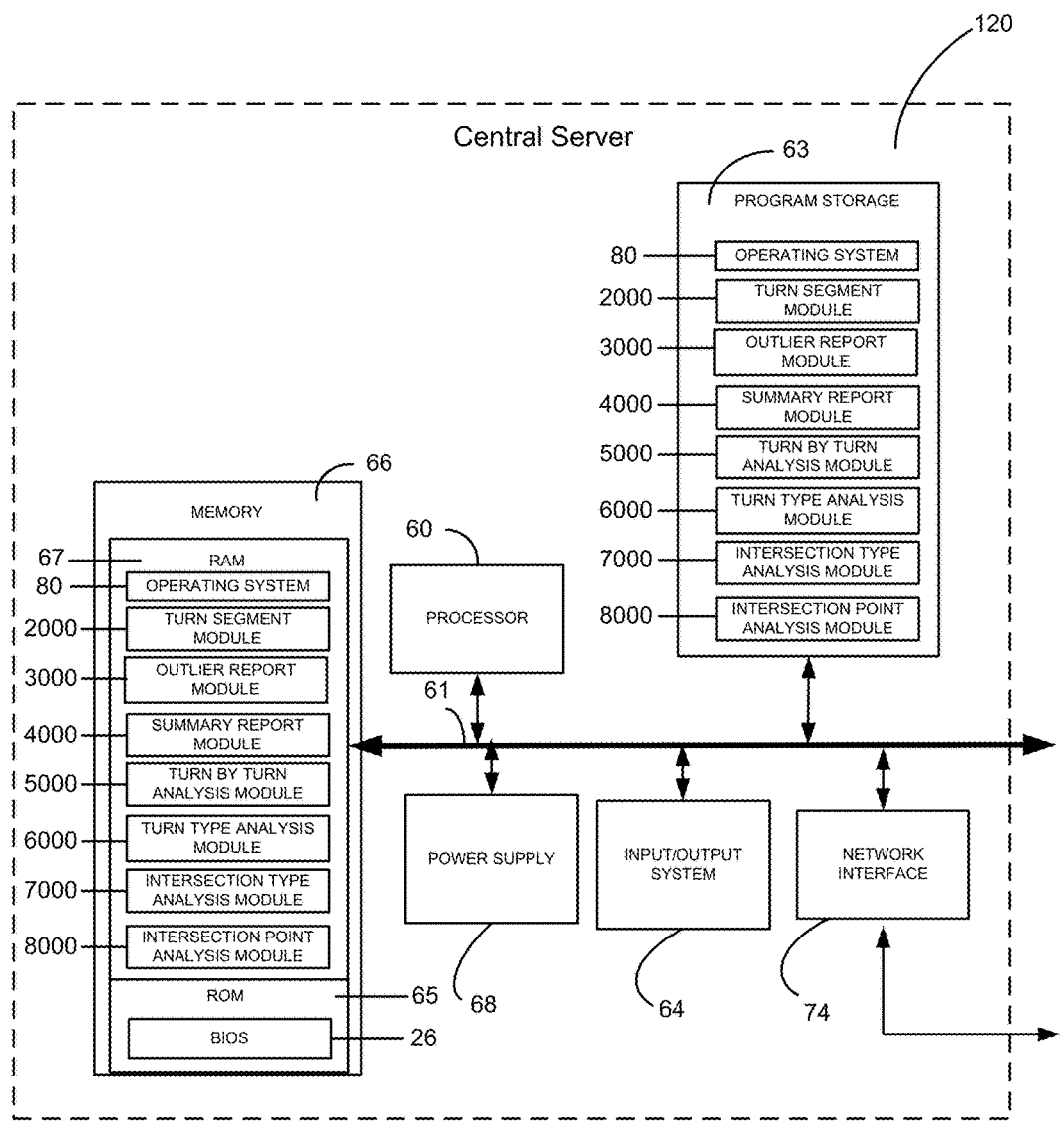
FIG. 4 is a schematic block diagram of a central server according to one embodiment of the present invention.

FIG. 4 illustrates a schematic diagram of the central server 120 according to various embodiments. The central server 120 includes a processor 60 that communicates with other elements within the central server 120 via a system interface or bus 61. In the illustrated embodiment, the central server 120 includes a display device/input device 64 for receiving and displaying data. This display device/input device 64 may be, for example, a keyboard or pointing device that is used in combination with a monitor. In certain embodiments, the central server 120 may not include a display device/input device and may be alternatively accessed by a separate computing device (e.g., a networked workstation) having a display device and input device. The central server 120 further includes memory 66, which preferably includes both read only memory (ROM) 65 and random access memory (RAM) 67. The server's ROM 65 is used to store a basic input/output system 26 (BIOS), containing the basic routines that help to transfer information between elements within the central server 120.

In addition, the central server 120 includes at least one storage device 63—such as a hard disk drive, a floppy disk drive, a CD Rom drive, or optical disk drive—for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide non-volatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 65. In the illustrated embodiment, such program modules include an operating system 80, a turn segment module 2000, an outlier report module 3000, a summary report module 4000, a turn by turn analysis module 5000, a turn type analysis module 6000, an intersection type analysis module 7000, and an intersection point module 8000. According to various embodiments, the modules 2000-8000 control certain aspects of the operation of the central server 120 with the assistance of the processor 60 and operating system 80. Embodiments of these modules are described in more detail below in relation to FIGS. 6-23.

In a particular embodiment, these program modules 2000-8000, are executed by the central server 120 and are configured to generate graphical user interfaces accessible to users of the system. In one embodiment, the user interfaces may be accessible via the Internet or other communications network. In other embodiments, one or more of the modules 2000-8000 may be stored locally on one or more computers and executed by one or more processors of the computers.

According to various embodiments, the central server 120 is configured to send data to, receive data from, and utilize data contained in a central server database, which may be comprised of one or more separate, linked databases. For example, in executing the various modules 2000-8000, the central server 120 may retrieve data necessary for performing various analyses from the central server database, and may store data resulting from various analyses in the central server database. According to various embodiments, the central server database may be a component of the central server 120, or a separate component located remotely from the central server 120. In addition, the central server database may be configured for storing data in various data sets. In various embodiments, each data set may comprise a plurality of stored data records, each record (or set of associated records) comprising one or more data fields of unique data entries. For example, telematics data and contextual data concurrently captured by the telematics device 102 may be stored in a data record, where each data field in the data record represents a unique data entry (e.g., a measurement of vehicle speed, GPS coordinates, the time and date the data was captured, and an ID number of the vehicle from which the data was captured).

Also located within the central server 120 is a network interface 74, for interfacing and communicating with other elements of a computer network. It will be appreciated by one of ordinary skill in the art that one or more of the central server 120 components may be located geographically remotely from other central server 120 components. Furthermore, one or more of the components may be combined, and additional components performing functions described herein may be included in the central server 120.

While the foregoing describes a single processor 60, as one of ordinary skill in the art will recognize, the central server 120 may comprise multiple processors operating in conjunction with one another to perform the functionality described herein. In addition to the memory 66, the processor 60 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to a central "server" 120, as one of ordinary skill in the art will recognize, embodiments of the present invention are not limited to a client-server architecture. The system of embodiments of the present invention is further not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), or similar electronic devices, collaborating with one another to provide the functionality described herein in association with the central server 120 may likewise be used without departing from the spirit and scope of embodiments of the present invention.

Capturing Operational Data for a Fleet

According to various embodiments, the fleet management system 5 is configured to capture operational data from various delivery vehicles 100 and their respective drivers over a period of time in order to amass data reflecting the overall operations of the fleet. The operational data captured by the fleet management system 5 generally comprises vehicle telematics data, which may be captured from various vehicle sensors by the telematics device 102. Generally, the telematics data is indicative of various vehicle dynamics (e.g., vehicle location, engine speed, etc.).

As described in greater detail below, the telematics device 102 is configured for capturing telematics data such that the data may later be evaluated. The captured operational data is then transmitted to the central server 120, which receives, processes, and stores the data in order to it prepare it for evaluation in accordance with user requests received via a graphical user interface and/or for automatic analysis in accordance with pre-determined analysis protocols.

Operation of Telematics Device Capturing Telematics Data

Figure 5:
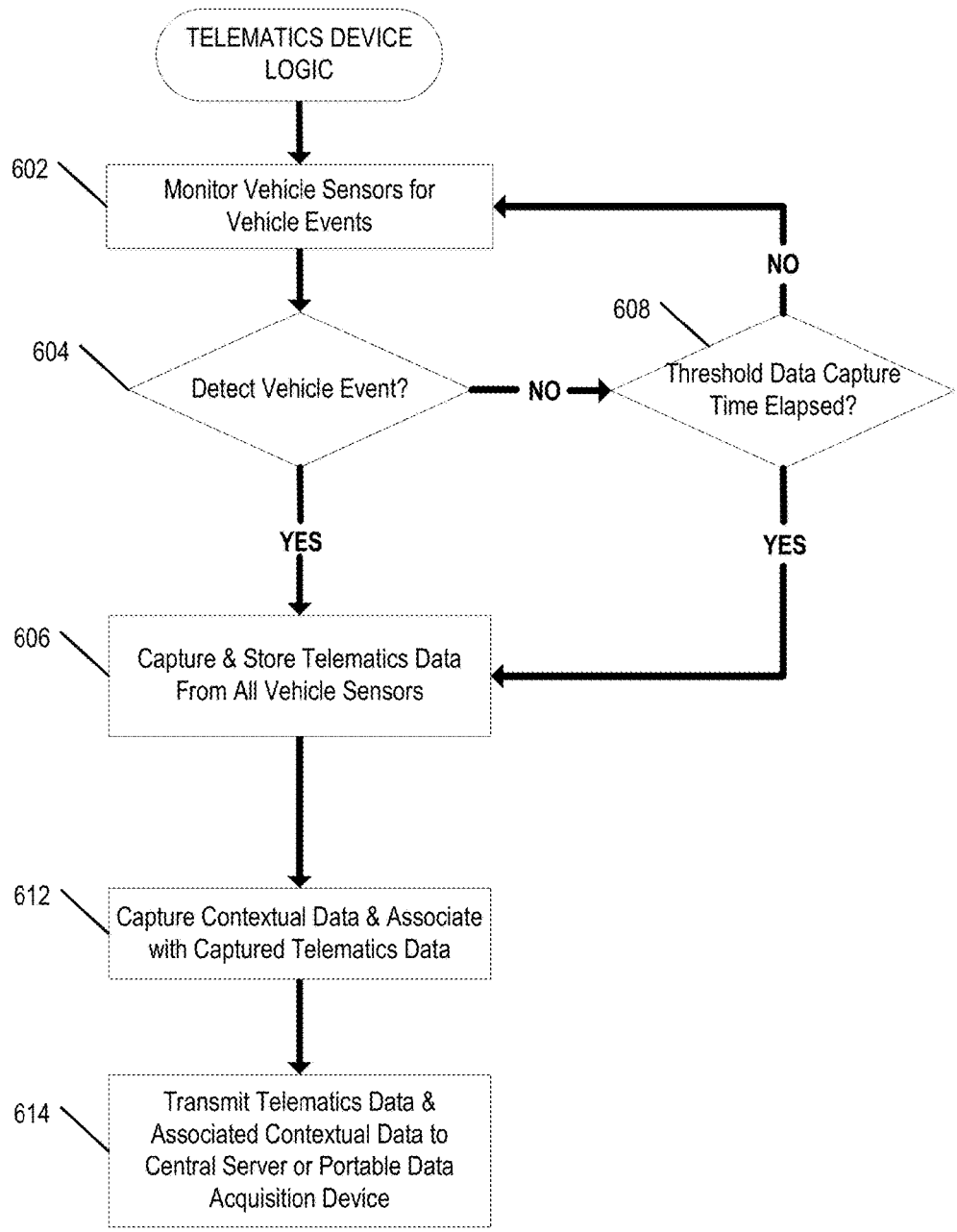
FIG. 5 is a flow diagram of steps executed by the telematics device according to one embodiment of the present invention.

As noted above, according to various embodiments, the telematics device 102 is generally configured to control various vehicle sensors 410 positioned on a particular delivery vehicle 100, capture and store vehicle telematics data generated by those sensors 410, and transmit the telematics data to the central server 120. FIG. 5 illustrates exemplary steps executed by the telematics device 102 to capture and transmit telematics data according to one embodiment. In various embodiments, the components of the telematics device 102 described herein may be configured to execute the steps of FIG. 5 in accordance with the principles described above.

Beginning with step 602, the telematics device 102 monitors data generated by the vehicle sensors 410 for parameters that match predefined vehicle events programmed in the telematics device 102. In one embodiment, the telematics device 102 is programmed to monitor some or all the following predefined vehicle events in step 602: (a) the vehicle 100 being turned on and beginning to idle (e.g., where vehicle sensors 410 indicate the vehicle's engine is turned on and the vehicle speed is zero), (b) the vehicle 100 beginning to move and thereby ceasing to idle (e.g., where the vehicle sensors 410 indicate the vehicle's engine is on and the vehicle's speed has increased from zero to a non-zero value), (c) the vehicle 100 slowing to a stop and beginning to idle (e.g., where the vehicle sensors 410 indicate the vehicle's engine is on and the vehicle's speed has decreased from a non-zero value to zero), (d) the vehicle 100 being turned off and ceasing to idle (e.g., where the vehicle sensors 410 indicate the vehicle's engine is turned off and the vehicle speed is zero), (e) the vehicle 100 moving out of a geo-fenced area associated with its home shipping hub (e.g., as indicated by a GPS sensor), (f) the vehicle 100 moving into a geo-fenced area associated with its home shipping hub, (g) the vehicle 100 moving into a geo-fenced area associated with a delivery area assigned to vehicle 100 and its driver, (h) the vehicle 100 moving out of a geo-fenced area associated with a delivery area assigned to vehicle 100 and its driver, (i) the vehicle 100 beginning to move in a reverse direction, (j) the vehicle 100 ceasing to move in a reverse direction, (k) the vehicle's seat belt being engaged or disengaged while the vehicle's engine is on, and (l) the vehicle's heading changing beyond a predefined threshold degree.

Next, at step 604, the telematics device 102 determines whether any of the aforementioned predefined vehicle events have occurred. If a vehicle event is detected, the telematics device 102 moves to step 606, where it captures and stores telematics data from the vehicle sensors 410. As noted earlier, the telematics data captured from the sensors 410 will indicate measurements or data from each of the vehicle sensors 410. This telematics data may indicate, for example, engine ignition status (e.g., on or off), engine speed (e.g., RPM), vehicle speed (e.g., miles per hour), vehicle location (e.g., latitude and longitude), current distance traveled (e.g., current odometer reading), location status (e.g., on-property, on-area), seat belt status (e.g., engaged or disengaged), and vehicle backing status (e.g., moving in reverse or not moving in reverse). In one embodiment, the telematics device 102 stores captured telematics data in its memory modules 210, in another data storage component of the telematics device 102, or in an associated database (e.g., a cloud database).

If a vehicle event is not detected in step 604, the telematics device 102 moves to step 608, where it determines whether a threshold data capture time has elapsed. For example, in one embodiment, the threshold data capture time is defined as 3 seconds. If the telematics device 102 determines that the threshold data capture time has not elapsed, it returns to step 602 to continue monitoring for vehicle events. However, if the telematics device 102 determines that the threshold data capture time has elapsed (e.g., more than 3 seconds have passed since the last time data was captured from the vehicle sensors), the telematics device 102 moves to step 606 and captures telematics data from all of the vehicle sensors 410 as described above.

Next, at step 612, the telematics device 102 captures contextual data and associates the contextual data with the telematics data captured and stored in step 606. In various embodiments, step 612 may be executed concurrently with the step 606. In one embodiment, the telematics device 102 is configured to capture some or all of the following contextual data in step 612: the date (e.g., 12/30/10) and time (e.g., 13:24) the data was captured, the vehicle from which the data was captured (e.g., a vehicle identification number such as 16234), the driver of the vehicle from which the data was captured at the time it was captured (e.g., John Q. Doe), and a logged reason for the data capture (e.g., a code indicating the detected vehicle event or indicating that the threshold data capture time interval elapsed). Further, in one embodiment, the telematics device 102 is configured to associate the captured telematics data with the captured contextual data by storing fields of telematics data captured from the vehicles sensors 410 in the same record, or records, as concurrently captured contextual data, thereby associating concurrently captured data.

Next, at step 614, the telematics device 102 transmits the telematics data and associated contextual data captured and stored in steps 606 and 612 to the central server 120. This may be accomplished by using any of the transmission methods and systems described herein, as well as other methods, protocols, and systems known in the art. As described earlier, in one embodiment the telematics device 102 is configured to first attempt to transmit captured data to the central server 120, and subsequently attempt to transfer data to a portable data acquisition device if a connection with the central server 120 is unavailable.

Operation of Central Server Processing Telematics Data

According to various embodiments, the central server 120 is configured for receiving, processing, and storing telematics data received from the telematics device 102. In particular, the central server 120 processes and stores received telematics data in a manner that facilitates later evaluation of the data.

According to various embodiments, in response to receiving inbound telematics data, the central server 120 is configured to process and store the data in an Operational Data Set stored on the central server database (which may comprise one or more separate, linked databases, and may be a local or remote database). The central server 120 populates the Operational Data Set by storing telematics data in association with concurrently captured contextual data, thereby providing a contextual relationship between all of the stored operational data. For example, in various embodiments, the Operational Data Set comprises a plurality of data records representing concurrently captured data. Each data record (or plurality of associated data records) comprises a plurality of data fields representing a unique data entry.

In one embodiment, a data record of telematics data may comprise a plurality of data fields each representing a measurement from the vehicle sensors 410 (e.g., vehicle speed, vehicle location, engine speed, vehicle heading) and a plurality of data fields each representing a contextual data measurement (e.g., date, time, driver, vehicle, logged reason for data capture). The data in each data field of the record represents data captured concurrently with the data in the other data fields. By storing telematics data in association with contextual data, the central server 120 may later access and retrieve data from the Operational Data Set by searching the stored data according to date, time, driver, vehicle, logged reason for data capture, or any other data field or combination of data fields associated with the stored telematics data (e.g., engine speed, vehicle speed, RPM, etc.).

In addition, according to various embodiments, the central server 120 is configured for maintaining a Planning Data Set stored in the central server database (or in another database accessible by the central server 120). The Planning Data set may include stored data indicating, for example, planned delivery routes for various drivers and vehicles (e.g., a GPS-based route plan for a particular delivery vehicle 100), the locations of planned stops along each delivery route (e.g., location name and/or GPS location), planned distances associated with planned delivery routes and stops (e.g., total planned distance for a delivery route, planned distances between planned stops), planned times associated with various routes and stops (e.g., planned times for travel between stops, planned times for executing a delivery at a particular stop), planned delivery activities at each stop (e.g., pickup, delivery, pickup & delivery), particular packages or freight to be picked-up or delivered at a given stop (e.g., one or more tracking numbers for packages or freight), bills of lading associated with packages or freight being picked up or delivered at a particular stop (e.g., a number or code associated with a bill of lading), the weight of packages or freight to be picked-up or delivered at a particular stop (e.g., total weight for a pickup or delivery, or weight associated with a particular bill of lading, package, or portion of freight), and the number of units to be picked up or delivered at each stop (e.g., total number of units for a pickup or delivery, or number of units associated with a particular bill of lading).

The data stored in the Planning Data Set may be stored such that is associated with, for example, a particular driver, delivery vehicle, route, date, and/or hub location. As such, the central server 120 may access and retrieve data from the Planning Data Set by searching the stored data according to driver, vehicle, route, date, hub location, or any data field associated with the above described data (e.g., time, distance, weight, bill of lading number, tracking number, etc.). Accordingly, as described in greater detail below, the central server 120 may retrieve planning data stored in the Planning Data Set for use in evaluating the operational data stored in the Operational Data Set and/or the central server 120 may retrieve operational data stored in the Operational Data Set for use in evaluating planning data stored in the Planning Data Set.

According to various embodiments, the central server 120 may be further configured to evaluate data stored in the Operational Data Set to identify segments of activity indicated by the operational data (herein referred to as "segmenting" the data). For example, each identified activity segment may represent a period of time (e.g., 11:00 to 11:42 on 12/31/10) classified according to activity (e.g., engine idle segments, vehicle stop time, vehicle travel time), many of which may overlap with one another. According to various embodiments, these activity segments may be identified by the central server 120 in accordance with the principles and configurations detailed in U.S. patent application Ser. No. 13/435,498 (now published as U.S. Publication No. 2012/0253888), the entirety of which is hereby incorporated by reference. In such embodiments, the resulting segmented data may be stored in a Segmented Data Set for use in further evaluations or analyses performed by the central server 120.

In various embodiments, the central server 120 is particularly configured to evaluate data stored in the Operational Data Set to identify vehicle turn segments (e.g., periods of time during which the operational data indicates a vehicle was making a turn) and determine various attributes of each vehicle turn. In various embodiments, the resulting turn segment data is stored in a Turn Segment Data Set of the central server database (which may be unique from, or a subset of, the aforementioned Segmented Data Set). As described in greater detail below, according to various embodiments, the central server 120 is configured to execute the above-referenced turn segment module 2000 in order to segment the operational data stored in the Operational Data Set and generate turn segment data to be stored in the Turn Segment Data Set. For example, in one embodiment, the central server 120 is configured to execute the turn segment module 2000 at the end of each business day, segment the day's data added to the Operational Data Set, and add the resulting segmented data to the Turn Segment Data set. In various other embodiments, the central server 120 may be configured to run the turn segment module 2000 at other increments or in response to a specific user request (e.g., a user request to segment a specific subset of operational data in the Operational Data Set).

Turn Segment Module

As noted above, various embodiments of the turn segment module 2000 are configured for evaluating operational data in order to identify vehicle turn segments indicated by the data. Generally, each identified turn segment represents a period of time during which a vehicle is making a turn from one road onto another road or a turn from one roadway direction on a road to another roadway direction on the same road, such as a U-turn. For example, a given turn segment may begin at 11:45:09 AM on Dec. 24, 2011 when a driver begins to change a vehicle's heading to the left in order to make a left-hand turn, and end at 11:45:31 AM on Dec. 24, 2011 when the vehicle's left-hand turn is completed and the vehicle's heading has leveled out. By identifying turn segments reflected in the operational data captured by the telematics device 102, the turn segment module 2000 can generate an accounting of turns made by one or more vehicles within the fleet during one or more time periods. As described in relation to the various modules 3000-8000 below, identifying turn segments in the captured operational data for a fleet enables the central server 120 to perform a variety of further analyses in order to assess various fleet efficiencies and to provide a graphical representation of vehicle and delivery activities for any period of time.

Figure 6:
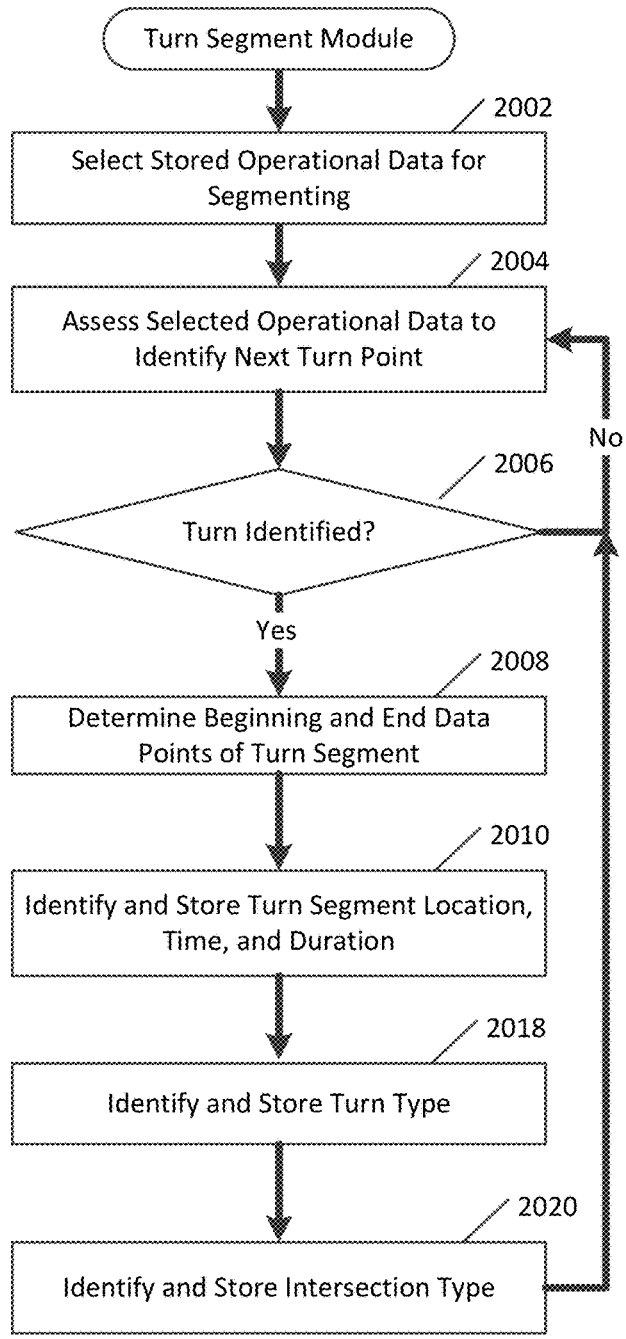
FIG. 6 is a flow diagram of steps executed by a turn segment module according to one embodiment of the present invention.

FIG. 6 illustrates steps executed by the turn segment module 2000 to segment operational data according to one embodiment. Beginning at step 2002, the turn segment module 2000 first selects operational data from the Operational Data Set to segment for turn-identification. As noted above, the central server 120 may call the turn segment module 2000 to segment newly captured (or previously unsegmented) operational data stored in the Operational Data Set with a predefined frequency (e.g., at the end of every business day) or in response to a user request (e.g., a request received via the user interface to segment operational data corresponding to certain user-selected parameters). Accordingly, the turn segment module 2000 executes step 2002 according to these frequency or user request parameters (e.g., by identifying unsegmented data in the Operational Data Set or by retrieving operational data corresponding to user-specified parameters).

Next, at step 2004 the turn segment module 2000 assesses data points in the selected operational data to identify instances in which a vehicle has made a turn. For example, in certain embodiments, the turn segment module 2000 is configured to identify instances in which a particular vehicle's heading deviates by a threshold heading value (or more) between consecutive data points. In one embodiment, the turn segment module 2000 accomplishes this by comparing the GPS location of successive data points to assess changes in heading (e.g., starting with the first data point in the data selected in step 2002 and proceeding until all data points have been assessed).

Figure 7:
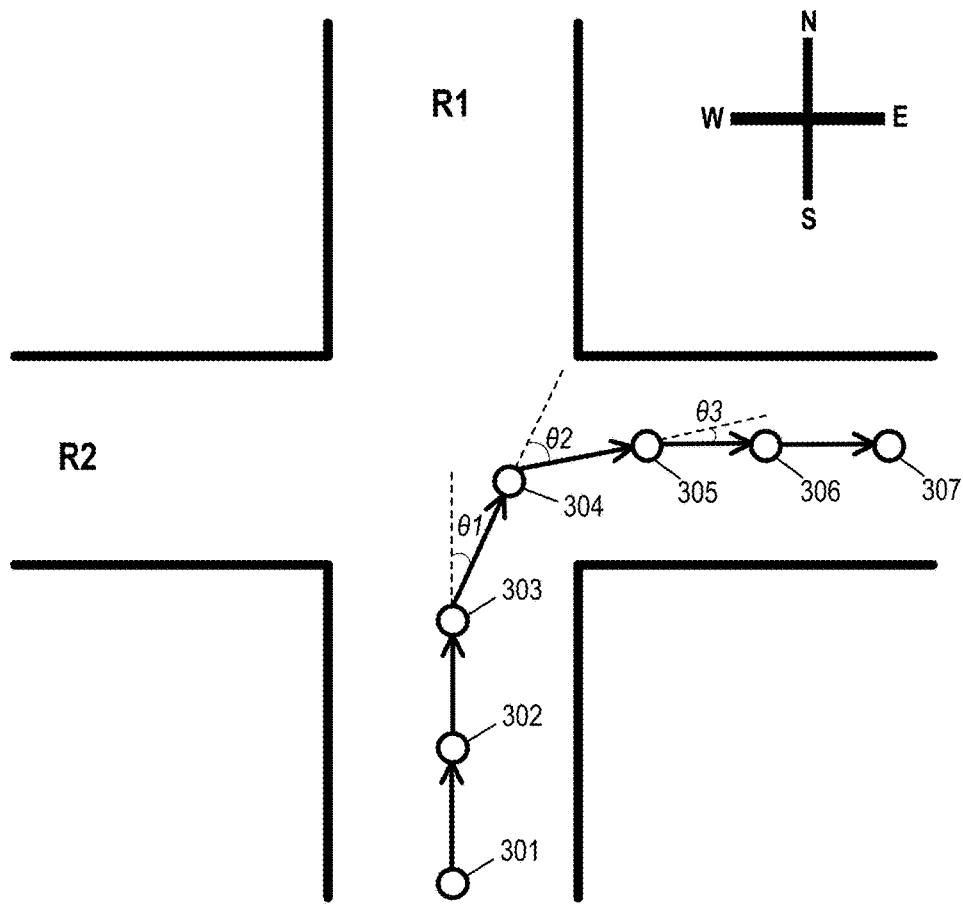
FIG. 7 is a diagram of data points captured by the telematics device as a vehicle executes a right-hand turn at an intersection of roads according to one embodiment.

To illustrate this concept, FIG. 7 shows an intersection of two roads R1 and R2. As the vehicle travels along road R1, its telematics device 102 captures a series of intermittent data points 301-307 (e.g., at a predefined interval as discussed above), which are depicted in FIG. 7 according to their respective GPS locations. As shown in FIG. 7, as the vehicle travels north on road R1, there is no significant change in heading between the first three data points 301, 302, 303. However, at the fourth data point 304, the vehicle has deviated from its previous heading (indicated by a dashed line) by a first angle θ1. Similarly, the headings between the fourth, fifth, and sixth data points 304-306 continue to change as the vehicle makes a right-hand turn (as indicated by angles θ2 and θ3). At the seventh data point 307, the vehicle's heading stabilizes as it travels east down road R2 away from the intersection. Accordingly, for each data point 301-307, the turn segment module 2000 is configured to determine the change in heading by calculating the angle between the vehicle's current heading and its previous heading. Where this angle exceeds the predefined threshold heading value (e.g., 30 degrees), the current data point is marked in the operational data as a turn point.

Using this approach, the turn segment module's logic can be manipulated to suit various applications. For example, the threshold heading value can be adjusted to eliminate false turn identifications or may be variable (e.g., based on the route or region associated with the analyzed operational data). Additionally, according to certain embodiments, the threshold heading value may be defined as a change in heading spanning multiple data points (e.g., a deviation of 45 degrees or more across four or less data points). In such an embodiment, where the change in heading between adjacent data points does not meet or exceed the threshold heading value, the turn segment module 2000 may be configured to sum changes in heading across a predefined number of data points and determine whether the aggregate heading change meets or exceeds the threshold heading value. In further embodiments, the threshold heading value may be defined as a change in heading over a predefined period of time (e.g., a change in heading of greater than 30 degrees in less than four seconds). In such an embodiment, the turn segment module 2000 may be configured to sum changes in heading across the data points captured within the predefined period preceding the current data point and determine whether the aggregate heading change meets or exceeds the threshold heading value.

In other embodiments, the turn segment module 2000 may identify turn points by comparing vehicle heading data (e.g., heading data captured from a heading sensor, such as a digital compass) for adjacent data points. In such an embodiment, if the vehicle heading data associated with a current point differs from the vehicle heading data associated with the preceding data point by the threshold heading value (or more), the turn segment module 2000 marks the current data point as an identified turn point. As above, this calculation could also be performed over a predefined number of data points or multiple data points spanning a particular time period. As will be appreciated from the description herein, the turn segment module 2000 can be configured to evaluate the user-selected operational data to identify turn points in a variety of ways depending on the data available.

Referring back to FIG. 6, the turn segment module 2000 next proceeds to step 2006 where it determines whether the current data point has been marked as a turn point based on the analysis performed in step 2004. If the current data point is not a turn point, the turn segment module 2000 returns to step 2004 and analyzes the next data point in the user-selected operational data. If the current data point has been marked as a turn point, the turn segment module 2000 continues to step 2008.

As multiple data points are typically captured over the course of a vehicle turn, the turn segment module 2000 next identifies in step 2008 the data points associated with the beginning and end of the vehicle's turn in order to define a full turn segment. According to various embodiments, the turn segment module 2000 may be configured to identify these beginning and end points based on vehicle heading, vehicle speed, distance traveled, engine speed (e.g., idle time) and/or other suitable parameters. For example, using the turn point marked in step 2004 as a base, the turn segment module 2000 first analyzes data points preceding the marked turn point to identify the beginning of the turn. In one embodiment, this may be accomplished in two stages. In the first stage, the turn segment module 2000 analyzes prior data points by assessing changes in heading to determine the beginning of a turn (i.e., the point at which the vehicle began to change its heading to make the identified turn). In the second stage, analyzes further prior data points by assessing changes in speed or distance to determine whether there was additional time prior to the beginning of the turn itself that is still attributable to the turn (e.g., where a vehicle is stopped at a light, stop sign, or in a traffic queue prior to making the turn).

For example, in the illustration of FIG. 7, the change in heading θ1 may be below the threshold heading value, while the change in heading θ2 may exceed the threshold. In this case, the turn segment module 2000 marks the data point 305 as the turn point. The turn segment module 2000 then assesses the immediately preceding data point 304 and determines whether it represents a change in heading. Because the data point 304 represents a change in heading of θ1, the turn segment module 2000 determines the identified turn was in progress at data point 304. The turn segment module 2000 then assesses the next preceding data point 303 and determines that no change in heading (or a comparatively minor change in heading) was made up to that point. Accordingly, the turn segment module 2000 preliminarily marks data point 303 as the beginning turn point because it is the last data point before a significant change in heading was detected.

Turning to the second stage of the analysis, in one embodiment, the turn segment module 2000 assesses the next preceding data point 302 and determines the distance of the data point 302 from the data point 303 (e.g., using the GPS data associated with the data points). In the example of FIG. 7, the data point 302 is a significant distance (e.g., 20 meters) from the data point 303, and so the turn segment module 2000 determines that the vehicle was not stopped or moving slowly between data points 302 and 303. As such, the turn segment module 2000 confirms the data point 303 as the beginning of the turn segment.

However, if the data point 302 had been at the same location as the data point 303—or at a location a short distance from the data point 303—the turn segment module 2000 would have marked the data point 302 as the new preliminary beginning turn point because the data would indicate the vehicle was stopped or waiting in traffic prior to beginning its change in heading to the make the identified turn. The turn segment module 2000 would have then moved to the next preceding data point 301 and performed the same analysis. By repeatedly performing this analysis until a significant distance between data points is identified, the turn segment module 2000 is able to identify the true beginning point of the turn (i.e., not simply when the vehicle began to change its heading to make the turn, but when the vehicle's travel was significantly affected as a result of its need to make the identified turn).

In other embodiments, the turn segment module 2000 may be configured to assess vehicle speed or engine speed data (in addition to or in place of distance) to perform the second stage of the analysis. For example, if the speed of the vehicle at the data point preceding the preliminary beginning turn point was zero or near zero, the turn segment module 2000 would recognize that the vehicle was stopped or slowly moving in traffic at that point and—because it immediately precedes the preliminary beginning turn point 303—would then mark it as the new preliminary beginning turn point. In this case, the turn segment module 2000 would then perform the same analysis on the next preceding data point 301 to determine if the vehicle was stopped or moving slowly. Once the turn segment module 2000 identifies a preceding data point indicating the vehicle is moving at significant speed (or indicating the engine speed is significantly above idle), the turn segment module 2000 would recognize the current preliminary beginning turn point as the true beginning turn point.

After identifying the true beginning turn point, the turn segment module 2000 next analyzes data points succeeding the marked turn point to identify the ending of the turn. In various embodiments, this may be accomplished using a methodology similar to that employed to identify the beginning turn point. For example, in one embodiment, the turn segment module 2000 analyzes later data points by assessing changes in heading to identify the ending of the turn (i.e., the point at which the vehicle ceases changing its heading and has completed the identified turn). Referring back to the illustration of FIG. 7 as an example, the turn segment module 2000 would first identify data point 306 as the next data point after the identified turn point 305. In this example, the data point 306 represents a change in heading of θ3 from the vehicle's heading at the turn point 305. Accordingly, the turn segment module 2000 considers data point 306 a part of the turn segment and proceeds to assess the next data point 307. As shown in FIG. 7, there is no significant change in the vehicle's heading between data points 306 and 307. Accordingly, the turn segment module 2000 is able to recognize that data point 307 is not a part of the turn segment (i.e., the turn has already been completed at the location associated with this data point). Accordingly, the turn segment module 2000 marks data point 306 as the ending turn point because it is the last data point representing a significant change in heading.

In certain embodiments, the turn segment module 2000 may be further configured to execute a second stage of the ending point analysis by accessing data points succeeding the ending turn point to determine whether the vehicle has stopped at the end of the turn or slowed in traffic (e.g., using the same analysis principles described above in relation to determining the true beginning point of the turn). According to the preference of the system user, this second stage analysis may be omitted for the identification of one, or both of, the beginning turn point and ending turn point (e.g., where the user is only interested in identifying turn instances and is not concerned with the duration of individual turns).

Figure 8:
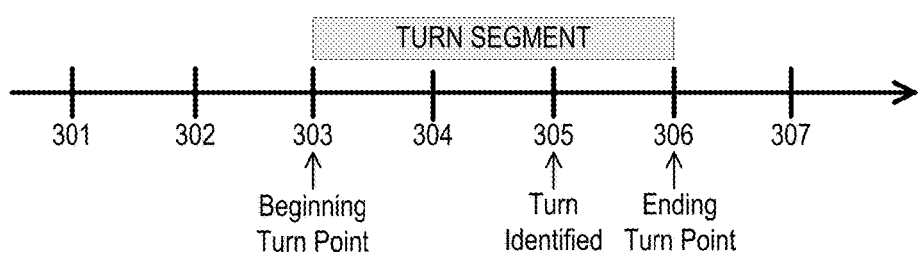
FIG. 8 is a Gantt chart display of a vehicle turn segment associated with the turn shown in FIG. 7 according to one embodiment.

After identifying the beginning and ending points of the turn segment, the turn segment module completes step 2008 by storing the beginning and ending points in a Turn Segment Data Set as being associated with a individually identified turn segment (e.g., in the central server database). In addition, in one embodiment, the identified turn segment is stored in the Turn Segment Data Set in association with contextual data indicating the operational data from which it was derived. For context, FIG. 8 shows a Gantt chart type illustration of the turn segment identified based on the travel of the vehicle shown in FIG. 7.

Referring back to FIG. 6, at step 2010, the turn segment module 2000 next determines the location, time, and duration of the current turn segment and stores this information in the Turn Segment Data Set. For example, in one embodiment, the location of the turn segment is identified via GPS or other location data associated with the marked turn point (e.g., data point 305 in FIG. 7). In certain embodiments, map data may be accessed to identify the location of the turn segment by street names associated with the intersection where the turn occurred (e.g., in addition to or in place of identifying the location of the turn by GPS coordinates or the like). The contextual data stored in association with the telematics data is also used to identify a time associated with the turn segment. For example, in one embodiment, the turn segment module 2000 identifies the time stamp associated with the marked turn point and associates this time as the time of the turn segment's occurrence (e.g., 11:45:19 AM on Dec. 24, 2011). The identified time is stored in association with the turn segment data in the Turn Segment Data Set. The turn segment module 2000 also calculates the duration of the turn segment based on the time of occurrence of the beginning and ending turn points identified in step 2008 (e.g., the time elapsed between these) and stores this duration in the Turn Segment Data Set. For example, if the identified beginning turn point was captured at 11:45:09 AM and the identified ending turn point was captured at 11:45:31, then the duration of the turn segment is 22 seconds.

Accordingly, in one embodiment, the duration for a given turn segment would include both time during which the vehicle was traveling to execute the turn and time during which the vehicle was idling (e.g., not moving in traffic, either waiting to execute the turn or in the middle of the turn). In certain embodiments, however, the turn segment module 2000 may be configured to separate idle turn time (e.g., time during a turn segment in which the vehicle was idling) and travel turn time (e.g., time during a turn segment in which the vehicle is moving) for each turn segment. In such embodiments, one or more of the later analysis modules 3000-8000 may be configured to perform analogous analyses based only on idle turn time or travel turn time, as opposed to full turn durations.

Next, at step 2018, the turn segment module 2000 identifies the turn type for the current turn segment and stores this information in the Turn Segment Data set. For example, a given turn segment may represent a right-hand turn, a left-hand turn, or a turn-around (e.g., a U-turn). In one embodiment, the turn segment module 2000 determines the turn type of the current turn segment based on the GPS locations of the data points comprising the turn segment (e.g., turn points heading north and then veering east indicate a right hand turn). In another embodiment, the turn segment module 2000 determines the turn type of the current turn segment based on vehicle heading data associated with the data points comprising the turn segment (e.g., where a heading change of +45° to +135° is a right hand turn, a heading change of −45° to −135° is a left hand turn, and a heading change of +135° to 180° or −135° to 180° is a turn-around). Upon classifying the turn segment as a left-hand turn, right-hand turn, or turn-around, the turn segment module 2000 stores the classification in the Turn Segment Data Set.

In certain embodiments, the turn segment module 2000 may also be configured to identify turn-around turns occurring in conjunction with a back-up event (e.g., a period of time in which the vehicle was moving in reverse). For example, in one embodiment, the turn segment module 2000 may accomplish this by reviewing the telematics data captured proximate in time to the occurrence of an identified turn-around turn (e.g., within 45 seconds of the turn-around turn occurrence) and determine whether a back-up event was recorded by the telematics device during this window. Where the turn segment module 2000 determines that a turn-around turn is associated with a back-up event, the turn type may be stored as "turn-around with backup."

Next, at step 2020, the turn segment module 2000 identifies the type of intersection where the turn segment occurred. For example, in certain embodiments, the turn segment module 2000 refers to the GPS of location of an identified turn segment (e.g., the GPS location of the segment's turn point) and identifies the roads intersecting at that location. The turn segment module 2000 then refers to map data in the central server database to determine the intersection type. The determined intersection type may be, for example, a yield sign intersection, a stop sign intersection, a roundabout, a traffic light intersection, a cul-de-sac, or an off/on-ramp. Upon classifying the intersection type for the turn segment, the turn segment module 2000 stores the classification in the Turn Segment Data Set.

In certain embodiments, the turn segment module 2000 is further configured to associate the turn segment directly with underlying map data. For example, the turn segment module 2000 may be configured to refer to underlying map data in which roads are defined by a plurality of road segments extending between node points (i.e., points at which the road segments defining the roads intersect). In such embodiments, the turn segment module 2000 may be configured to identify the nearest node point in the underlying map data to each data point comprising an identified turn segment in order to associate the turn segment with the map data. As an example, for the turn segment defined by data points 303-306 in FIG. 7, the turn segment module 2000 would identify the nearest node point in underlying map data to each of the data points 303-306, thereby associating the full turn segment with one or more node points and road segments in the underlying map data. In other embodiments, the turn segment module 2000 may be configured to simply associate the identified turn point in the turn segment with the nearest node point in the underlying map data, thereby associating the turn segment with a single node in the underlying map data. In associating the turn segments with the underlying map data, the turn segment module 2000 can also be configured associate the turn segments with the appropriate street segment ids stored in the underlying map data (e.g., such that a turn segment is associated with the road(s) on which it occurs based on the underlying map data).

According to various embodiments, the turn segment module 2000 may also be further configured to execute additional steps to meet the preferences of a particular user. For example, as noted above, the telematics device 102 may be configured to detect when the vehicle 100 has entered or exited a particular geographic area, such as a geo-fenced area defining the shipping hub. Accordingly, in one embodiment, the turn segment module 2000 is further configured to review operational data and identify data indicating instances in which the vehicle 100 has entered or departed a predefined geographical area. As a result, the turn segment module 2000 can be configured to analyze turns made within a geo-fenced area or outside of a geo-fenced area separately. For example, in certain embodiments a user may want to assess only turns occurring within a particular geo-fenced delivery area (e.g., a residential neighborhood), which the turn segment module 2000 may be configured to accomplish.

As a result of the foregoing steps, the turn segment module 2000 is able to populate the Turn Segment Data Set with data records each corresponding to an identified turn segment. For example, in one embodiment, each turn segment data record comprises a turn point location and time, a beginning turn point location and time, an ending point location and time, a turn segment location (e.g., GPS coordinates), a turn segment time, a turn segment duration, a turn segment type, a turn intersection type, a turn intersection point (e.g., the roads intersecting at the turn point), a turn segment driver, a turn segment vehicle ID, a turn segment route ID, and a turn segment hub location (e.g., the shipping hub from which the vehicle associated with the turn segment departed).

Central Server User Interface

As described above, the central server 120 is configured for evaluating operational data (e.g., telematics data and contextual data) for a fleet of vehicles in order to assess various fleet efficiencies and aid fleet management system 5 users in improving the operational efficiency of the fleet. According to various embodiments, the central server's 120 evaluation of operational data is conducted in accordance with user instructions received via the central server's user interface. In various embodiments, the user interface is a graphical user interface accessible from a remote workstation (e.g., in communication with the central server 120 via the network 130), or by using the central server's display device/input device 64. For example, in various embodiments, a user may log in to the fleet management system 5 from a remote workstation (e.g., by opening a log-in page and entering a user id and password using a workstation display and keyboard). The central server 120 may be configured to recognize any such log-in request, verify that user has permission to access the system (e.g., by confirming the user id and password are valid), and present the user with a graphical user interface (e.g., displayed on the workstation's monitor).

Figure 9:
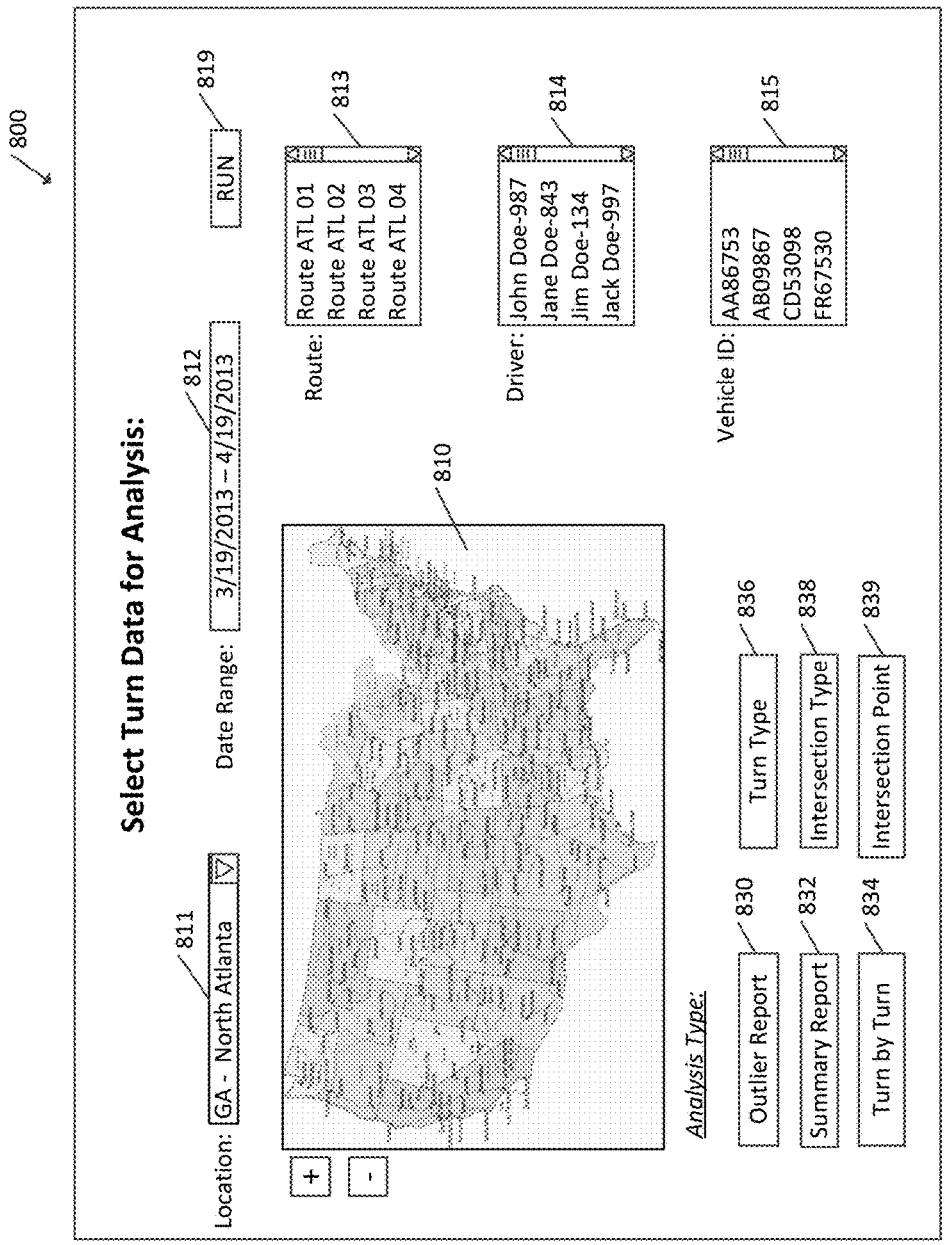
FIG. 9 shows a start-up view of a graphical user interface according to one embodiment of the present invention.

FIG. 9 illustrates a start-up user interface 800 according to one embodiment. In the illustrated embodiment, the start-up user interface 800 includes an interactive geographical map display 810, a location menu 811, a date selection field 812, a route selection menu 813, a driver selection menu 814, a vehicle selection menu 815, an outlier report button 830, a summary report button 832, a turn by turn analysis button 834, a turn type analysis button 836, an intersection type analysis button 838, an intersection point analysis button 839, and a run analysis button 819.

According to various embodiments, the map and menus 810-815 allow a system user to specify various telematics data attributes in order to select certain turn segment data for evaluation by the central server 120. In various embodiments, any combination of selections made from the map and menus 810-815 will dictate the turn segment data loaded and analyzed by the central server 120. For example, in one embodiment, the user may request evaluation of only turn segment data relating to a particular vehicle route by selecting a route from the route selection menu 813. Likewise, the user may request evaluation of only turn segment data relating to a particular vehicle by selecting a vehicle ID from the vehicle selection menu 815 and may request evaluation of only turn segment data relating to vehicles operated by a particular driver by selecting a driver from the driver selection menu 814. As an example, where both a route and vehicle have been selected, the central server 120 would load only turn segment data relating to the selected vehicle while traveling along the selected route.

Furthermore, a user may request evaluation only of operational data captured on a particular date or range of dates by selecting a desired date or date range (as well as specific time of day associated with any selected date) using the date section field 812. The user also has the option of requesting evaluation of operational data for all routes stemming from a particular location (e.g., by selecting only one or more shipping hub locations from the location menu 811), or for all routes at all locations on a particular date (e.g., by selecting only a date or date range using the date selection field 812). Moreover, a user may request evaluation of turn segment data relating to a particular geographical area by selecting an area on map display 810 (e.g., by using a mouse to select a two-dimensional geographical area on the map display 810). The map display 810 may also include tools for zooming in on various portions of the illustrated route, selecting a specific intersection for further analysis, and/or the like. As will be appreciated from the description above, the user may request evaluation of all operational data or any subset of operational data defined by any combination of parameters provided in the map/menus 810-815.

After selecting operational data to be evaluated, the user may select a particular type of turn analysis to be performed by the central server 120. As described in greater detail below, in one embodiment, the central server 120 is configured to analyze the user-selected turn segment data to generate an outlier report, a summary report, a turn by turn analysis, a turn type analysis, an intersection type analysis, and an intersection point analysis. Each of these analyses may be requested by a user by selecting the corresponding one of the analysis type buttons 830-839 on the start-up interface 800. After the user-selected data and analysis type has been defined using the map/menus 810-815 and analysis type buttons 830-839, the user may select the run analysis button 819 in order to trigger the user requested analysis by the central server 120.

Figure 10:
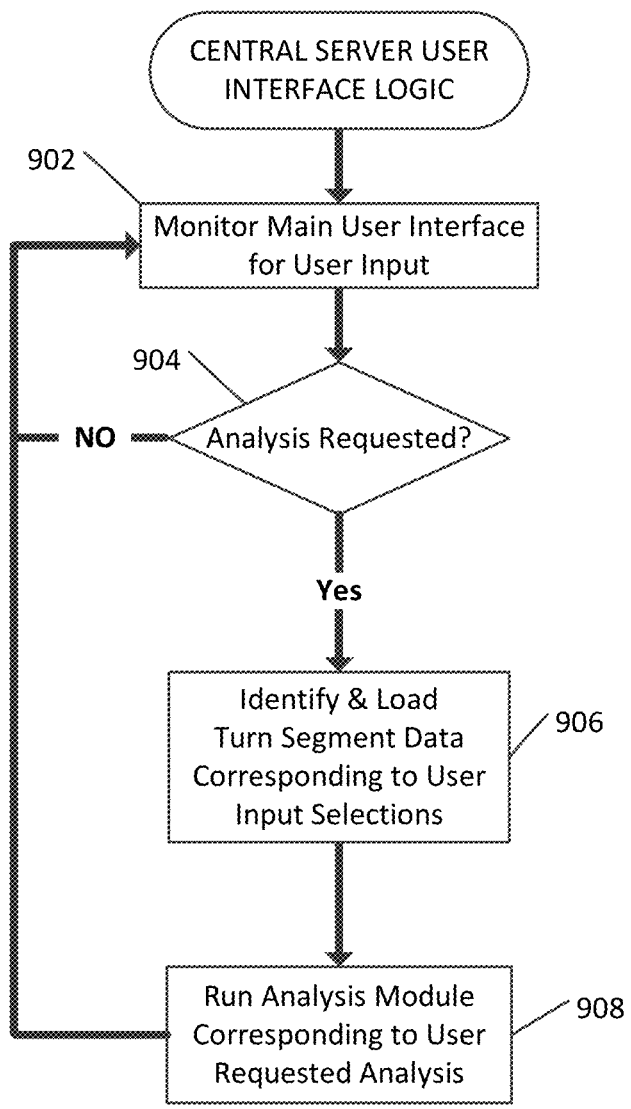
FIG. 10 shows exemplary steps executed by a central server in order to respond to user evaluation requests received via a user interface according to one embodiment of the present invention.

According to various embodiments, the central server 120 is configured to detect a user's selection of the various parameters and options presented on the user interface 800 and call one or more of the software modules 2000-8000 in order to perform the appropriate data evaluation. FIG. 10 illustrates exemplary steps executed by the central server 120 in order to respond to user evaluation requests received via the user interface 800. Beginning at step 902, the central server 120 monitors the user interface 800 for user input (e.g., selection of the various menus and buttons 810-839). Next, at step 904, the central server 120 determines whether the user has requested an analysis of particular turn segment data (e.g., by selecting the run analysis button 819). If the user has not requested that an analysis be performed, the central server 120 moves back to step 902, where it continues to monitor the user interface 800 for user input. If the user has requested that a turn analysis be performed, the central server 120 moves to step 906.

At step 906, the central server 120 identifies the turn segment data corresponding to the user's selections from the map/menus 810-815 on the user interface. For example, in one embodiment, the central server 120 reviews the turn segment data in the Turn Segment Data Set and identifies the appropriate data based on the contextual data in each turn segment data record. According to various embodiments, the central server 120 reviews the turn segment time field to identify segments occurring on a particular date/time, the turn segment location field to identify segments within a particular geographic location, the turn segment route field to identify segments relating to a particular vehicle route, the turn segment driver field to identify segments relating to a particular driver, and the turn segment vehicle field to identify turn segments relating to a particular vehicle. In certain embodiments, where the user selects the intersection point analysis button 839, the central server 120 is configured to prompt the user to select an intersection from the map display 810 (or by entering a textual description of the intersection) and retrieve turn segment data corresponding to that particular location (e.g., based on the location field in the turn segment data records). After identifying the turn segment data corresponding to the user's request, the central server 120 loads the identified turn segment database for analysis by one or more of the modules 3000-8000 (e.g., by retrieving the data from the Turn Segment Data Set in the central server database and loading it in the central server's memory).

Next, at step 908, the central server 120 runs the analysis module corresponding to the user's selection on the user interface 800. For example, if user selects the outlier report button 830 the central server 120 will run the outlier report module 3000, if the user selects the summary report button 832 the central server 120 will run the summary report module 4000, if the user selects the turn by turn analysis button 834 the central server 120 will run the turn by turn analysis module 5000, if the user selects the turn type analysis button 836 the central server 120 will run the turn type analysis module 6000, if the user selects the intersection type analysis button 838 the central server 120 will run the intersection type analysis module 7000, and if the user selects the intersection point analysis button 839 the central server 120 will run the intersection point analysis module 8000. A detailed description of the functionality and steps executed by each of the modules 3000-8000 now follows.

Outlier Report Module

Figure 11:
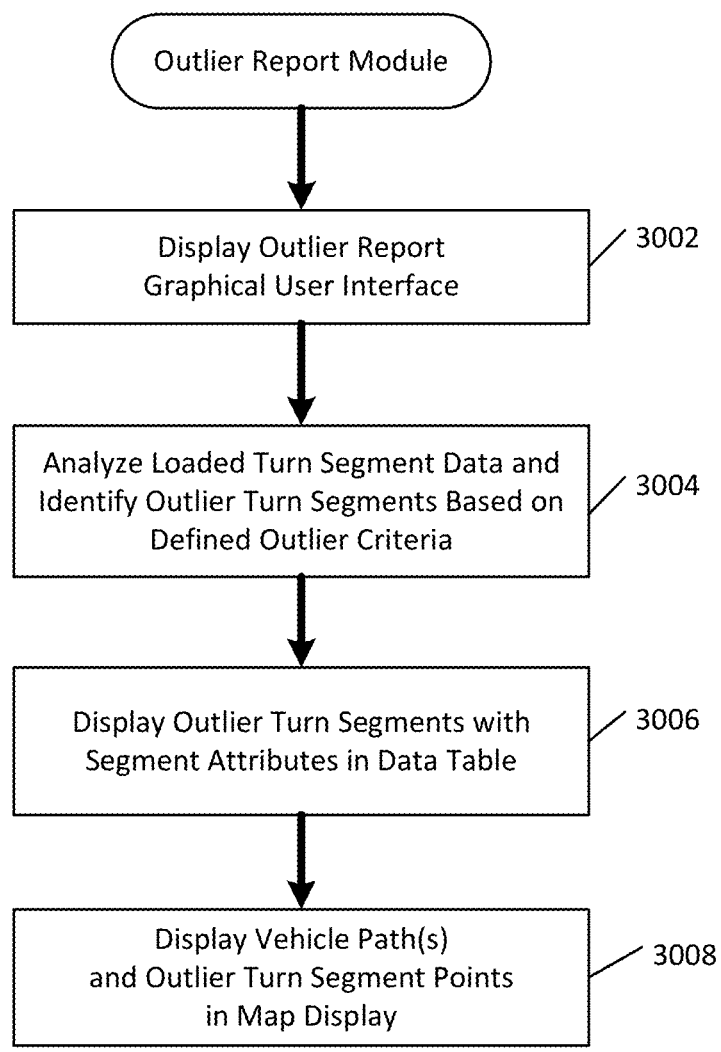
FIG. 11 shows exemplary steps executed by an outlier report module according to one embodiment of the present invention.
Figure 12:
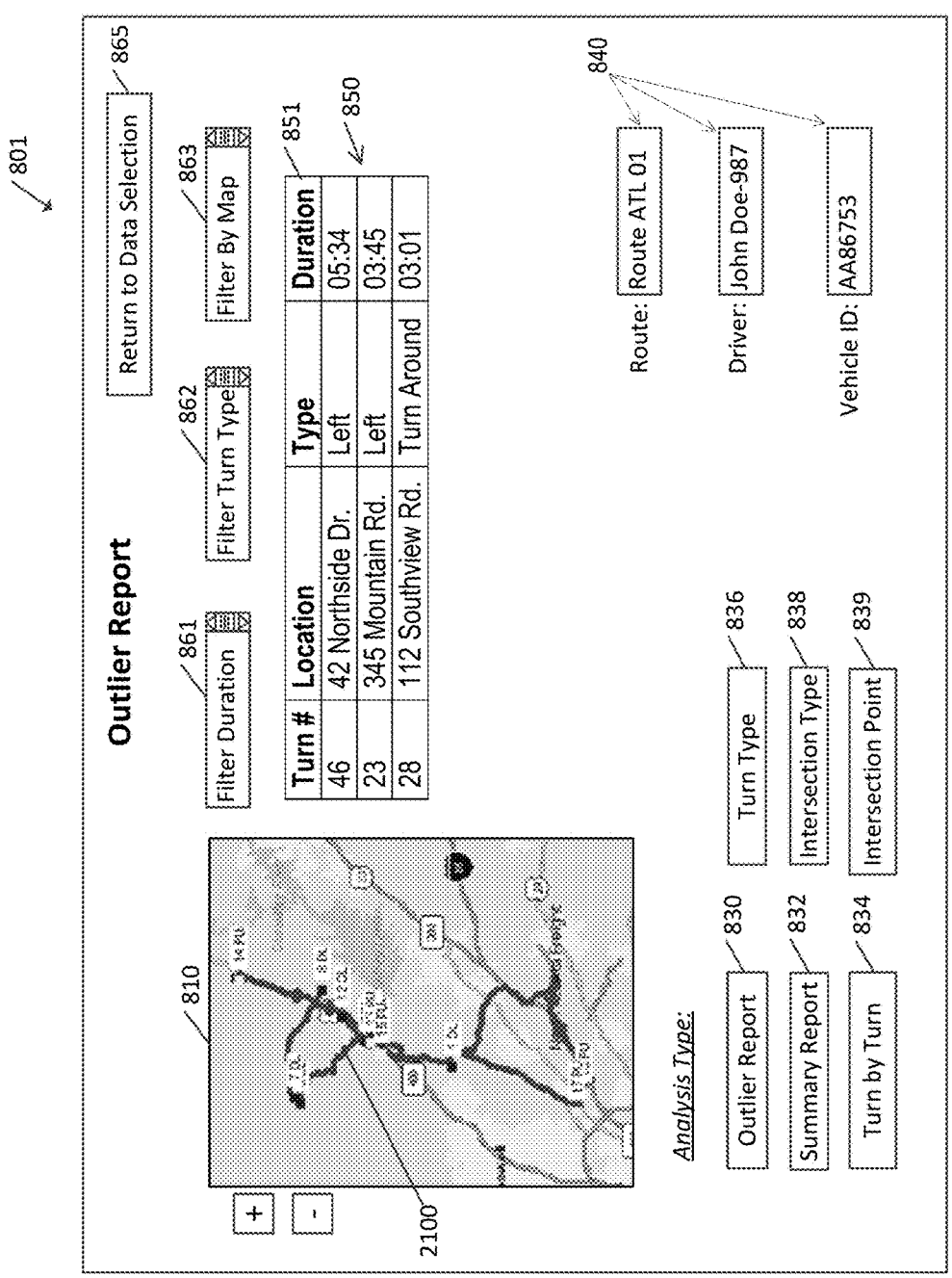
FIG. 12 shows an outlier report graphical user interface according to one embodiment of the present invention.

According to various embodiments, the outlier report module 3000 is configured to analyze the user-selected turn segment data and identify outlier turn segments having an abnormal duration. For example, FIG. 11 illustrates exemplary steps executed by the outlier report module 3000 in order to identify outlier turn segments and provide an interactive display of the same to a user. Beginning at step 3002, the outlier report module 3000 displays an outlier report graphical user interface ("GUI"). FIG. 12 shows an outlier report graphical user interface 801 according to one embodiment. As shown in FIG. 12, the outlier report GUI 801 includes a map display 810, analysis buttons 830-839 (e.g., the same as those provided on the start-up user interface 800), a data table 850, data table sorting buttons 851, a duration filter menu 861, a turn type filter menu 862, a filter by map button 863, current data indicators 840, and a return to data selection button 865.

Next, at step 3004, the outlier report module 3000 analyzes the turn segment data loaded by the central server 120 and identifies outlier turn segments based on defined outlier criteria. For example, in one embodiment the outlier report module 3000 is configured such that the outlier criteria comprises any turn exceeding one minute in duration. In such an embodiment, the outlier report module 3000 would execute step 3004 by analyzing the loaded turn segment data, identifying all turn segments exceeding one minute in duration, and marking these turn segments as outlier turn segments. However, according to various embodiments, the outlier criteria may be defined based on any conditions suitable for a particular user. For example, in another embodiment, a user may define the outlier criteria as (i) any left-hand turns exceeding one minute in duration, (ii) any right-hand turns exceeding 30 seconds in duration, and (iii) any turn-around turns exceeding 45 seconds in duration. In such an embodiment, the outlier report module 3000 would review the turn segments in the loaded turn segment data corresponding to each turn type (e.g., right-hand, left-hand, turn-around) and identify those turn segments meeting the outlier criteria. As will be appreciated from the description herein, the central server 120 may be configured to enable to the user to modify and set any outlier criteria for use by the outlier report module 3000 in executing step 3004.

Next, at step 3006, the outlier report module 3000 displays the identified outlier turn segments in the data table 850 on the outlier report GUI 801. For example, in the illustrated embodiment, the outlier report module 3000 populates the data table 850 with the chronological turn number, the location, the turn type, and duration of each identified outlier turn segment. In addition, the current data indicators 840 show the route, driver, and/or vehicle associated with the currently analyzed user-selected data.

As shown in FIG. 12, the outlier turn segments are initially ordered in the data table 850 according to duration, with the highest-duration outlier turn segment being listed first. However, the order of the outlier turn segments displayed in the data table 850 may be changed in accordance with a user selection of one of the data table sorting buttons 851, which include the turn number, location, turn type, and duration. For example, where the user selects the turn number sorting button, the outlier report module 3000 will sort the outlier turn segments in the data table 850 chronologically in the order of occurrence. Similarly, where the user selects the turn type sorting button, the outlier report module 3000 will group the outlier turn segments in the data table 850 according to their turn type.

Additionally, turn segments displayed in the data table 850 can be filtered using the duration filter menu 861, the turn type filter menu 862, and the filter by map button 863. For example, in response to user input received via the duration filter menu 861, the outlier report module 3000 will display only outlier turn segments having a duration within a range specified by the user. Similarly, in response to user input received via the turn type filter menu 862, the outlier report module 3000 will display only outlier turn segments of a turn type matching one or more turn types specified by the user. Additionally, in response to selection of the filter by map button 863, the outlier report module 3000 enables a user to select a geographical area in the map display 810 and will then display only outlier turn segments occurring within the user-defined map area.

Next, at step 3008, the outlier report module 3000 plots the travel path (or paths) 2100 of the vehicle (or vehicles) associated with the outlier turn segments and the location of the outlier turn segments on the map display 810. For example, in one embodiment, the outlier report module 3000 executes step 3008 by first loading and displaying a base electronically navigable map (herein the "base map"). In various embodiments, the data comprising the base map may be stored on, and retrieved from, the central server database. Next, the outlier report module 3000 reviews operational data corresponding to the user-selected parameters and identifies location data (e.g., captured GPS coordinates) and time data (e.g., captured times, such as 09:38: 12) associated with each data record in the corresponding operational data.

The outlier report module 3000 next generates a graphical representation of the travel path of each vehicle associated with user selected data on the map display 810. In one embodiment, the outlier report module 3000 accomplishes this by plotting each individual location data point in the loaded operational data on the map display 810 and then connecting the plotted location points in chronological order—based on the retrieved time data—with lines displayed over the base map. In various embodiments the travel path(s) generated by the outlier report module 3000 may each comprise colored line(s) having a thickness greater than that of roads shown in the base map and which include arrows disposed along the travel path(s) to indicate the direction of each vehicle's 100 travel. Additionally, the outlier report module 3000 plots the location of each outlier turn segment on the map display 810 to provide geographical context to each outlier segment.

As will be appreciated from the foregoing description, the outlier report GUI 801 generated by the outlier report module 3000 provides a clear display of turn segments having an abnormally long duration and enables the user to assess turns causing inefficiencies in vehicle routing. Once the outlier report module 3000 has executed the steps shown FIG. 11, the user may return to the start-up interface 800 by selecting the return to data selection button 865, or request a different analysis of the currently selected data by selecting one of the analysis type buttons 830-839.

Summary Report Module

Figure 13:
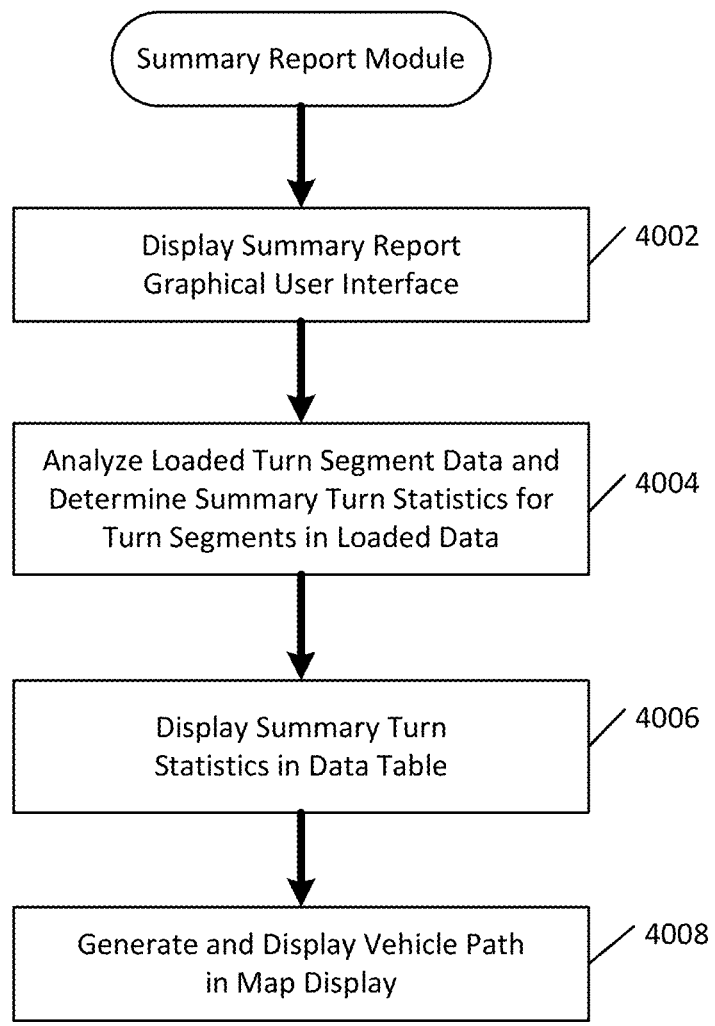
FIG. 13 shows exemplary steps executed by a summary report module according to one embodiment of the present invention.
Figure 14:
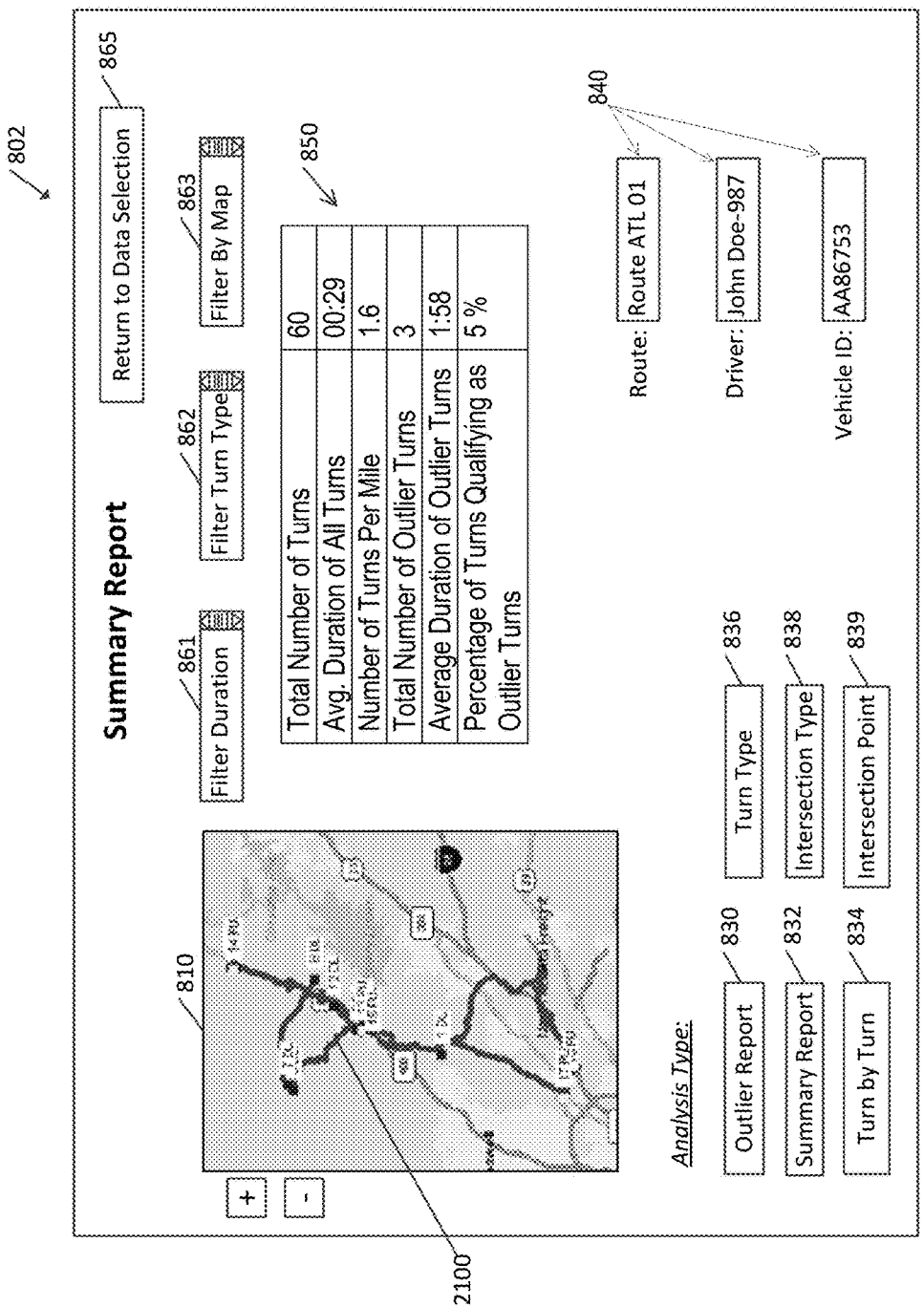
FIG. 14 shows a summary report graphical user interface according to one embodiment of the present invention.

According to various embodiments, the summary report module 4000 is configured to analyze the user-selected turn segment data and provide an overall summary of turn statistics for the user-selected data. For example, FIG. 13 illustrates exemplary steps executed by the summary report module 4000 in order to provide an interactive display of turn statistics to a user. Beginning at step 4002, the summary report module 4000 displays a summary report graphical user interface. FIG. 14 shows a summary report graphical user interface 802 according to one embodiment. As shown in FIG. 14, the summary report GUI 802 includes a map display 810, analysis buttons 830-839 (e.g., the same as those provided on the start-up user interface 800), a data table 850, a duration filter menu 861, a turn type filter menu 862, a filter by map button 863, current data indicators 840, and a return to data selection button 865.

Next, at step 4004, the summary report module 4000 analyzes the turn segment data loaded by the central server 120 and calculates a plurality of turn statistics based on the loaded turn segment data. For example, in one embodiment the summary report module 4000 is configured to calculate the following statistics: (i) the total number of turns indicated in the loaded turn segment data; (ii) the average duration of all turns indicated in the loaded turn segment data; (iii) the average number of turns per mile traveled for the loaded turn segment data; (iv) the total number of outlier turns indicated in the loaded turn segment data (e.g., using the techniques described above in relation to the outlier report module 3000); (v) the average duration of all outlier turns indicated in the loaded turn segment data; and (vi) the percentage of all turns qualifying as outlier turn segments in the loaded turn segment data. As will be appreciated from the description herein, the summary report module 4000 may be configured to execute these calculations based on the relevant fields in each turn segment data record contained in the loaded turn segment data. Additionally, according to various other embodiments, the summary report module 4000 may be configured to calculate any additional relevant statistics based on the loaded turn segment data.

Next, at step 4006, the summary report module 4000 displays the calculated turn statistics in the data table 850 on the summary report GUI 802. In addition, the current data indicators 840 show the route, driver, and/or vehicle associated with the currently analyzed user-selected data. As shown in FIG. 14, the turn statistics displayed in the data table 850 can be recalculated based on filtered data using the duration filter menu 861, the turn type filter menu 862, and the filter by map button 863. For example, in response to user input received via the duration filter menu 861, the summary report module 4000 will recalculate the turn statistics for only turns having a duration within a range specified by the user. Similarly, in response to user input received via the turn type filter menu 862, the summary report module 4000 will recalculate the turn statistics for only turns having a turn type matching one or more turn types specified by the user. Additionally, in response to selection of the filter by map button 863, the summary report module 4000 enables a user to select a geographical area in the map display 810 and will then recalculate the turn statistics based only on turn segments occurring within the user-defined map area.

Next, at step 4008, the summary report module 4000 plots the travel path (or paths) 2100 of the vehicle (or vehicles) associated with the user-selected turn segments on the map display 810 (e.g., using the techniques described above in relation to the outlier report module 3000). As will be appreciated from the foregoing description, the summary report GUI 802 generated by the summary report module 4000 provides a clear display of turn statistics for the user-selected data and enables the user to quickly assess the overall turn efficiency of routes, drivers, or vehicles associated with the analyzed data. Once the summary report module 4000 has executed the steps shown FIG. 13, the user may return to the start-up interface 800 by selecting the return to data selection button 865, or request a different analysis of the currently selected data by selecting one of the analysis type buttons 830-839.

Turn by Turn Analysis Module

Figure 15:
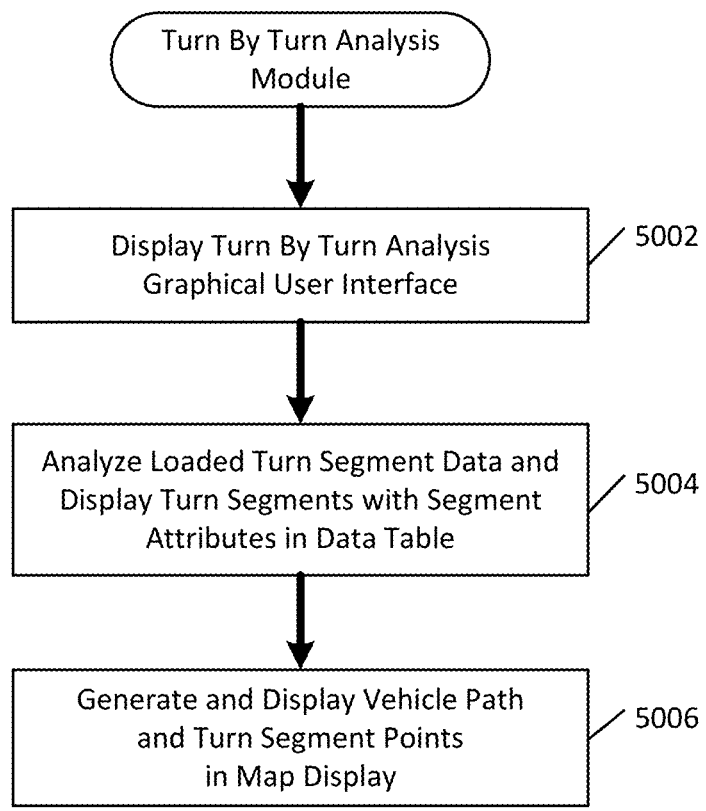
FIG. 15 shows exemplary steps executed by a turn by turn analysis module according to one embodiment of the present invention.
Figure 16:
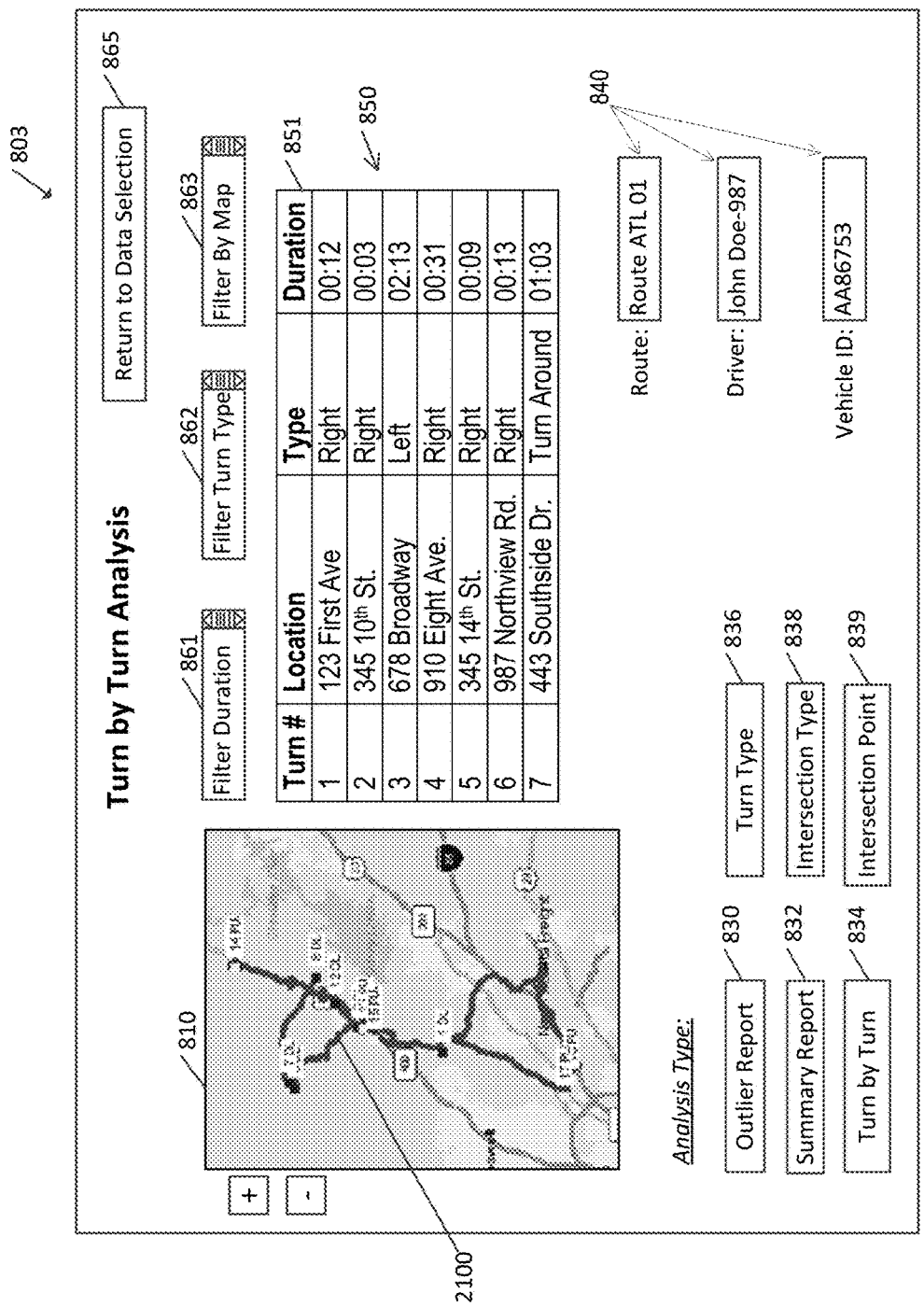
FIGS. 16 and 17 show turn by turn graphical user interfaces according to one embodiment of the present invention.

According to various embodiments, the turn by turn analysis module 5000 is configured to analyze the user-selected turn segment data and generate a turn by turn report for the user-selected data. For example, FIG. 15 illustrates exemplary steps executed by the turn by turn analysis module 5000 in order to provide an interactive display of turn segments indicated by the user-selected data. Beginning at step 5002, the turn by turn analysis module 5000 displays a turn by turn graphical user interface. FIG. 16 shows a turn by turn graphical user interface 803 according to one embodiment. As shown in FIG. 16, the turn by turn GUI 803 includes a map display 810, analysis buttons 830-839 (e.g., the same as those provided on the start-up user interface 800), a data table 850, data table sorting buttons 851, a duration filter menu 861, a turn type filter menu 862, a filter by map button 863, current data indicators 840, and a return to data selection button 865.

Next, at step 5004, the turn by turn analysis module 5000 analyzes the turn segment data loaded by the central server 120 and displays each turn segment indicated by the data in chronological order in the data table 850. For example, in the illustrated embodiment, the turn by turn analysis module 5000 populates the data table 850 with the chronological turn number, the location, the turn type, and duration of each turn segment. In addition, the current data indicators 840 show the route, driver, and/or vehicle associated with the currently analyzed user-selected data.

Figure 17:
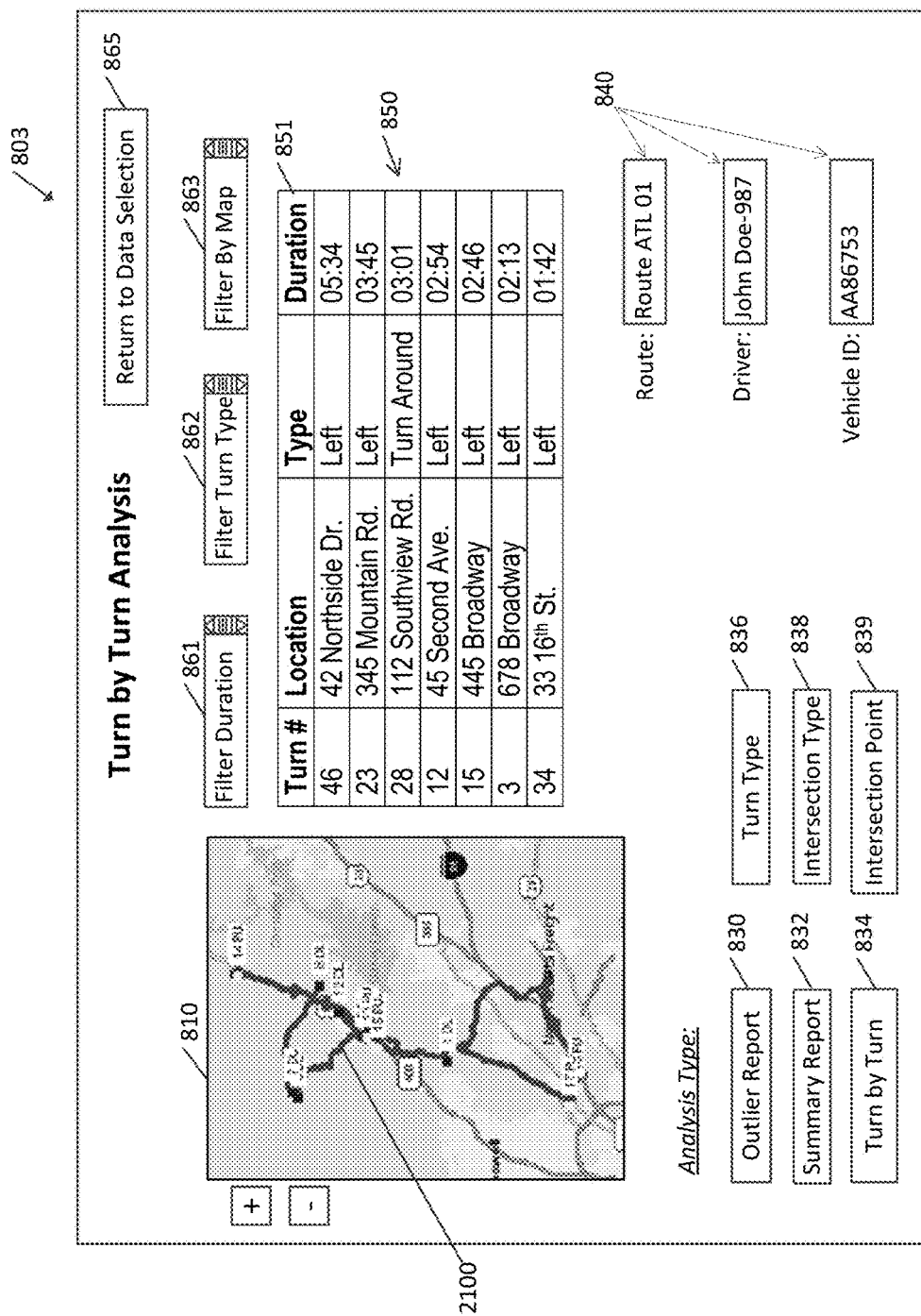

As shown in FIG. 16, the turn segments are initially ordered in the data table 850 chronologically in order of occurrence, with the first turn segment being listed first. However, the order of the turn segments displayed in the data table 850 may be changed in accordance with a user selection of one of the data table sorting buttons 851, which include the turn number, location, turn type, and duration. For example, where the user selects the duration sorting button, the turn by turn analysis module 5000 will sort the turn segments in the data table 850 sequentially in order of high duration to shortest duration, thereby providing user visibility to the longest turn segments indicated by the loaded data. As an exemplary illustration of this, FIG. 17 shows the turn by turn GUI 803 with the data table 850 sorted according to duration. Similarly, where the user selects the turn type sorting button, the turn by turn analysis module 5000 will group the turn segments in the data table 850 according to their turn type.

Additionally, turn segments displayed in the data table 850 can be filtered using the duration filter menu 861, the turn type filter menu 862, and the filter by map button 863. For example, in response to user input received via the duration filter menu 861, the turn by turn analysis module 5000 will display only turn segments having a duration within a range specified by the user. Similarly, in response to user input received via the turn type filter menu 862, the turn by turn analysis module 5000 will display only turn segments of a turn type matching one or more turn types specified by the user. Additionally, in response to selection of the filter by map button 863, the turn by turn analysis module 5000 enables a user to select a geographical area in the map display 810 and will then display only turn segments occurring within the user-defined map area.

Next, at step 5006, the turn by turn analysis module 5000 plots the travel path (or paths) 2100 of the vehicle (or vehicles) associated with the user-selected turn segments on the map display 810 (e.g., using the techniques described above in relation to the outlier report module 3000). As will be appreciated from the foregoing description, the turn by turn GUI 803 generated by the turn by turn analysis module 5000 provides a clear display of turn segments for the user-selected data and enables the user to quickly view and compare attributes of each of these turns to assess the turn efficiency of routes, drivers, or vehicles associated with the analyzed data. Once the turn by turn analysis module 5000 has executed the steps shown FIG. 15, the user may return to the start-up interface 800 by selecting the return to data selection button 865, or request a different analysis of the currently selected data by selecting one of the analysis type buttons 830-839.

Turn Type Analysis Module

Figure 18:
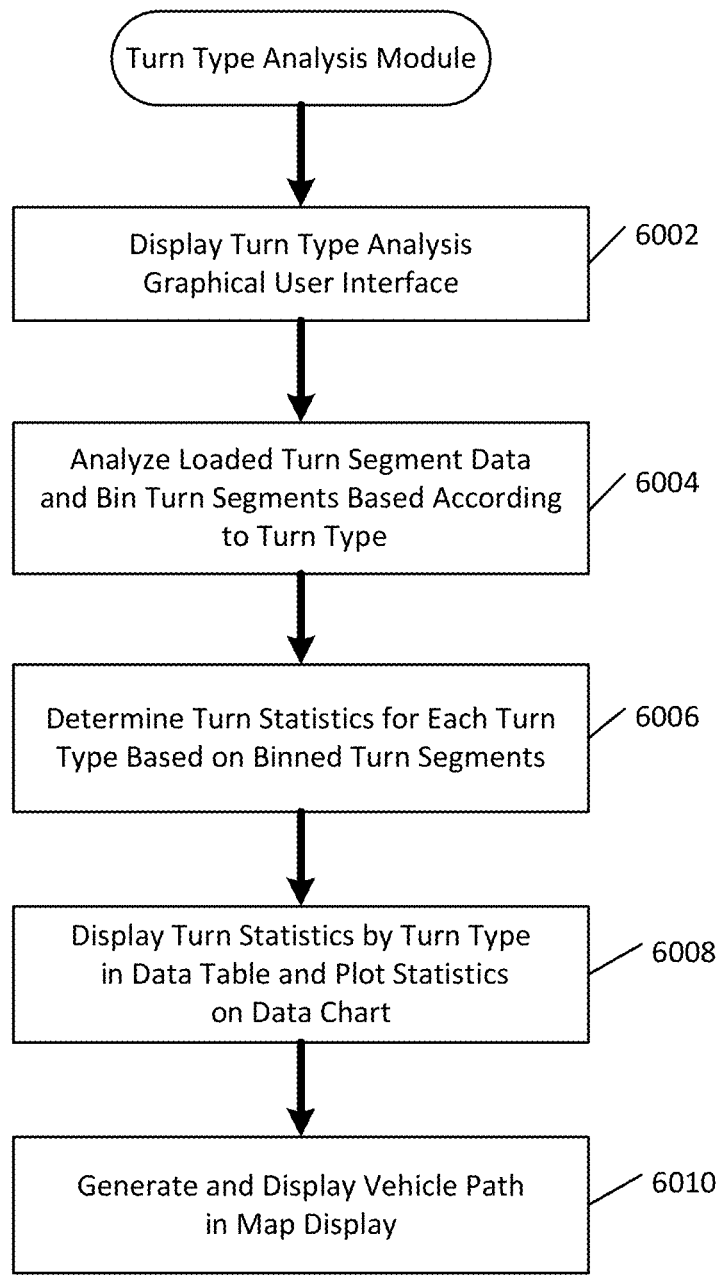
FIG. 18 shows exemplary steps executed by a turn type analysis module according to one embodiment of the present invention.
Figure 19:
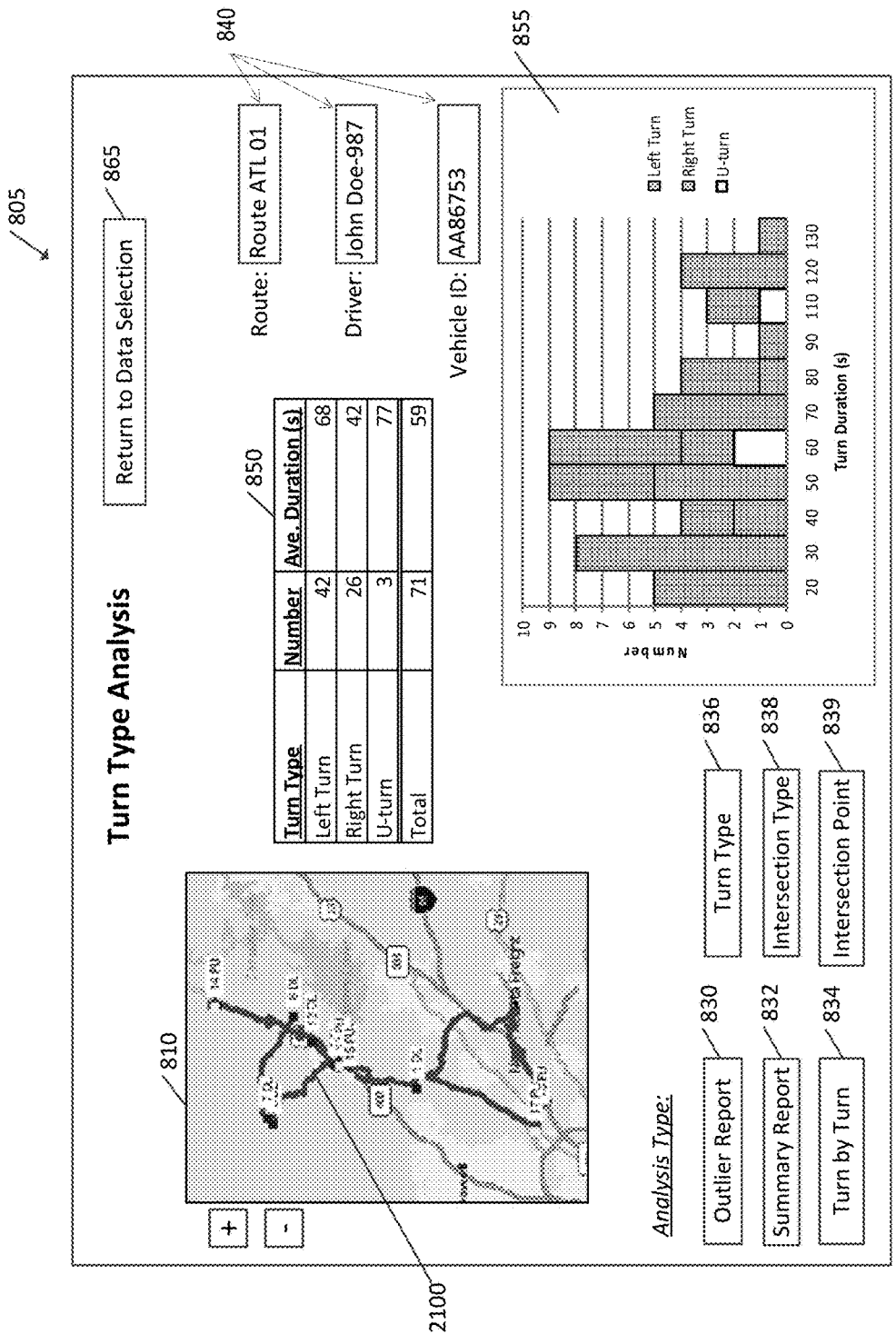
FIG. 19 shows a turn type graphical user interface according to one embodiment of the present invention.

According to various embodiments, the turn type analysis module 6000 is configured to analyze the user-selected turn segment data and determine statistics for turns of each turn type (e.g., left turns, right turns, and turn-around turns) indicated in the data. For example, FIG. 18 illustrates exemplary steps executed by the turn type analysis module 6000 in order to classify turn segments in the loaded data according to turn type and provide an interactive display of turn statistics for each turn type to a user. Beginning at step 6002, the turn type analysis module 6000 displays an turn type graphical user interface. FIG. 19 shows a turn type graphical user interface 805 according to one embodiment. As shown in FIG. 19, the turn type GUI 805 includes a map display 810, analysis buttons 830-839 (e.g., the same as those provided on the start-up user interface 800), a data table 850, a data chart 855, current data indicators 840, and a return to data selection button 865.

Next, at step 6004, the turn type analysis module 6000 analyzes the turn segment data loaded by the central server 120 and bins the turn segments in the data according to turn type (e.g., by reviewing the turn type field in each turn segment data record and storing the turns in separate turn type logical bins). Next, at step 6006, the turn type analysis module 6000 calculates turn statistics based on the loaded turn segment data for each turn type. For example, in one embodiment the turn type analysis module 6000 is configured to calculate the following statistics: (i) the total number of turns indicated in the loaded turn segment data; (ii) the total number of left turns indicated in the loaded turn segment data; (iii) the total number of right turns indicated in the loaded turn segment data; (iv) the total number of turn-around turns indicated in the loaded turn segment data; (v) the average duration of all turns indicated in the loaded turn segment data; (vi) the average duration of all left turns indicated in the loaded turn segment data; (vii) the average duration of all right turns indicated in the loaded turn segment data; and (viii) the average duration of all turn-around turns indicated in the loaded turn segment data.

Additionally, the turn type analysis module 6000 may be configured to calculate the number of turn segments of each turn type having a duration falling within predefined ranges. For example, in one embodiment, the turn type analysis module 6000 is configured to determine the number of left turns, right turns, and turn-around turns having a duration of 0-20 seconds, 21-30 seconds, 31-40 seconds, 41-50 seconds, 51-60 seconds, 61-70 seconds, 71-80 seconds, 81-90 seconds, 91 to 100 seconds, 101-110 seconds, 111-120 seconds, 121-130 seconds, and more than 130 seconds, respectively. As will be appreciated from the description herein, the turn type analysis module 6000 may be configured to execute these calculations based on the relevant fields in each turn segment data record contained in the loaded turn segment data. Additionally, according to various other embodiments, the turn type analysis module 6000 may be configured to calculate any additional relevant statistics based on the loaded turn segment data.

Next, at step 6008, the turn type analysis module 6000 displays the calculated turn statistics in the data table 850 and the data chart 855 on the turn type GUI 805. For example, as shown in FIG. 19, the data table 850 shows the number of and average of duration of left turns, right turns, turn-around turns, and total turns. Additionally, the data chart 855 provides a histogram illustrating the number of turns of each turn type falling within each of the aforementioned duration ranges. In addition, the current data indicators 840 show the route, driver, and/or vehicle associated with the currently analyzed user-selected data.

Next, at step 6010, the turn type analysis module 6000 plots the travel path (or paths) 2100 of the vehicle (or vehicles) associated with the user-selected turn segments on the map display 810 (e.g., using the techniques described above in relation to the outlier report module 3000). As will be appreciated from the foregoing description, the turn type GUI 805 generated by the turn type analysis module 6000 provides a clear display of turn statistics for turns of each turn type and enables the user to assess the overall turn efficiency of routes, drivers, or vehicles associated with the analyzed data. Once the turn type analysis module 6000 has executed the steps shown FIG. 18, the user may return to the start-up interface 800 by selecting the return to data selection button 865, or request a different analysis of the currently selected data by selecting one of the analysis type buttons 830-839.

Intersection Type Analysis Module

Figure 20:
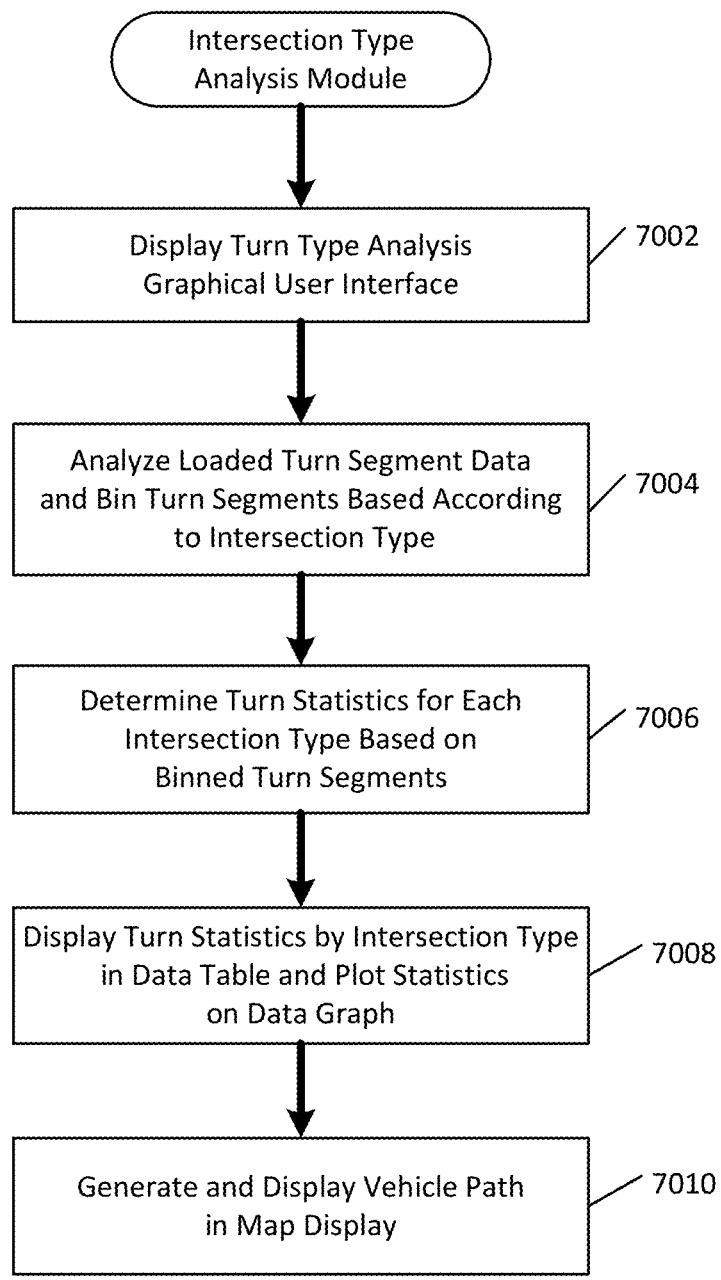
FIG. 20 shows exemplary steps executed by an intersection type analysis module according to one embodiment of the present invention.
Figure 21:
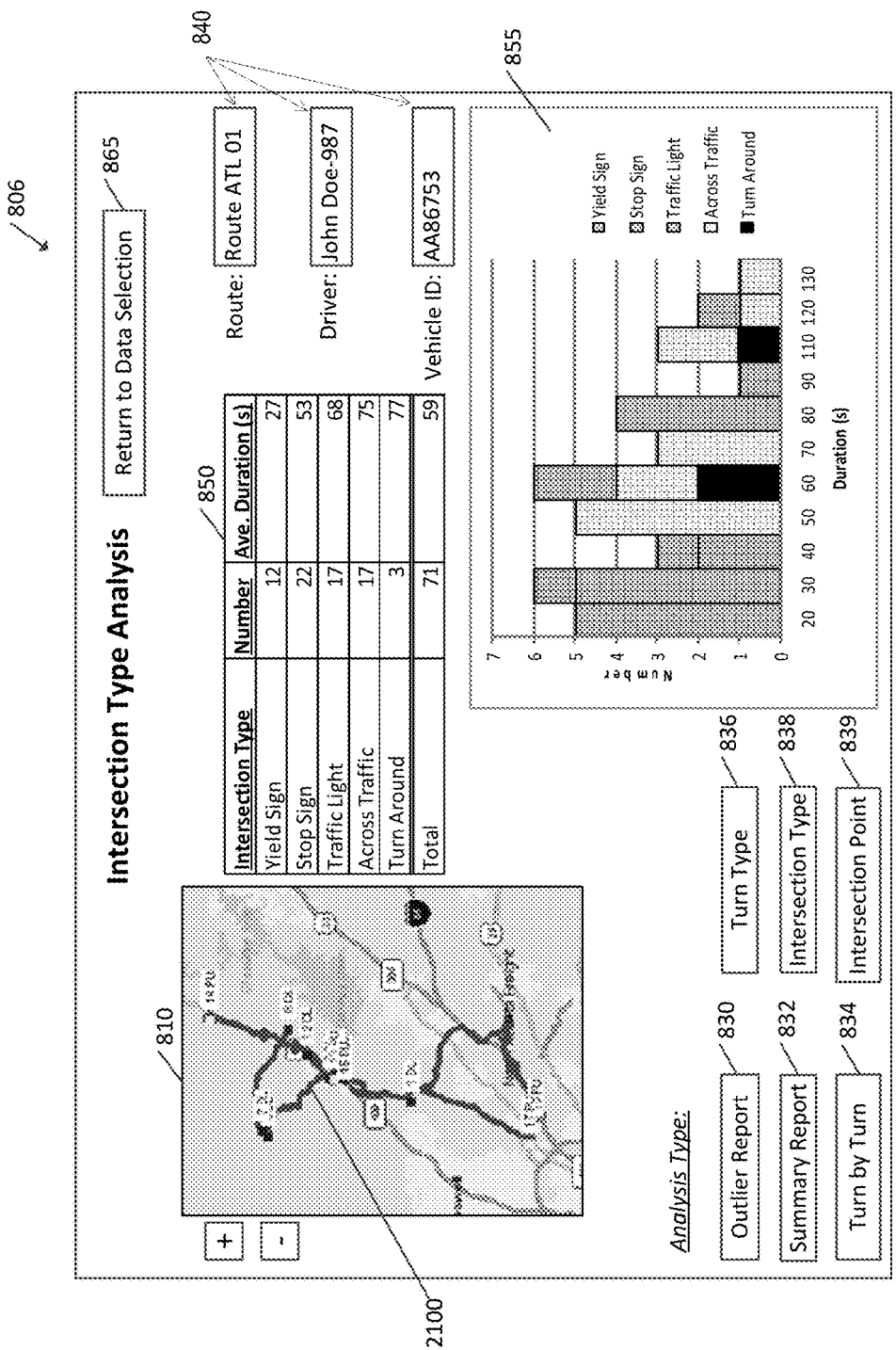
FIG. 21 shows an intersection type graphical user interface according to one embodiment of the present invention.

According to various embodiments, the intersection type analysis module 7000 is configured to analyze the user-selected turn segment data and determine statistics for turns of each intersection type (e.g., yield sign, stop sign, traffic light, across traffic, turn-around) indicated in the data. For example, FIG. 20 illustrates exemplary steps executed by the intersection type analysis module 7000 in order to classify turn segments in the loaded data according to intersection type and provide an interactive display of turn statistics for each intersection type to a user. Beginning at step 7002, the intersection type analysis module 7000 displays an intersection type graphical user interface. FIG. 21 shows an intersection type graphical user interface 806 according to one embodiment. As shown in FIG. 21, the intersection type GUI 806 includes a map display 810, analysis buttons 830-839 (e.g., the same as those provided on the start-up user interface 800), a data table 850, a data chart 855, current data indicators 840, and a return to data selection button 865.

Next, at step 7004, the intersection type analysis module 7000 analyzes the turn segment data loaded by the central server 120 and bins the turn segments in the data according to intersection type (e.g., by reviewing the intersection type field in each turn segment data record and storing the turns in separate intersection type logical bins). Next, at step 7006, the intersection type analysis module 7000 calculates turn statistics based on the loaded turn segment data for each intersection type. For example, in one embodiment the intersection type analysis module 7000 is configured to calculate the following statistics: (i) the total number of turns indicated in the loaded turn segment data; (ii) the total number of turns occurring at a yield sign intersection in the loaded turn segment data; (iii) the total number of turns occurring at a stop sign intersection in the loaded turn segment data; (iv) the total number of turns occurring at a traffic light intersection in the loaded turn segment data; (v) the total number of turns occurring across traffic (e.g., without a stop sign, yield sign, or traffic light) in the loaded turn segment data; (vi) the total number of turn-around turns not occurring at a traffic sign or light in the loaded turn segment data; (vii) the average duration of all turns indicated in the loaded turn segment data; (viii) the average duration of turns occurring at a yield sign intersection in the loaded turn segment data; (ix) the average duration of turns occurring at a stop sign intersection in the loaded turn segment data; (x) the average duration of turns occurring at a traffic light intersection in the loaded turn segment data; (xi) the average duration of turns occurring across traffic (e.g., without a stop sign, yield sign, or traffic light) in the loaded turn segment data; and (xii) the average duration of turn-around turns not occurring at a traffic sign or light in the loaded turn segment data.

Additionally, the intersection type analysis module 7000 may be configured to calculate the number of turn segments of each intersection type having a duration falling within predefined ranges. For example, in one embodiment, the intersection type analysis module 7000 is configured to determine the number of yield sign intersection turns, stop sign intersection turns, traffic light intersection turns, across traffic turns, and turn-around turns having a duration of 0-20 seconds, 21-30 seconds, 31-40 seconds, 41-50 seconds, 51-60 seconds, 61-70 seconds, 71-80 seconds, 81-90 seconds, 91 to 100 seconds, 101-110 seconds, 111-120 seconds, 121-130 seconds, and more than 130 seconds, respectively. As will be appreciated from the description herein, the intersection type analysis module 7000 may be configured to execute these calculations based on the relevant fields in each turn segment data record contained in the loaded turn segment data. Additionally, according to various other embodiments, the intersection type analysis module 7000 may be configured to calculate any additional relevant statistics based on the loaded turn segment data.

Next, at step 7008, the intersection type analysis module 7000 displays the calculated turn statistics in the data table 850 and the data chart 855 on the intersection type GUI 806. For example, as shown in FIG. 21, the data table 850 shows the number of and average of duration of yield sign intersection turns, stop sign intersection turns, traffic light intersection turns, across traffic turns, turn-around turns, and all turns. Additionally, the data chart 855 provides a histogram illustrating the number of turns of each intersection type falling within each of the aforementioned duration ranges. In addition, the current data indicators 840 show the route, driver, and/or vehicle associated with the currently analyzed user-selected data.

Next, at step 7010, the intersection type analysis module 7000 plots the travel path (or paths) 2100 of the vehicle (or vehicles) associated with the user-selected turn segments on the map display 810 (e.g., using the techniques described above in relation to the outlier report module 3000). As will be appreciated from the foregoing description, the intersection type GUI 806 generated by the intersection type analysis module 7000 provides a clear display of turn statistics for turns occurring at each intersection type and enables the user to assess the overall turn efficiency of routes, drivers, or vehicles associated with the analyzed data. Once the turn intersection type analysis module 7000 has executed the steps shown FIG. 20, the user may return to the start-up interface 800 by selecting the return to data selection button 865, or request a different analysis of the currently selected data by selecting one of the analysis type buttons 830-839.

Intersection Point Analysis Module

Figure 22:
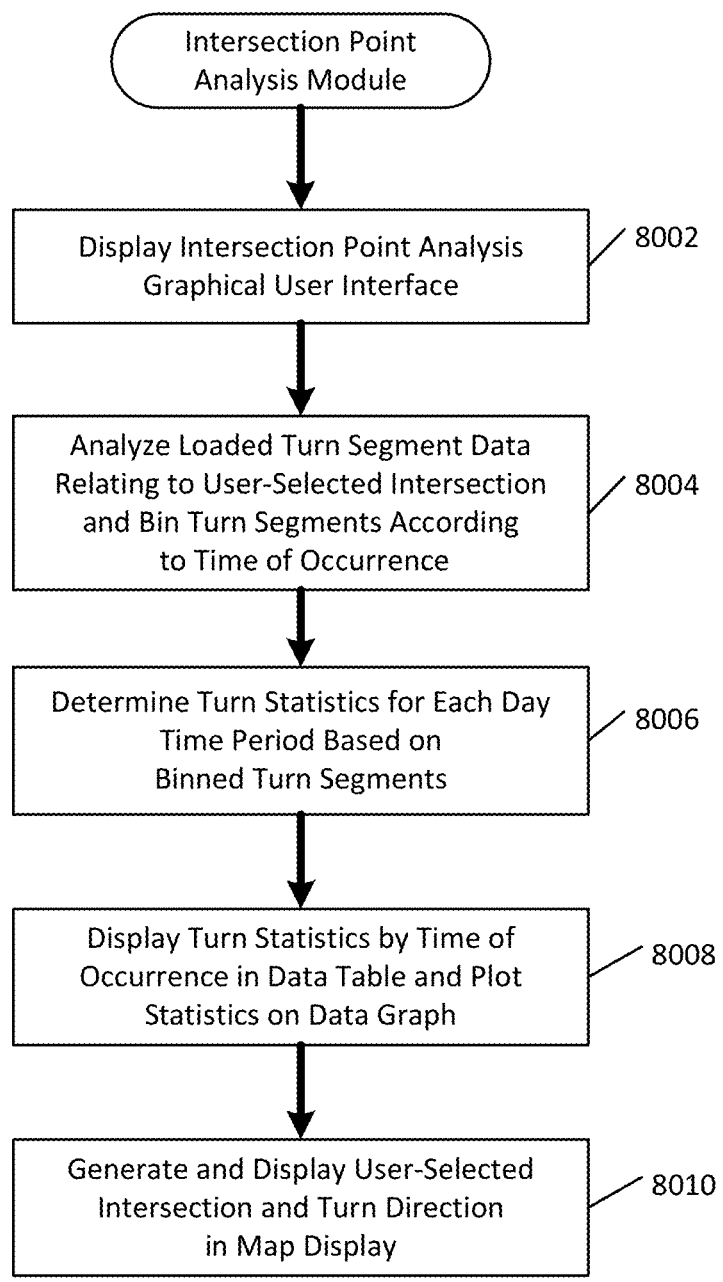
FIG. 22 shows exemplary steps executed by an intersection point analysis module according to one embodiment of the present invention.
Figure 23:
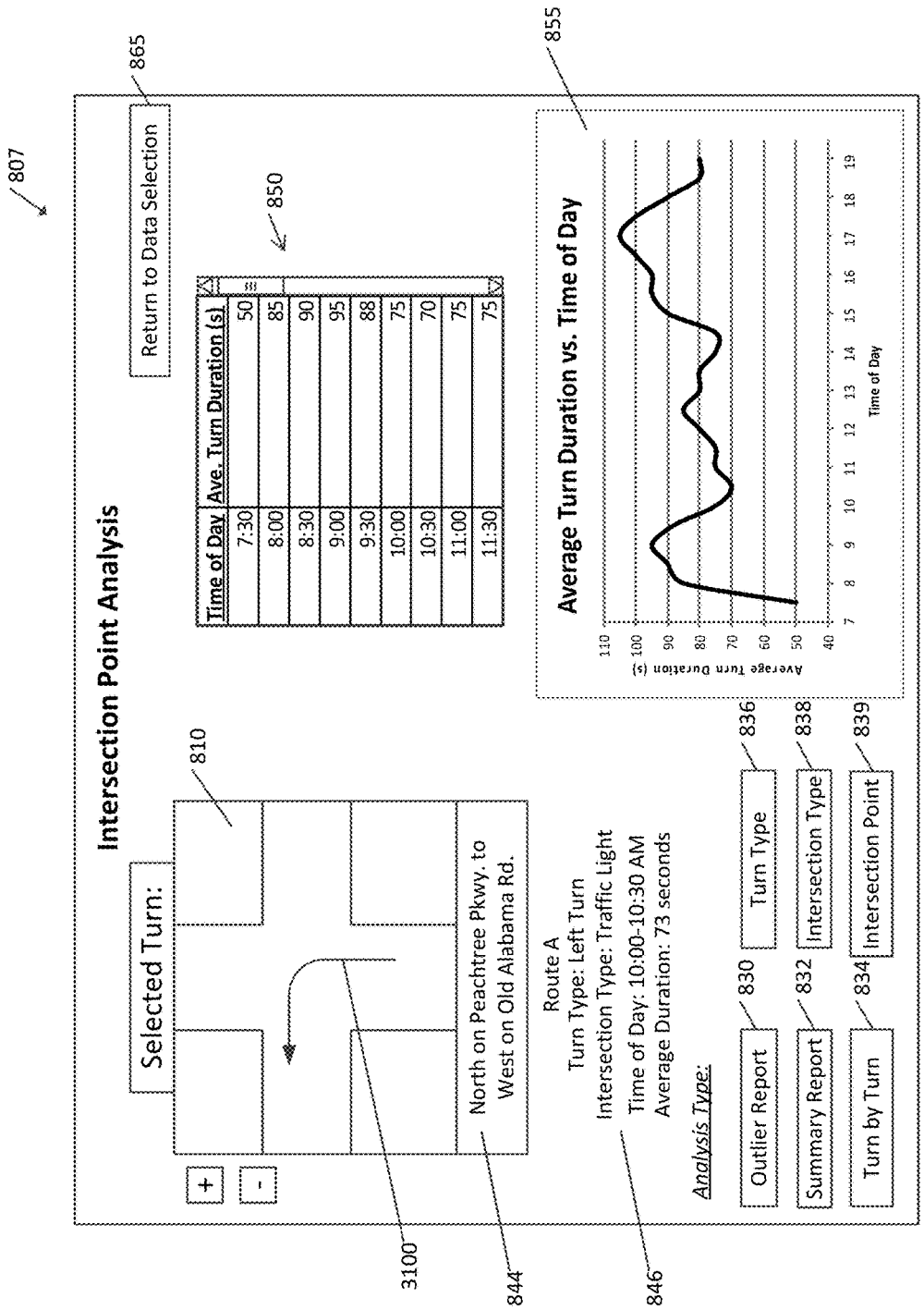
FIG. 23 shows an intersection point analysis graphical user interface according to one embodiment of the present invention.

According to various embodiments, the intersection point analysis module 8000 is configured to analyze turn segment data relating to a particular user-selected intersection and determine statistics for turns occurring at the intersection. For example, FIG. 22 illustrates exemplary steps executed by the intersection point analysis module 8000 in order to analyze turn segments in the loaded data occurring at the user-selected intersection and provide an interactive display of statistics for the related turns to a user. Beginning at step 8002, the intersection point analysis module 8000 displays an intersection point analysis graphical user interface. FIG. 23 shows an intersection point analysis graphical user interface 807 according to one embodiment. As shown in FIG. 23, the intersection point GUI 807 includes a map display 810, analysis buttons 830-839 (e.g., the same as those provided on the start-up user interface 800), a data table 850, a data chart 855, current data indicators 846, and a return to data selection button 865.

As discussed above in relation to step 906 executed by the central server 120 in FIG. 10, where the user selects the intersection point analysis button 839, the central server 120 is configured to prompt the user to select an intersection from the map display 810 (or by entering a textual description of the intersection) and retrieve turn segment data corresponding to that particular location. Accordingly, at step 8004, the intersection point analysis module 8000 next analyzes the loaded turn segment data relating to the user-selected intersection and bins the turn segments in the data according to the time of day in which they occurred (e.g., by reviewing the time of occurrence field in each turn segment data record and storing the turns in separate time of day logical bins).

Next, at step 8006, the intersection point analysis module 8000 calculates turn statistics based on the loaded turn segment data for sequential periods of time. For example, in one embodiment the turn intersection point analysis module 8000 is configured to calculate the average duration of all vehicle turns occurring at the user-selected intersection for 30 minutes increments during the day (e.g., the average duration of turns occurring at the user-selected intersection between 7:30 AM and 8:00 AM, the average duration of turns occurring at the user-selected intersection between 8:00 AM and 8:30 AM, and so forth). As will be appreciated from the description herein, the intersection point analysis module 8000 may be configured to execute these calculations based on the relevant fields in each turn segment data record contained in the loaded turn segment data. Additionally, according to various other embodiments, the intersection point analysis module 8000 may be configured to calculate any additional relevant statistics based on the loaded turn segment data.

Next, at step 8008, the intersection point analysis module 8000 displays the calculated turn statistics in the data table 850 and the data chart 855 on the intersection point GUI 807. For example, as shown in FIG. 23, the data table 850 shows the average duration of turns occurring at the user-selected turn during each time-period band. Additionally, the data chart 855 provides a line graph illustrating the change in average turn duration at the user-selected intersection over the various time bands.

Next, at step 8010, the intersection point analysis module 8000 displays the user-selected intersection on the map display 810 and (where applicable) along with the intersection name 844 and provides an indication of the turn direction 3100 taken by vehicles at the intersection. In addition, current data indicators 846 provide additional information associated with the intersection (e.g., route, intersection type, etc.).

As will be appreciated from the foregoing description, the intersection point GUI 807 generated by the intersection point analysis module 8000 provides a clear display of turn statistics for turns occurring at a user-selected intersection and enables the user to assess the overall efficiency of turns executed at the selected intersection. Once the intersection point analysis module 8000 has executed the steps shown FIG. 22, the user may return to the start-up interface 800 by selecting the return to data selection button 865, or request a different analysis of the currently selected data by selecting one of the analysis type buttons 830-839.

CONCLUSION

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Many modifications and other embodiments of the invention set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for assessing turns made by at least one vehicle, said system comprising: one or more memory storage areas; and one or more processors in communication with said one or more memory storage areas; wherein said processors are, collectively, configured to:

receive, from one or more vehicle telematics devices located on the at least one vehicle, vehicle telematics data indicative of a travel path of the vehicle during one or more time periods, wherein the vehicle telematics data comprises a plurality of telematics data points, each telematics data point comprising data indicative of a vehicle heading at a particular location along the travel path of the vehicle and a time the data point is generated;

identify, based at least in part on said vehicle telematics data, one or more turns executed by the vehicle during the one or more time periods, the one or more turns each comprising instances in which the vehicle executes a turn in order to change from (i) traveling in a first roadway direction on a first road to (ii) traveling on a second road or traveling in a second roadway direction on the first road, wherein the one or more turns are each identified as comprising a change in vehicle heading between successive telematics data points of the plurality of telematics data points exceeding a predefined threshold heading value;

determine for each identified turn a turn segment comprising:

a beginning turn point comprising a telematics data point occurring before the successive telematics data points;

an ending turn point comprising a telematics data point occurring after the successive telematics data points;

the time elapsed between the beginning turn point and ending turn point, wherein the time elapsed defines the duration of the turn segment; and an intersection type where the identified turn segment occurs by:

identifying, based at least in part on a telematics data point corresponding to the identified turn segment, a location of the turn segment;

comparing the location of the turn segment against map data to identify one or more roads intersecting at the location of the turn segment; and determining, based at least in part on the one or more roads intersecting at the location of the turn segment, an intersection type for the turn segment;

receive a user request for analysis of turns corresponding to one or more identified intersection types;

identify, based at least in part on telematics data corresponding to each turn segment, those turn segments occurring at one of the identified intersection types; and generate, based on said identified turn segments, a graphical display comprising a map illustrating the location of the identified turn segments and displaying one or more turn segment attributes of said identified turn segments.

2. The system of claim 1, wherein the beginning turn point is associated with a time and vehicle location at which the vehicle began executing a respective turn and the ending turn point is associated with a time and vehicle location at which the vehicle completed executing the respective turn.

3. The system of claim 1, wherein the processors are configured to determine for each turn segment the time of the turn segment's occurrence, the location of the turn segment's occurrence, and the duration of the turn segment, and to store each turn segment in association with data indicating the time of the turn segment's occurrence, the location of the turn segment's occurrence, and the duration of the turn segment.

4. The system of claim 3, wherein said processors are configured to determine the direction of each turn segment and classify each turn segment as representing a right turn, left turn, or turn-around turn accordingly.

5. The system of claim 1, wherein said processors are configured to identify, among the turn segments, outlier turn segments having a duration exceeding a threshold duration.

6. The system of claim 1, wherein said graphical display comprises a list of one or more of said identified turn segments.

7. The system of claim 6, wherein said list of one or more of said identified turn segments includes an data indicating one or more turn segment attributes selected from the group consisting of: turn segment duration, turn segment type, turn segment location, and turn segment chronological number.

8. The system of claim 6, wherein said list of one or more of said identified turn segments is sorted according to turn segment duration.

9. The system of claim 6, wherein said list of one or more of said identified turn segments is sorted chronologically in order of turn segment occurrence.

10. The system of claim 6, wherein the processors are configured to identify those of said identified turn segments representing left turns and wherein said list of one or more of said identified turn segments comprises only said identified turn segments representing left turns and is sorted according to the duration of said identified turn segments representing left turns.

11. The system of claim 1, wherein the processors are configured to determine the average duration of the identified turn segments and wherein said one or more turn segment attributes comprise said determined average duration of the identified turn segments.

* * * * *